(12) United States Patent
Miles et al.

(10) Patent No.: US 11,977,412 B2
(45) Date of Patent: May 7, 2024

(54) DOCKING SYSTEM FOR PORTABLE COMPUTING DEVICE

(71) Applicant: Mobile Tech, Inc., Hillsboro, OR (US)

(72) Inventors: Michael D. Miles, Hillsboro, OR (US); Kristopher W. Schatz, Hillsboro, OR (US); Jude A. Hall, Hillsboro, OR (US); Hoa Pham, Hillsboro, OR (US); Lincoln Wilde, Hillsboro, OR (US); Travis C. Walker, Hillsboro, OR (US); Steven R. Payne, Hillsboro, OR (US)

(73) Assignee: MOBILE TECH, INC., Hillsboro, OR (US)

( * ) Notice: Subject to any disclaimer, the term of this patent is extended or adjusted under 35 U.S.C. 154(b) by 857 days.

(21) Appl. No.: 16/982,502

(22) PCT Filed: Mar. 20, 2019

(86) PCT No.: PCT/US2019/023173
§ 371 (c)(1),
(2) Date: Sep. 18, 2020

(87) PCT Pub. No.: WO2019/183227
PCT Pub. Date: Sep. 26, 2019

(65) Prior Publication Data
US 2021/0026409 A1    Jan. 28, 2021

Related U.S. Application Data

(60) Provisional application No. 62/790,131, filed on Jan. 9, 2019, provisional application No. 62/645,657, filed on Mar. 20, 2018.

(51) Int. Cl.
*G06F 1/16* (2006.01)
*F16M 11/04* (2006.01)
(Continued)

(52) U.S. Cl.
CPC ......... *G06F 1/1632* (2013.01); *F16M 11/041* (2013.01); *F16M 11/105* (2013.01); *F16M 11/22* (2013.01); *F16M 13/022* (2013.01); *F16M 2200/068* (2013.01); *F16M 2200/08* (2013.01); *H04M 1/04* (2013.01)

(58) Field of Classification Search
CPC ..... G06F 1/1632; G06F 1/1654; F16M 11/04; F16M 11/041; F16M 11/105; F16M 11/22; F16M 13/022
See application file for complete search history.

(56) References Cited

U.S. PATENT DOCUMENTS

2014/0355200 A1* 12/2014 Thiers ............... H04M 1/04
361/679.41
2018/0032104 A1*  2/2018 Schatz ............... G06F 1/1683

* cited by examiner

Primary Examiner — Anthony M Haughton

(57) ABSTRACT

A variety of improvements to docking systems for portable computing devices are disclosed. For example, improved techniques for maintaining a data connection between a base portion of the docking system and a case portion of the docking system are disclosed. As an example, the docking system can include improved magnetics that help maintain the data connection between the base portion and the case portion, even during rotational movements of the case portion relative to the base portion. Further still, examples are described where the detection of a docking action between the case portion and the base portion can trigger any of a number of responsive actions.

20 Claims, 34 Drawing Sheets

(51) Int. Cl.
*F16M 11/10* (2006.01)
*F16M 11/22* (2006.01)
*F16M 13/02* (2006.01)
*H05K 5/00* (2006.01)
*H05K 7/00* (2006.01)
H04M 1/04 (2006.01)

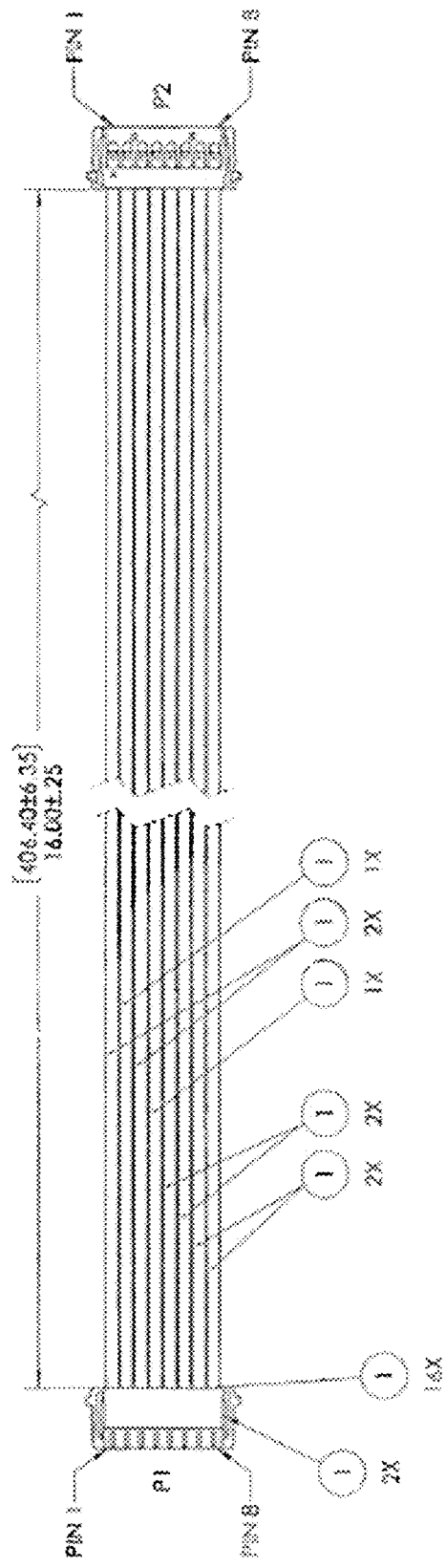
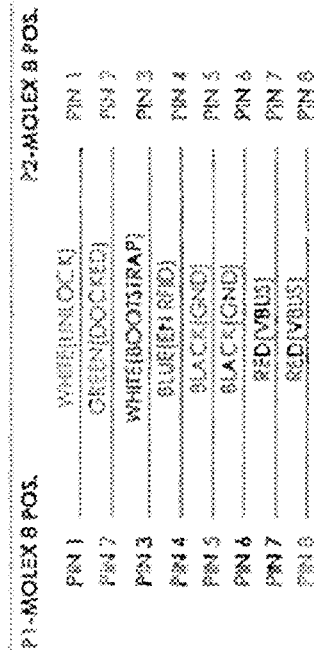
FIG. 16B

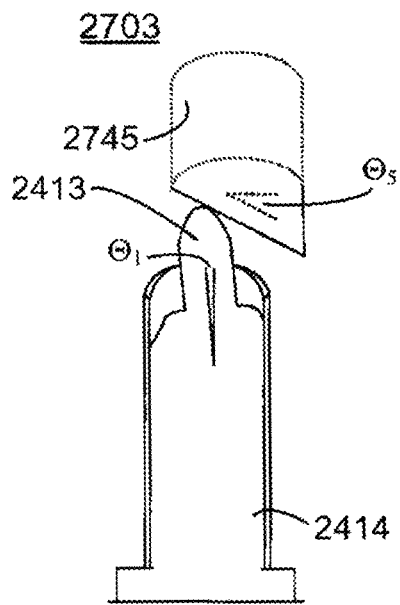
FIG. 27D
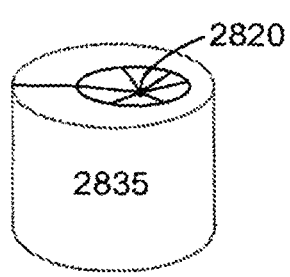 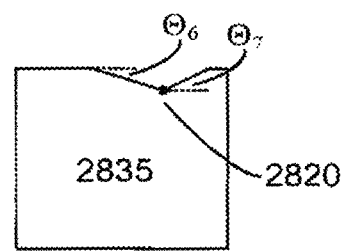
FIG. 28

| Operational State | Dock Detect Voltage |
|---|---|
| Docked and Locked | V1 (e.g., 2.5 V) |
| Docked and Unlocked | V2 (e.g., 0 V) |
| Undocked (and Unlocked) | V3 (e.g., 5 V) |

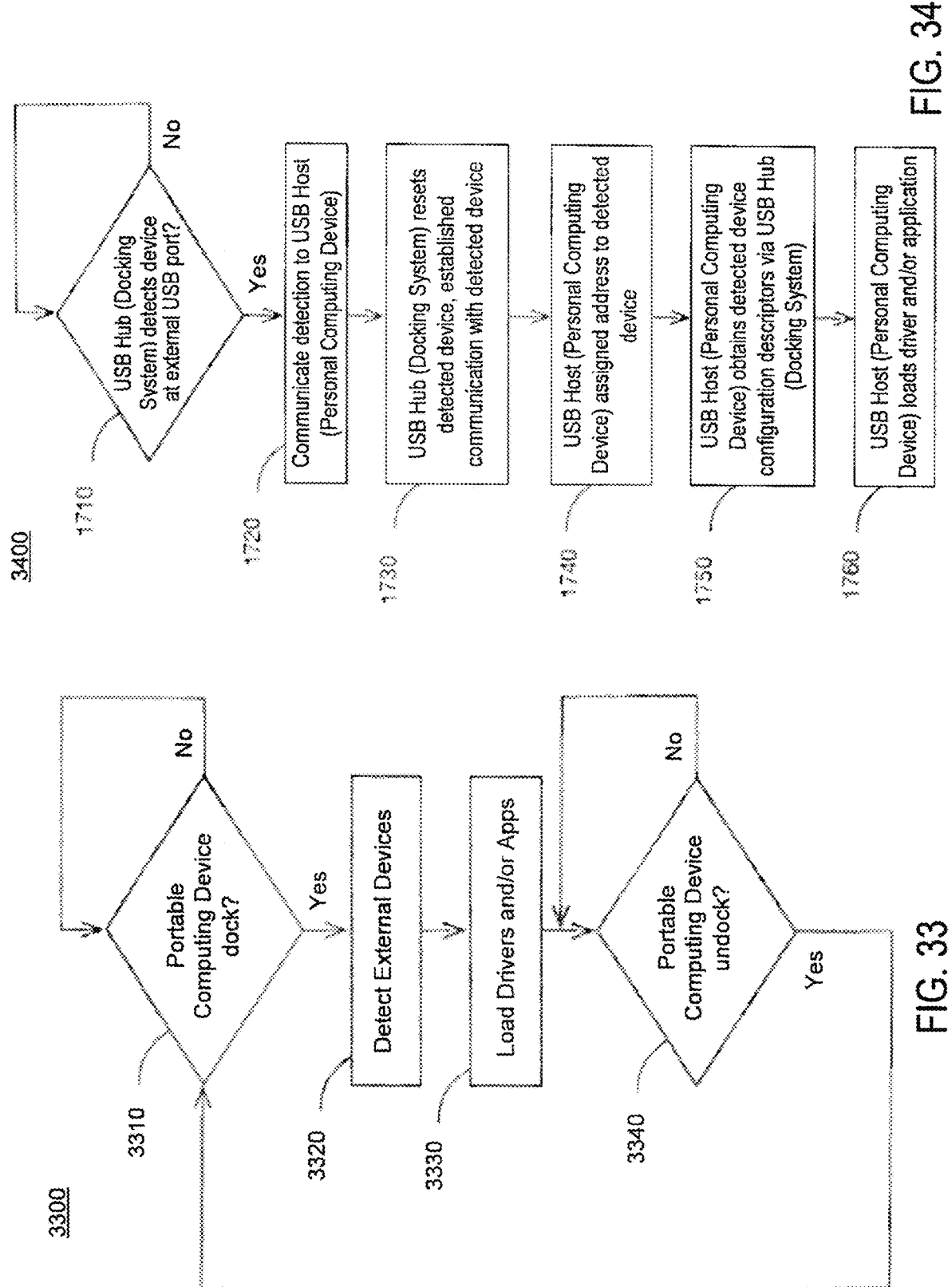

DOCKING SYSTEM FOR PORTABLE COMPUTING DEVICE

CROSS-REFERENCE AND PRIORITY CLAIM TO RELATED APPLICATIONS

This patent application claims priority to U.S. PCT Application No. PCT/US19/23173, filed Mar. 20, 2019, which claims the benefit of U.S. provisional patent application 62/645,657, filed Mar. 20, 2018, the entire disclosure of which is incorporated herein by reference, which also claims the benefit of U.S. provisional patent application 62/790,131 filed Jan. 9, 2019, and, the entire disclosure of which is incorporated herein by reference.

INTRODUCTION

As portable computing devices continue to increase in capability and functionality, deployment of portable computing devices in business offices, hospitals, industrial settings, and other types of environments, also continues to increase. In some instances, such as to assist in obtaining and/or maintaining an advantage over competitors, for example, a business may place a premium on obtaining the most capable and/or most up-to-date portable computing devices as soon as those devices become available. Thus, in addition to securing up-to-date portable computing devices, such as tablet computing devices, for example, a business may also obtain protective enclosures, such as cases that surround and safeguard portable computing devices. Such enclosures may reduce the likelihood of damage to the portable computing device in the event that the device is dropped, rained or spilled upon, or the like.

At times, portable computing devices may benefit from occasionally being connected to docking systems. For example, it may be advantageous to dock or attach a portable computing device, such as a tablet computing device, for example, to a battery charger to permit charging of an onboard battery. In other instances, it may be advantageous to establish a wired connection between a portable computing device and a particular network, such as to permit more secure communications that may be less vulnerable to surreptitious electronic eavesdropping of wireless signals, for example. However, typical docking systems impose numerous restrictions on various aspects of docking, utilization, operation, etc., of portable computing devices. These restrictions may, at times, be considered cumbersome and may thus diminish the appeal of particular types of portable computing devices.

With this in mind, a variety of improvements to docking systems for portable computing devices are disclosed and discussed below.

BRIEF DESCRIPTION OF THE DRAWINGS

FIGS. 16A-16B show additional examples of cables having a plurality of unbundled conductors.

FIGS. 27A-27D are schematic views of various contact pad surface contours to bring about off-axis connection of a connector pin tip of a resilient connector pin to a contact pad, according to example embodiments.

FIG. 28 is a perspective and side view of a contact pad to bring about off-axis connection of a connector pin tip of a resilient connector pin to the contact pad, according to an example embodiment.

FIG. 33 shows an example process flow for implementing and/or enumerating one or more external devices.

FIG. 34 shows another example process flow for implementing and' or enumerating one or more external devices.

Figure 1:
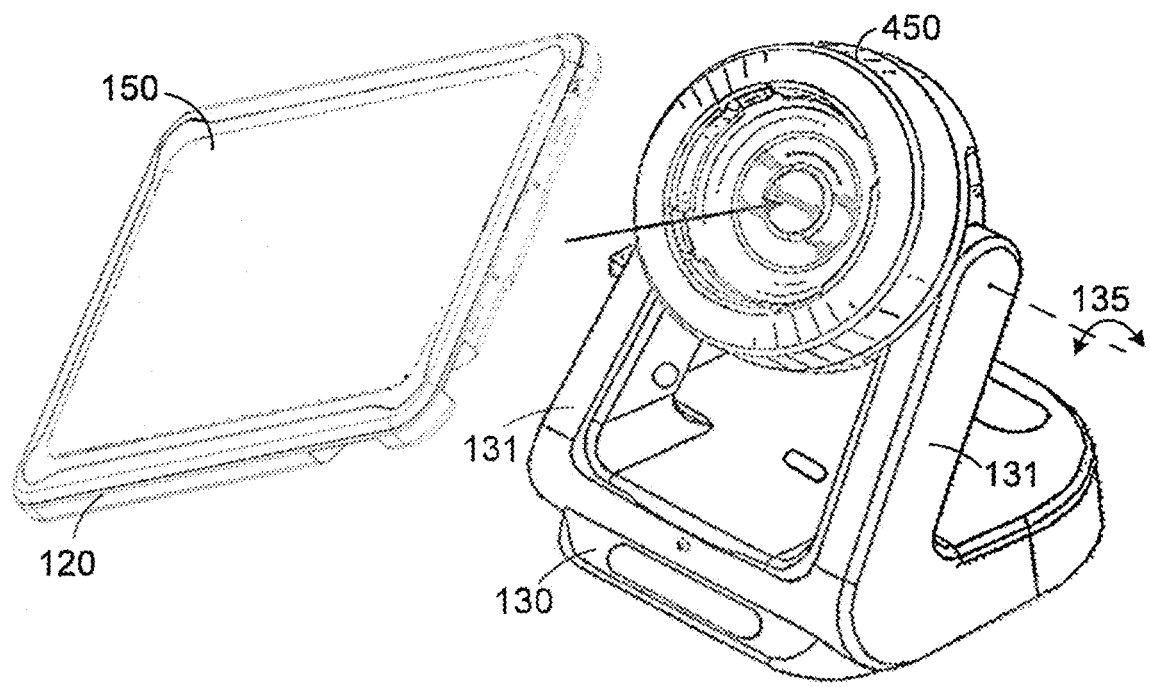
FIG. 1 is a perspective view of an example docking system or docking arrangement comprising a portable computing device within an enclosure, which may be docked to a base mount according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized.

DETAILED DESCRIPTION OF EXAMPLE EMBODIMENTS

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended scope of disclosure.

Some example methods, apparatuses, and/or articles of manufacture are disclosed herein that may be used, in whole or in part to facilitate and/or support one or more operations and/or techniques for a docking system for a portable computing device, such as implemented in connection with one or more computing and/or communication networks, devices, and/or protocols discussed herein, for example. As used herein, "portable computing device." "mobile device," "handheld device," or like terms may be used interchangeably and refer to any kind of special purpose computing platform and/or apparatus that may from time to time have a position or location that changes. In some instances, a portable computing device may, for example, be capable of communicating with other devices, mobile or otherwise, through wireless transmission or receipt of information according to one or more communication protocols. As a way of illustration, special purpose portable computing devices may include, for example, cellular telephones, smart telephones, personal digital assistants (PDAs), laptop computers, personal entertainment systems, gaming devices, tablet personal computers (PC), personal audio or video devices, personal navigation devices, or the like. It should be appreciated, however, that these are merely examples of portable computing devices that may be used, at least in part, to implement one or more operations and/or techniques for a docking system.

As alluded to previously, portable computing devices, such as tablet computing devices, for example, may be protected from damage via placement of a computing device within an enclosure while the device is deployed in an operational environment. Operational environments may include, but are not limited to, offices, hospitals, industrial and/or administrative settings, business establishments, as well as a wide variety of other types of environments, virtually without limitation. Thus, in many instances, a portable computing device operating within a protective enclosure may comprise a particularly effective workplace tool due, at least in part, to its ability to provide instantaneous computing power to numerous situations. However, a need to occasionally dock a portable computing device, while within a protective enclosure, to a particular docking system may represent a drawback to the convenience associated with utilizing such computing devices.

For example, in a factory environment, a portable computing device may be utilized to allow a user, such as a factory equipment operator, to enter a number of parameters collected at various locations within the factory. At times, the user may dock or return the portable computing device to a docking system to permit collected parameters to be processed by, for example, more capable, fixed computing stations, such as a mainframe server, for example. However, if the user is required to interact with the portable computing device while the device is connected to a docking system, certain manipulations of the portable computing device may not be easily accomplished. For example, if a user selects to display content, such as parameters, forms, etc., utilizing a first display mode, such as a landscape mode, transition to a second display mode, such as to a portrait mode may involve reorienting and/or rearranging hardwired connections, for example.

In addition, it is recognized that particular portable computing devices may be compatible with certain particular types or brands of docking systems. In some instances, connecting a portable computing device with incompatible or mismatched docking system equipment may, for example, damage a portable computing device, docking system, or both. Accordingly, a portable computing device user operating in a large factory, hospital, university, for example, may be required to travel a significant distance simply to find a docking system compatible with his or her particular portable computing device.

Another example may relate to a use of portable computing devices operating as point-of-sale terminals in a retail setting. In such instances, one or more retail staff members may, for example, be required to periodically remove portable computing devices from order counters or other forward areas of the retail establishment so that the portable computing devices can be securely stored at the close of a business day. However, users may determine that removal of portable computing devices from protective enclosures, as well as detaching chip and pin readers and/or other ancillary devices from the portable computing device, comprises a burdensome and/or time-consuming task. Additionally, such attaching and reattaching of ancillary devices, as well as charging devices, which may occur several times per day, may give rise to undue deterioration of device connectors, receptacles, cables, etc.

Further, portable computing devices operating in retail environments, for example, may be vulnerable to theft by unruly and/or unscrupulous individuals. Thus, a retail business owner or other personnel, for example, may secure a portable computing device to a relatively fixed object utilizing cable and lock mechanism, for example. However, such physical security measures may be easily compromised by surreptitiously obtaining a key, for example, by severing a cable, or compromised (e.g., stolen) by other means. In such instances, theft of portable computing devices may not only represent loss of physical assets, such as the portable computing device itself, but may also represent a loss of valuable trade secrets, such as proprietary software, proprietary configuration files, employee passwords, and so forth.

Accordingly, example embodiments may provide a docking system that alleviates many of the drawbacks and vulnerabilities of conventional portable computer docking systems. In particular embodiments, a docking system for a portable computing device, such as a handheld tablet computing device, for example, may permit the portable computing device to be easily disengaged and rotated, in a plane, counterclockwise, clockwise, or inverted, so as to accommodate any number of computing applications that display parameters in portrait mode or landscape mode, for example. In addition, embodiments may facilitate a portable computing device, operating within a protective enclosure, to be docked to a large variety of compatible docking assemblies, which may permit secure communication through a wired network interface, for example, to provide charging of onboard batteries without requiring a user to physically insert a cable into a receptacle of the computing device, which may be termed as "cable-free" charging. In particular embodiments, a docking system for a portable computing device may additionally comprise, for example, security features that may sufficiently reduce the likelihood of theft of the computing device but without involving bulky and/or unwieldy cables and/or keyed locks, or other easily-defeated security measures.

In view of the above, FIG. 1 is a perspective view of an example docking system or docking arrangement comprising a portable computing device within an enclosure, such as portable computing device 150 within an enclosure 120. In embodiments, such as embodiment 100, enclosure 120 may be secured to a case mount (not shown in FIG. 1) which, in turn, may be fixedly secured to base mount 450 according to an embodiment. Base mount 450 may cooperate with vertical arms 131 of stand 130 to provide a means of docking portable computing device 150, which may facilitate communications with a wired network, facilitate charging of an onboard battery, and so forth. As described in detail with respect to FIG. 2 and others herein, for example, base mount 450 may be placed into physical contact with a case mount (not shown in FIG. 1), which may be attached to a case side of enclosure 120. In particular embodiments, by fixedly securing enclosure 120 to base mount 450, via a case mount, portable computing device 150 operating within enclosure 120, may be permitted to rotate or flip about axis 135 of stand 130. For example, in a possible embodiment, such as in a kiosk of retail establishment, portable computing device 150 may display an order listing, for example, showing items ordered by a customer. Store personnel may then turn or flip enclosure 120 about axis 135 in order to permit a customer to view and/or interact with a display of portable computing device 150. Such interaction may include reviewing a transaction, approving a transaction, electronically signing at an appropriate location on a display of portable computing device 150, and so forth.

It should be noted that enclosure 120 is merely an example enclosure, which may enclose a tablet computing device. In other embodiments, enclosure 120 may accommodate other electronic devices, for example, such as other types of displays and/or devices that provide user interfaces, for example, without necessarily providing "computing" capabilities per se.

Figure 2:
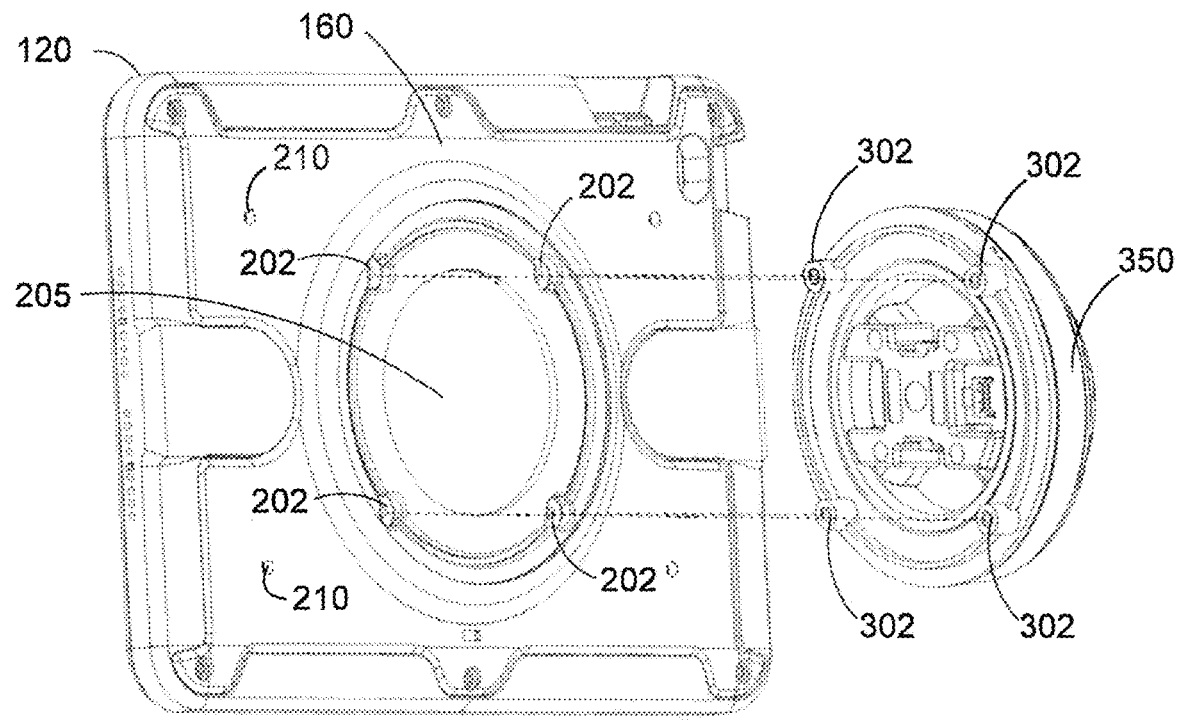
FIG. 2 is a perspective view of an example portable computing device enclosure, such as that of FIG. 1, attaching to an enclosure side of a case mount of a docking system, according to an embodiment.

FIG. 2 is a perspective view of an example portable computing device enclosure of FIG. 1 attaching to an enclosure side of case mount 350 of a docking system according to an embodiment 200. In embodiment 200, one or more screw holes, which may comprise four screw holes, referenced generally at 202, are shown as being capable of mating with corresponding screw bosses 302 of case mount 350. Although not explicitly indicated in FIG. 2, case mount 350 may comprise, for example, a port, a cable, or other type of wired connection, which may facilitate communication with a portable computing device, such as within portable computing device enclosure 120. Case side 160 of enclosure 120 may additionally include screw holes 210 which may, for example, accommodate attachment of a hand and/or shoulder strap, for example, D-ring fasteners, and so forth. In embodiments, use of a hand and/or shoulder strap may permit portable computer device 150, for example, to be securely carried from place to place.

In embodiments, case mount 350 may be capable of facilitating and/or supporting communications with a variety of portable computing devices, such as tablet computing devices, for example. Accordingly, case mount 350 may comprise signal conditioning and/or other electronics, which facilitate and/or support communication with, for example, tablet computing devices manufactured by the Samsung Company of South Korea, tablet computing devices manufactured by Apple® Incorporated, of Cupertino California, and/or tablet computing devices manufactured by other entities. Accordingly, portable computing device 150 may comprise any display and/or computing device. In certain embodiments, case plate 205 of portable computing device enclosure 120 may comprise a common base plate capable of being interchanged with differently sized portable computing device enclosures. Thus, case mount 350 may comprise a capability to communicate with various portable computing devices, including tablet computing devices comprising various case sizes. By way of example, but not limitation, in some instances, case sizes of approximately 250.0 mm×180.0 mm (9.7 inch×6.9 inch), 230.0 mm×160.0 mm (9.0 inch×6.2 inch), and/or 200.0 mm×130.0 mm (7.7 inch×5.2 inch), 200.0 mm×120.0 mm (7.7 inch×4.8 inch) may be used herein. It should also be noted that in particular embodiments, a portable computing device may not be disposed within an enclosure, such as enclosure 120, for example. In such instances, a case mount, such as case mount 350, may be secured to a removable panel of the portable computing device (which may include an example where the case mount is secured to attachment features directly accessible on the surface of the portable computing device itself).

In particular embodiments, such securing of case side 160 of enclosure 120 to an enclosure side of case mount 350 may be facilitated by way of screws or other types of fasteners, which may provide compatibility with VESA (Video Electronics Standards Association) mounting brackets. Although four screw-type fasteners may be fitted and/or mated with screw bosses 302 of an enclosure side of case mount 350, other example embodiments may utilize a different number of screw-type fasteners and/or screw bosses, or other types of fasteners, for example, to fixedly attach or secure an enclosure side of case mount 350 to, for example, case side 160 of enclosure 120. For example, an enclosure side of case mount 350 may be attached or secured to case side 160 of enclosure 120 utilizing three or fewer screw holes or may utilize a greater number of screw-type fasteners, such as five or greater screw-type fasteners, for example.

As described in detail herein, case mount 350 may be removably secured to base mount 450 by way of one or more notches which may operate to physically connect with latches of base mount 450. Base mount 450 may attach or couple to a relatively fixed and/or stable surface, such as a wall or a desk, or may be attached to a base or stand, just to illustrate possible examples.

Figure 3:
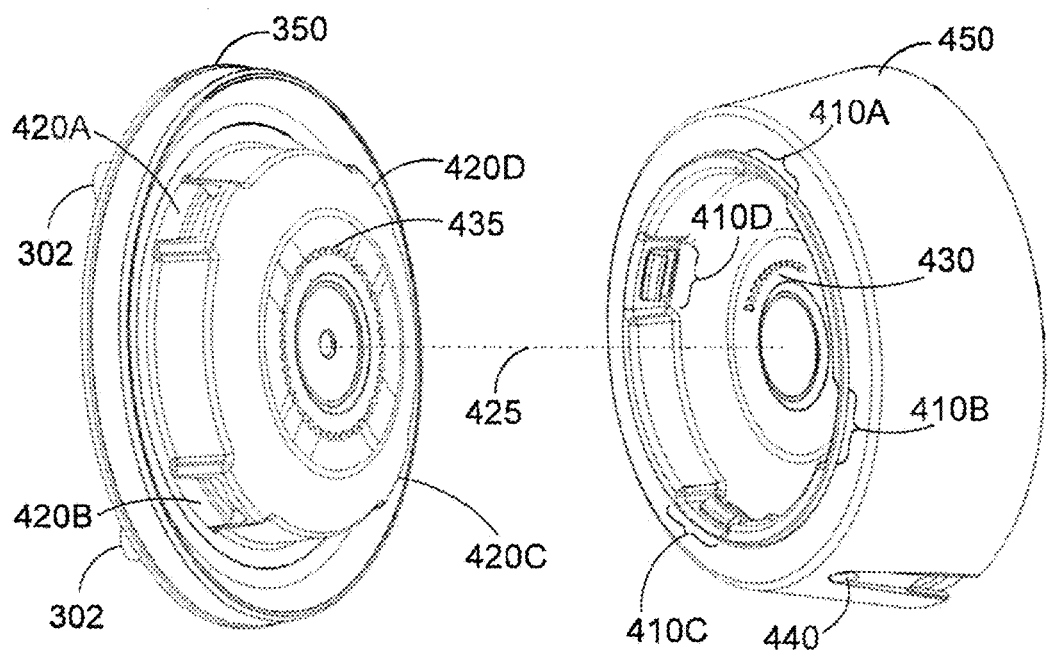
FIG. 3 is a perspective view showing an example base side of a case mount attaching to a case side of base mount of a docking system, such as the base mount of FIG. 2, according to an embodiment.

FIG. 3 is a perspective view showing an example base side of a case mount, such as case mount 350 of FIG. 2, for example, attaching to a case side of base mount of a docking system, such as base mount 450 of FIG. 2, according to an embodiment 300. As shown in FIG. 3, screw bosses 302 are present at an enclosure side of case mount 350 of FIG. 3. In embodiments, case mount 350 may be referred to as a "male" mount, and base mount 450 may be referred to as a "female" mount. As shown in FIG. 3, case mount 350 may comprise, for example, one or more attachment means, such as latches 410A-410D capable of fixedly securing case mount 350 to base mount 450, such as via one or more corresponding notches 420A-420D, for example. In embodiments, as the base side of case mount 350 is brought toward the case side of base mount 450, such as along dotted line 425, four of latches 410A-410D may couple to four (corresponding) notches 420A-420D, wherein latches and notches are disposed in one of four quadrants each disposed at approximately 90.0° increments. However, it should be understood that in other example embodiments, a different number of latches, and corresponding notches, may be used such as three or fewer latches and corresponding notches, as well as five or more latches and corresponding notches, for example. In one particular embodiment, three latches and three corresponding notches may be utilized wherein latches and notches are each disposed at approximately 120.0° increments.

In particular embodiments, case mount 350 may comprise for example, a circular or round-shaped body having a plurality of contacts 435, and one or more notches 420A-420D. Also in particular embodiments, base mount 450 may comprise a plurality contact pins such as "pogo" pins 430 (further described with reference to FIG. 4) embedded therein and one or more latches 410A-410D. Case mount 350 may be matingly received by base mount 450 in a manner that engages latches 410A-410D with corresponding notches 420A-420D. In embodiments, when latches 410A-410D are engaged with corresponding notches 420A-420D, a plurality of contacts 435 are brought into physical contact with base mount contacts 430.

Additionally, although latches 410A-410D and notches 420A-420D are shown in the example of FIG. 3 as being spaced apart from one another by approximately 90.0° on an approximately circular surface of case mount 350, it should be understood that in other example embodiments different spacing and positioning may be employed. In embodiments 300 and 400, latch 410A may physically connect with or attach to notch 420A, latch 410B may physically connect with or attach to notch 420B, latch 410C may physically connect with or attach to notch 420C, and latch 410D may physically connect with or attach to notch 420D, for example. In particular embodiments, utilizing three or four, for example, latches and notches disposed around base mount 450 and case mount 350 may operate to facilitate uniform clamping pressure to secure base mount 450 to case mount 350. As another example, the physical connection between latches and notches need not exert a uniform clamping pressure, but the physical connection can be such that the latches and notches may cooperate so as to restrict case mount 350 from being removed from base mount 450 unless the latches are actuated in a manner that permits removal of the case mount 350 from the base mount 450 (e.g., actuation via solenoids as discussed below).

As shown in FIG. 3, if case mount 350 and base mount 450 are connected to one another, such as by securing latches 410A-410D with corresponding ones of notches 420A-420D, base mount contacts 430 may connect with contacts 435, for example, of a contact group of case mount 350. In particular embodiments, as described in reference to FIG. 3 and others herein, base mount contacts 430 may be capable of physically connecting to one of four contact groups divided into four electrically independent quadrants of case mount 350. For example, in certain embodiments, a single set of contacts of base mount 450 may connect with contacts of a contact group of case mount 350 while case mount 350 is oriented at one of four electrically divided quadrants, oriented at, for example, at approximately 0.0°, 90.0°, 180.0°, and 270.0°, for example. Accordingly, if a case mount is mounted, for example, to a portable computing device enclosure, such as portable computing device enclosure 120 as shown in FIG. 1, the portable computing device enclosure may be rotated in a plane so as to be oriented, for example, at 0.0°, 90.0°, 180.0°, or 270.0°, thus corresponding to use of a portable computing device in one of four orientations, which may include a portrait mode, a landscape mode, an inverted mode (e.g., upside down), and so forth.

In embodiments, base mount 450 may comprise a manual lock/unlock feature 440. Accordingly, responsive to insertion of, for example, a rod or cylinder-shaped tool, perhaps accompanied by applying clockwise or counterclockwise rotation, for example, latches 410A-410D may be manually disengaged from corresponding notches 420A-420D, for example. In particular embodiments, base mount 450 may be unlatched or disengaged from case mount 350 via a computer-implemented method or application that runs on portable computing device 150, for example.

Figure 4:
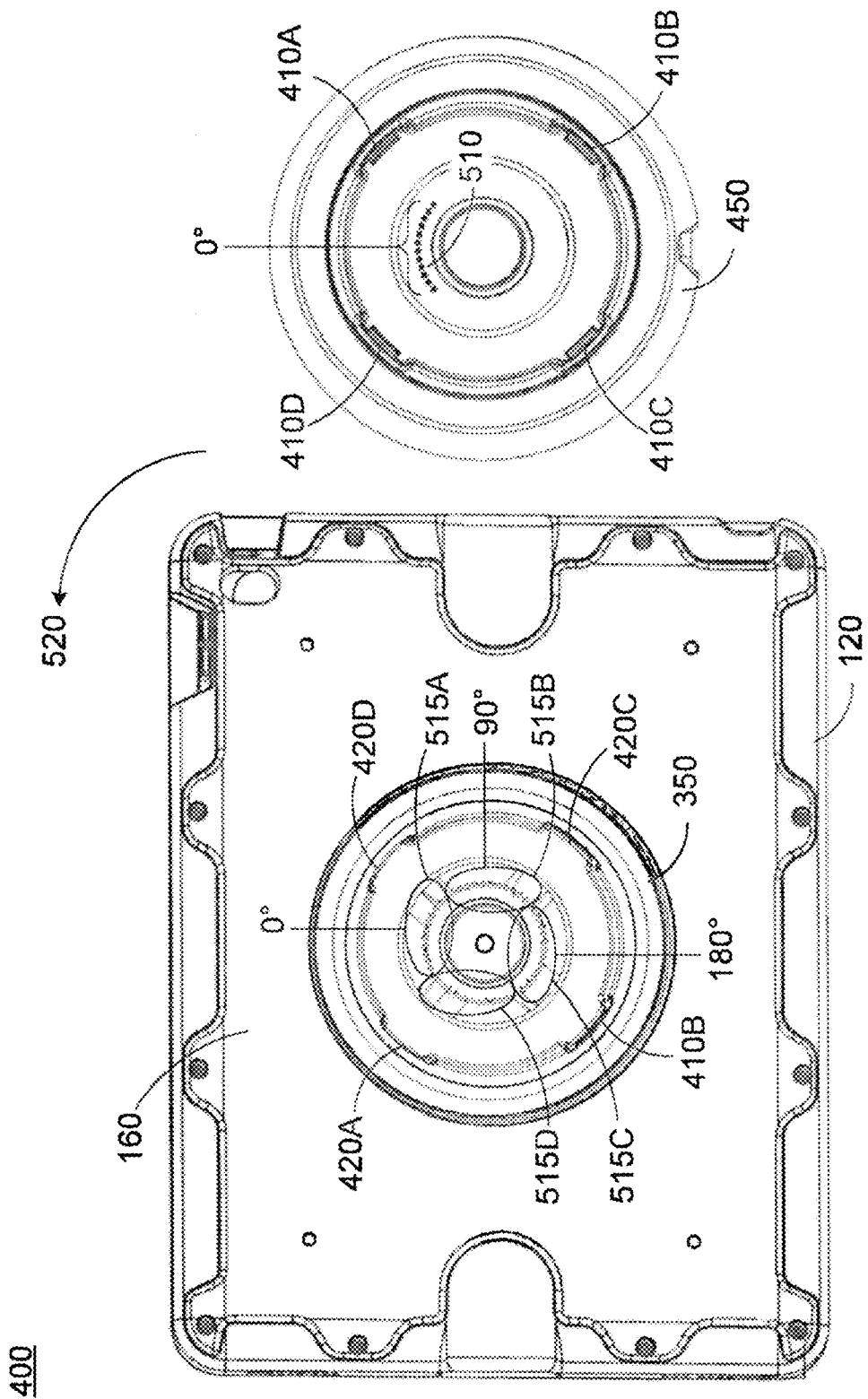
FIG. 4 is a plan view of an example base side of a case mount and a case side of a base mount of a docking system, according to an embodiment.

FIG. 4 is a plan view of an example base side of a case mount and a case side of a base mount of a docking system, according to an embodiment 400. As shown in FIG. 4, case mount 350 is secured to case side 160 of portable computing device enclosure 120 to correspond with operation of an enclosed portable computing device in a landscape display mode. Additionally, although not shown in FIG. 4, one or more cables or other wired connections may permit communication and signaling between an enclosed portable computing device and case mount 350. If case mount 350 and base mount 450 are connected to one another, base mount contacts 510 may be connected to contacts of contact group 515A. To maintain connection between base mount contacts 510 and contact group 515A, latches of base mount 450, as represented by latch 410A, may be engaged with and/or fully seated within notches of case mount 350, as represented by notch 420A. Base mount contacts 510 may comprise electrical contacts to provide, for example, electrical power to circuitry of case mount 350 and portable computing device 120 as well as a serial or parallel bus interface, for example.

In particular embodiments, operations and/or functions of contact group 515A, shown in a first quadrant of a surface of case mount 350, for example, may be replicated in electrically divided/independent quadrants comprising contact groups 515B, 515C, and 515D. Thus, in certain embodiments, case mount 350, which may be attached to portable computing device enclosure 120, may be disengaged from base mount 450 and rotated 90.0°, as represented by arrow 520, and reengaged with base mount 450 to permit contact group 515B to come into contact with base mount contacts 510. Likewise, case mount 350 may be disengaged from base mount 450 and rotated an additional 90.0° to permit contact group 515O to come into contact with base mount contacts 510. Further, case mount 350 may be disengaged from base mount 450 and rotated an additional 90.0° so as to permit contact group 515D to come into contact with base mount contacts 510. In addition, as case mount 350 is rotated relative to base mount 450, latches of case mount 350, as represented by latch 410A, remain capable of coupling with corresponding notches of base mount 450.

In particular embodiments, base mount contacts 510 may comprise spring-loaded contacting pins such as "pogo" pins comprising relatively slender cylinder-shaped pins, wherein a top and/or distal portion of a pogo pin is capable of extension and/or retraction relative to a base portion of the pin. However, it should be noted that base mount contacts 510 may utilize other approaches toward maintaining a sufficient and/or suitable electrical connection with individual contacts of contact groups 515A-515D. In addition, it should be noted that although 12 of base mount contacts 510 are indicated in the example of FIG. 4, it should be understood that in other example embodiments different numbers of contacts in a contract group may be employed, such as fewer than 12 contacts, such as 4, 6, 8, or 10 contacts, as well as greater than 12 contacts, such as 16 contacts, 20 contacts, virtually without limitation. In addition, it should be noted that although operations and/or functions of contact group 515A may be replicated by like or similar operations and/or functions of contact groups 515B-515D, other example embodiments may embrace any number of replications by contact groups, such as fewer than 3 replications, for example, or greater than 4 replications, such as 5 or more, for example. Further, although base mount contacts 510 and contact groups 515A-515D may be organized into electrically divided quadrants comprising an approximately circular arc, other example embodiments may embrace contacts arranged in any geometry, such as a two-dimensional patch, in which contacts are arranged in a plurality of rows and/or columns, virtually without limitation. Additionally, although case mount 350 and base mount 450 are indicated in FIG. 4 (for example) as comprising a substantially circular shape, other example embodiments may comprise different shapes, such as substantially triangular shapes, substantially rectangular shapes, elliptical shapes, and so forth. For example, the contact array may also exhibit multiple concentric or otherwise radially separated repeating patterns that are arranged to create a sufficient number of useful connections between the case mount 350 and base mount 450.

Figure 5:
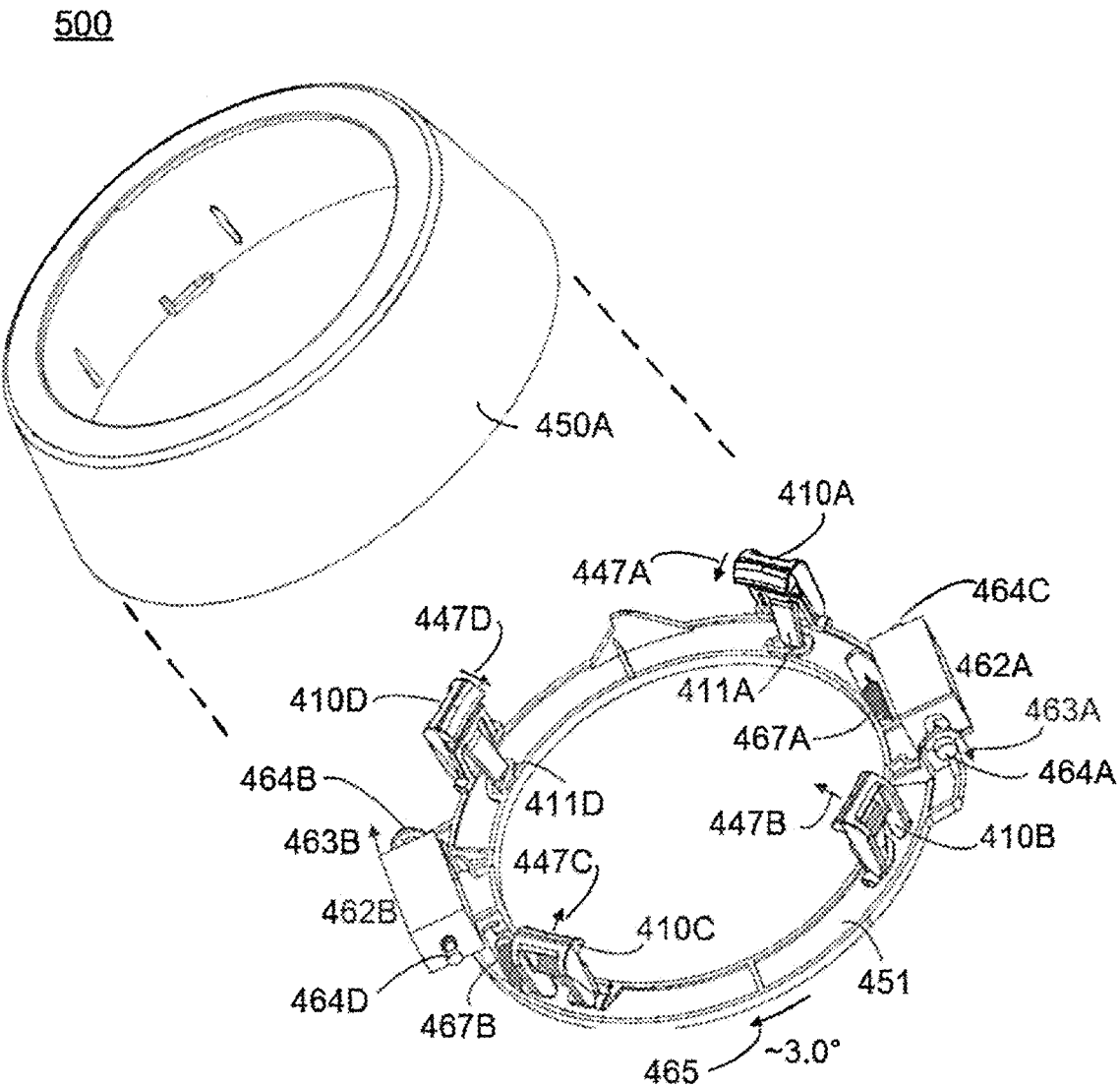
FIG. 5 is a perspective view of an example cam ring, latch, and solenoid actuator, which may permit undocking of the case portion and the base portion of FIG. 4, according to an embodiment.

FIG. 5 is a perspective view of an example cam ring comprising, for example, latches and solenoid actuators, which may permit undocking of a portable computing device within an enclosure from a base mount 450 of a docking system, such as via a case mount 350 and a base mount, according to an embodiment 500. In the embodiment of FIG. 5, latches 410A-410D, which may be positioned around the perimeter of cam ring 451 within housing 450A of a base mount, such as base mount 450, for example. Latches 410A-410D may be coupled to cam ring 451, such as by tab 411A of latch 410A and tab 411D of latch 410D. Latches 410B and 410D may additionally comprise tabs similar to tabs 411A and 411D, although not shown explicitly in FIG. 5 for reasons of clarity. It should be noted that latches 410A-410D may couple to cam ring 451 via other attachment means.

In the embodiment of FIG. 5, sufficient electrical current flowing within a coil, for example, of solenoid actuators 462A and 462B, may facilitate movement of fasteners 464A and 464B along respective longitudinal axes of bodies of solenoid actuators 462A and 462B, respectively. In a particular embodiment, action of solenoid actuator 462A in the direction of arrow 463A and solenoid actuator 462B in the direction of arrow 463B may facilitate rotational movement of cam ring 451 in relation to latches 410A-410D by approximately 3.0° in a clockwise direction, as referenced via arrow 465. Responsive to rotational movement of cam ring 451, tab 411A, for example, may be drawn towards the body of latch 410A, and tab 411D may be drawn towards the body of latch 410D. In response to movement of tab 411A and 411D, as well as similar tabs of latches 410B and 410C (not shown in FIG. 5), latches 410A-410D may be drawn toward a central axis of cam ring 451 such as indicated via arrows 447A, 447B, 447C, and 447D. In embodiments, an inward drawing of latches 410A-410D may facilitate engagement of, for example, case mount 350 of FIG. 5 by latches 410A-410D. In the embodiment of FIG. 5, after an electrical current is removed from solenoid actuators 462A and 462B, springs 467A and 467B, which may be anchored to a housing or structure adjacent to cam ring 451, for example, may return cam ring 451 to its previous position, such as by rotating cam ring 451 by approximately 3.0° in a counterclockwise direction. In an embodiment, by rotating cam ring 451 by approximately 3.0° in a counterclockwise direction may, for example, permit movement of latches 410A-410D in a direction opposite arrows 447A, 447B, 447C, and 447D. Such movement of latches 410A-410D may thus facilitate disengagement of base mount 450 from case mount 350.

In another embodiment, fasteners 464A and 464B of solenoid actuators 462A and 462B, respectively, may operate to hold a solenoid slug into position within the body of the solenoid and against a tensioned spring, wherein the spring operates to apply a force along a longitudinal axis of a solenoid actuator. In such an embodiment, orientation of solenoid actuators 462A and 462B may be reversed from the orientation shown in FIG. 5. Accordingly, in such embodiment, after solenoid actuators 462A and 462B are energized utilizing a sufficient electrical current flowing through the coil of the solenoid, for example, solenoid actuator longitudinal shafts 464C and 464D may apply a force to a raised wall (not shown on cam ring 451 of FIG. 5), thereby rotating cam ring 451 by, for example, approximately 3.0° in a counterclockwise direction. In other embodiments, cam ring 451 may be rotated by angles less than 3.0°, such as 1.0°, 2.0°, for example, or maybe rotate by angles greater than 3.0°, such as 4.0°, 5.0°, and so forth.

It should be noted that example embodiments may embrace a variety of approaches, other than that of the embodiment of FIG. 5, which may bring about the engagement and disengagement of case mount 350 from base mount 450. For example, in an embodiment, a single solenoid actuator or multiple solenoid actuators (such as 3 solenoid actuators, 4 solenoid actuators, and so forth) may be utilized to facilitate movement of cam ring 451. It should be noted that example embodiments may embrace any type of actuator or other type of device that facilitates movement of cam ring 451. In addition, example embodiments may utilize a single spring, such as spring 467A, to permit cam ring 451 to return to a previous position (e.g. approximately 3.0° in a counterclockwise direction) after current through solenoid actuators 462A and 462B has been removed. Further, although embodiment 600 describes rotational movement of cam ring 451 by approximately 3.0° to facilitate engagement of latches 410A-410D with corresponding notches, other example embodiments may embrace movement of cam ring 451 by different angles, such as angles less than 3.0°, such as 1.0°, 2.0°, and so forth, as well as angles greater than 3.0°, such as 5.0°, 10.0°, and so forth.

In particular embodiments, latches 410A-410D may engage with notches 420A-420D via a locking approach rather than by way of application of clamping pressure to notches 420A-420D. For example, in an embodiment, latch 410A, for example, may engage with notch 420A, wherein latch 410A may be positioned on or over an extending lip of notch 420A. In a particular embodiment, one or more springs, for example, may facilitate deflection of the latch, during engagement and/or disengagement of latch 410A with notch 420A. After such deflection, for example, latch 410A may come to rest under the extending lip of notch 420A. In embodiments, if a user attempts to separate case mount 350 from base mount 450, proximity of latch 410A with notch 420A, for example operates to separation of case mount 350 from base mount 450. In particular embodiments, if one or more solenoid is utilized to actuate the cam ring, latch 410A, for example, may be moved outward, such as in a direction opposite arrows 447A, thus permitting latch 410A to become disengaged from a lip of notch 420A, thereby permitting case mount 350 to be separated from base mount 450.

In particular embodiments, one or more magnets positioned around cam ring 451 may provide an additional approach toward securing base mount 450 to case mount 350. In embodiments, magnets may be built into housing 450A so as to provide attraction to corresponding metallic elements of case mount 350. In particular embodiments, use of magnets in base mount 450 may facilitate case mount 350 and enclosure 120 to be held into place instead of or in addition to engaging latches 410A-410D with one or more of notches 420A-420D.

Figure 6:
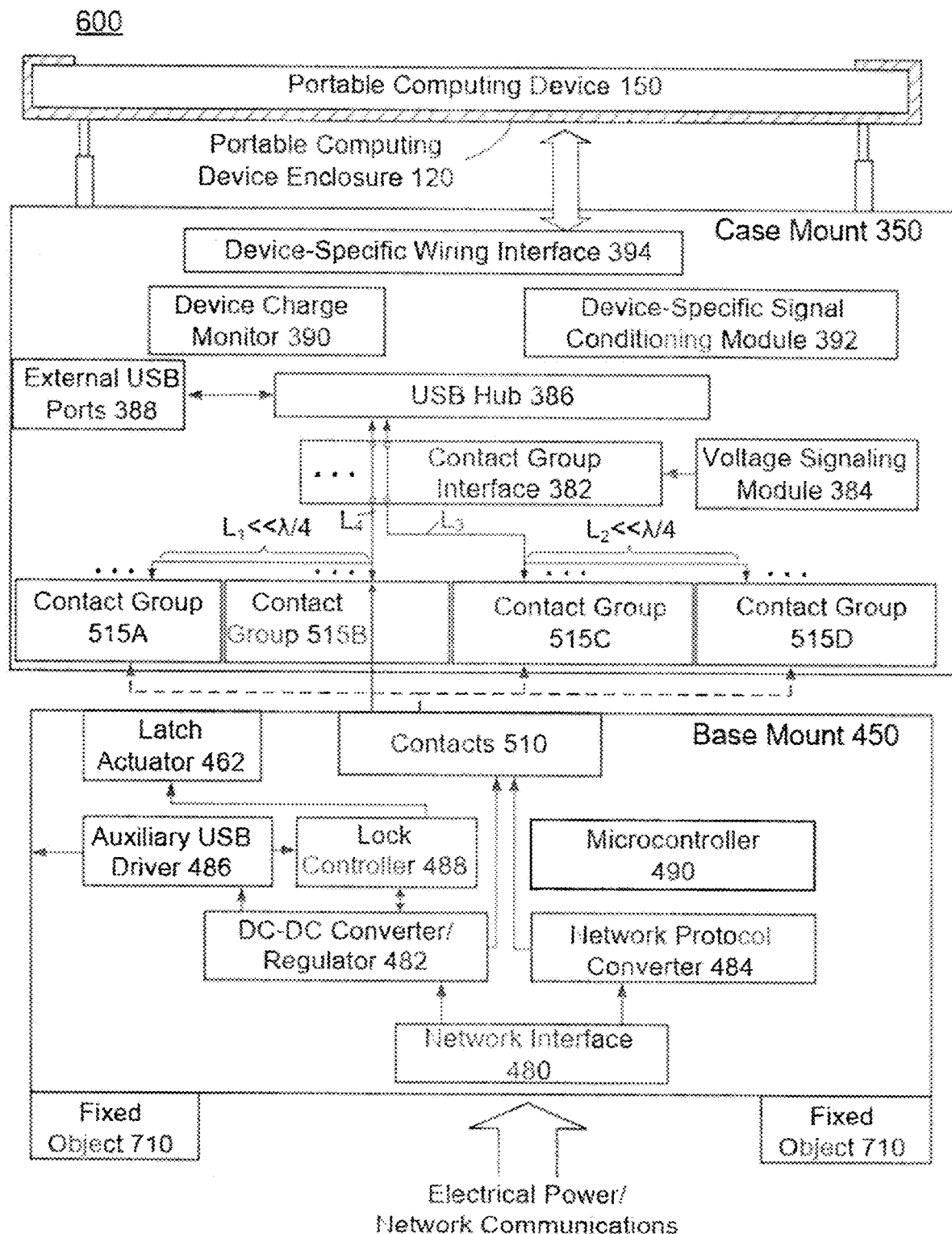
FIG. 6 is a block diagram of example electronics modules and/or components comprising a docking system for a portable computing device according to an embodiment.

FIG. 6 is a block diagram of electronics modules and/or components comprising a docking system for a portable computing device according to an embodiment 600. In the embodiment of FIG. 6 base mount 450 may be mounted or otherwise fastened to a fixed object 710. In embodiments, fixed object 710 may represent a wall, article of furniture (e.g. wall, desk, bookcase, etc.), or any other type of relatively fixed and/or stable object. Base mount 450 may comprise network interface 480, which may represent any type of network and/or subnetwork which may communicate, for example, via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

In the embodiment of FIG. 6, base mount 450 may receive electrical power, such as in the form an approximately 24-volt signal utilizing one or more conductors. In a particular embodiment, wherein network interface 480 comprises an Ethernet interface, base mount 450 may receive an approximately 24.0 V signal utilizing Power over Ethernet, in accordance with one or more revisions of IEEE 802.3af-2003, IEEE 802.3 at-2009, or the like, available from the IEEE standards group. In embodiments, network interface 480 may utilize a single conductor and ground pair, or may utilize a number of conductors in accordance with voltage and current requirements of base mount 450, case mount 350, and/or portable computing device 150, for example. In other embodiments, base mount 450 may receive alternating current and/or direct current utilizing other types of power sourcing equipment.

Network interface 480 of FIG. 6 may direct received alternating and/or direct current electrical power in the direction of DC-DC converter/regulator 482. In embodiments, DC-DC converter/regulator 482 may comprise circuitry to convert and/or to regulate received electrical power to comprise voltage and/or current parameters suitable for use by, for example, network protocol converter 484, microcontroller 490, lock controller 488, auxiliary Universal Serial Bus (USB), as well as voltage and/or current parameters suitable for use by components of the case mount 350 and portable computing device 150, for example. In example embodiments, DC-DC converter/regulator 482 may provide output signals comprising voltages of 5.0 VDC, 12.0 VDC. However, other example embodiments may embrace voltage and/or current conversion/regulation so as to provide any number of DC and/or AC voltages, such as voltage signals of less than 5.0 volts, voltage signals greater than 12.0 volts. In embodiments, DC-DC converter/regulator 482 may perform voltage up-conversion to provide voltage signals greater than 24.0 VDC, such as 28.0 VDC, 36.0 VDC, 48.0 VDC, and so forth, virtually without limitation.

Network protocol converter 484 may operate to facilitate protocol conversion between Ethernet and USB, although other example embodiments may embrace protocol conversion between any number of serial and/or parallel data stream conversions. Although not explicitly shown in FIG. 6, network protocol converter 484 may execute conversion of binary digital signals between auxiliary USB driver 486 and network interface 480. In embodiments, auxiliary USB driver 486 may facilitate communications with ancillary USB devices. In an embodiment, auxiliary USB driver 486 may communicate with a radiofrequency identification (RFID) card reader, not shown in FIG. 6, which may facilitate activation/deactivation of lock controller 488. Lock controller 488 may be capable of actuating latch actuator 462, in a manner described in reference to FIG. 5, for example, to move cam ring 451 to permit latches 410A-410D to disengage from corresponding notches of a case mount, for example. Accordingly, a user may be provided with the capability of unlocking case mount 350 from base mount 450 by responsive to receipt of a signal from a compatible RFID card reader. It should be noted that compatible RFID card readers may operate at any suitable frequency, such as 100.0 kW, 13.56 MHz, 900.0 MHz, or at virtually any other frequency band.

Latches 410A-410D may also be disengaged and or engaged from corresponding notches of a case mount, for example, responsive to receipt of an instruction generated by a computer program operating, for example, on portable computing device 150. In addition, in particular embodiments, prior to release of latches 410A-410D, lock controller 488 may notify DC-DC converter/regulator 482 to remove power from base mount contacts 510. In certain embodiments, removal of power, such as IDt power, for example, may minimize or reduce likelihood of electrical arcing between one or more of base mount contacts 510 and one or more contacts of contact group 515A-515D. Such arcing may be prone to occurring if an electrical current, such as may flow through one of contact groups 515A-515D to one or more of base mount contacts 510, for example, is interrupted, such as by electrically disconnecting one of contact group 515 from base mount contacts 510.

Microcontroller 490 may direct operations of base mount 450. In embodiments, microcontroller 490 may comprise one or more computer processors coupled to one or more memory devices, which may provide one or more sources of executable computer instructions in the form physical states and/or signals (e.g., stored in memory states), for example. Microcontroller 490 may communicate with portable computing device 150 by way of base mount contacts 510, which may physically connect (e.g., via pogo pins) to contact group 515A, contact group 515B, contact group 515C, or contact group 515D, as described with reference to FIG. 4, for example. Accordingly, microcontroller 490 may communicate with case mount 350, which may be physically coupled or directly attached to portable computing device 150, as shown in FIG. 6, while case mount 350 and portable computing device 150 are oriented at 0.0°, 90.0°, 180.0°, or 270.0° as shown in FIG. 4.

As shown in FIG. 6, network protocol converter 484 of base mount 450 may communicate with case mount 350 utilizing, for example, a USB interface. Accordingly, in particular embodiments, as shown by dotted lines in FIG. 6, base mount contacts 510 may physically connect to one of contact groups 515A-515D, according to a desired electrically divided quadrant of case mount 350 with respect to base mount 450. In the embodiment of FIG. 6, when contact group 515B of case mount 350, for example, is utilized to communicate with base mount 450, as depicted via the solid line in FIG. 6, conductor Li may appear as a substantially open-circuit conductor, which may introduce parasitic capacitive effects, which may be capable of degrading USB signal quality. Similarly, when contact group 515C is utilized, conductor $L_2$ may appear as a substantially open-circuit conductor also capable of degrading USB signal quality. In addition, in particular embodiments, USB communications may occur at data rate of, for example, approximately 400.0 Mb per second, approximately 800.0 Mb per second, or higher bit rate. Accordingly, frequency components of transmitted data signals may comprise frequencies of approximately 400.0 MHz or higher frequencies, which may include approximately 800.0 MHz harmonics, approximately 1200.0 MHz harmonics, and so forth. Thus, conductor lengths, such as $L_1$ and/or $L_2$ may begin to approach a significant fraction of a free space wavelength of a signal frequency. In one example, for USB communications utilizing a data rate of 400.0 Mb/second, thus comprising frequency components of 400.0 MHz or higher, free-space wavelength may be calculated substantially in accordance with expression 1, below:

$$(3.0\times10^{10} \text{ cm/s})/(400.0\times10^{6}\text{/s})=75.0 \text{ cm} \quad (1)$$

Accordingly, a conductor comprising a length of 75.0 cm corresponds to the free-space wavelength of a 400.0 MHz signal. Thus, at least in particular embodiments, conductor lengths, such as $L_1$ and $L_2$, for example, of FIG. 6 comprise a length of less than one quarter wavelength ($\lambda/4.0$), or 75.0/4.0=18.75 cm (7.4 inches). By maintaining conductor length $L_1$, below a specified length, 400.0 Mb/second communications may be conducted between, for example, base mount 450 and USB hub 386, utilizing contact group 515B without significant parasitic effect from conductor $L_1$, for example. Similarly, by maintaining conductor length and $L_2$ below a specified length, 400.0 Mb/second communication speed conducted between, for example, base mount 450 and USB hub 386 utilizing contact group 515C without significant parasitic effects from conductor $L_2$, for example.

In certain embodiments, it may be advantageous to utilize conductor lengths equivalent to significantly smaller fractions, such as one-tenth of one-quarter ($\lambda/40$) of the free-space wavelengths of signal frequencies (e.g., 400.0 MHz), which may be computed substantially in accordance with expression 2, below:

(18.75 cm)/10.0=1.875 cm=0.738 inch

Thus, in particular embodiments, it may be advantageous to maintain conductor lengths within case mount 350, for example, to less than one-tenth of one quarter wavelength ($\lambda/4$), of a signal frequency. If conductor lengths comprise less than approximately $\lambda/40$, input signal impedance, such as input signal impedance computed or assessed at one of contact groups 515A, 515B, 515C, or 515D, for example, may facilitate a voltage standing wave ratio (VSWR) of less than 1.67:1.0. In other embodiments, conductor lengths maintained below approximately one-sixteenth of one-quarter wavelength of a signal frequency (e.g., $\frac{1}{16}$ of $\lambda/4$) may facilitate an input signal VSWR of less than, for example, 1.5:1.0. In other embodiments, VSWR of 2.0:1.0 may comprise an upper threshold, above which measures of signal quality, such as bit error rate arid signal plus noise and distortion (SINAD), may reach unacceptable levels, for example.

Further, in embodiments in which USB communications occurs at increased data communication speeds, such as 800.0 Mb per second, conductor lengths, such as conductor lengths within case mount 350, may be scaled accordingly so as to maintain an input signal VSWR of less than, for example, 1.5:1.0. In such an instance, just as an example, conductor lengths comprising $\frac{1}{16}$ of $\lambda/4$ (e.g., 0.934 cm or 0.369 inch computed for a signal frequency of 800.0 MHz) may facilitate an input signal VSWR of less than 1.5:1.0. In embodiments, strip line and/or microstrip transmission lines may be utilized to convey signals to and from contact group 515A, for example, to contact group interface 382, although it should be understood that other transmission line techniques may be employed. In embodiments, contact group interface 382 and USB hub 386 are positioned proximate with contact group 515B and contact group 5.5 C so as to allow conductor lengths L3 and L4 to be negligibly small in relation to free space wavelength ($\lambda$).

Case mount 350 may additionally comprise external USB ports 368, for example. In particular embodiments, external USB ports 388 may be coupled to a chip and/or pin reader, such as for use in a retail establishment, for example, a barcode reader, a magnetic stripe reader, and so forth, as may be appropriate for service and/or other types of environments wherein the portable computing device 150, for example, may be utilized. It should be noted that external USB ports 388 may operate to communicate with additional types of devices. Case mount 350 may further comprise voltage signaling module 384, which may comprise, for example, a signature resistor, which may provide an indication to microcontroller 490 of base mount 450 as to an operating voltage of portable computing device 150. For example, in one embodiment, if voltage signaling module 384 comprises an approximately 5.0 k$\Omega$ resistor, microcontroller 490 may instruct DC-DC converter/regulator to provide 12.0 V, just as a possible example, for use by portable computing device 150.

Case mount 350 may additionally comprise device-specific signal conditioning 392, which may adapt one or more discrete signals from base mount 450 to signals capable of being interpreted by portable computing device 150. For example, device-specific signal conditioning 392 may provide appropriate signal levels at, for example, appropriate timing intervals specific to portable computing device 150. Device-specific signal conditioning 392 may provide over-voltage protection to portable computing device 150 such as, for example, by terminating a voltage signal to portable computing device 150 that may bring about damage to the portable computing device, for example. In another embodiment, device-specific signal conditioning 392 may provide a signal to portable computing device 150 to indicate that an external USB port, such as one or more of external USB ports 388, for example, is to be powered by base mount 450 rather than portable computing device 150, just as an example. Case mount 350 may further comprise device charge monitor 390, which may, for example, monitor a rate of charging of portable computing device 150, which may ensure that portable computing device 150 does not consume electrical current at a rate beyond one or more specified limits. In addition, case mount 350 comprises device-specific wiring interface 394, in which conductors are arranged and/or organized into a cable suitable for use with portable computing device 150, In one example, device-specific wiring interface 394 provide communication with an Apple iPad® utilizing, for example, a "lightning" connector.

Figure 7:
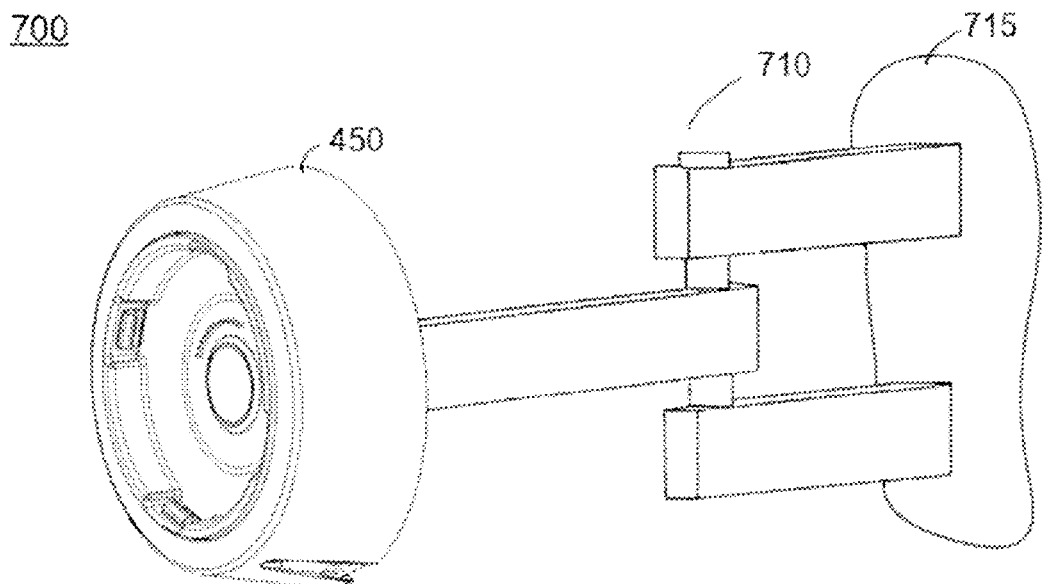
FIG. 7 is a view of an example base mount coupled to a folding arm extension according to an alternative embodiment.

FIG. 7 is a view of a base mount coupled to a folding arm extension according to an alternative embodiment 700. In the embodiment of FIG. 7, base mount 450 may be physically connected to a base side arm of folding arm extension 710. An opposite side of folding arm extension 710 may be physically connected to a wall, column, or other substantially fixed object, such as wall 715. Accordingly, base mount 450 may be capable of extending from wall 715, for example, as well as moving from side to side based, at least in part, on the capabilities of folding arm extension 710. It should be noted that although folding arm extension 710 comprises a single base side arm, which may connect to base mount 450, and comprises a pair of arms at an opposite side, which may connect to wall 715, other example embodiments may embrace any type of folding arm extension virtually without limitation.

Figure 8:
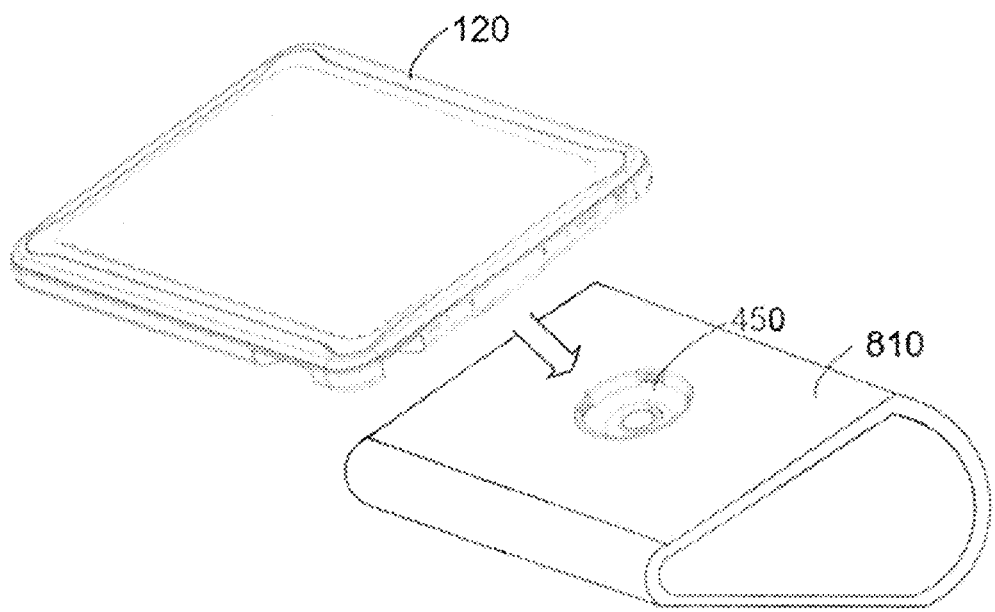
FIG. 8 is a view of an example base mount within a desk or other type of stand according to an alternative embodiment.

FIG. 8 is a view of a base mount within a desk or other type of stand according to an alternative embodiment 800. As shown in FIG. 8, base mount 450 may be disposed within a surface of base pedestal 810. Accordingly, notches of a case mount (e.g., case mount 350) may operate to physically connect with latches of a base mount (e.g., base mount 450). Such a configuration may be particularly beneficial for use in a retail environment, wherein base pedestal 810 may form at least a portion of a point-of-sale terminal utilized by customers and/or store personnel.

Figure 9:
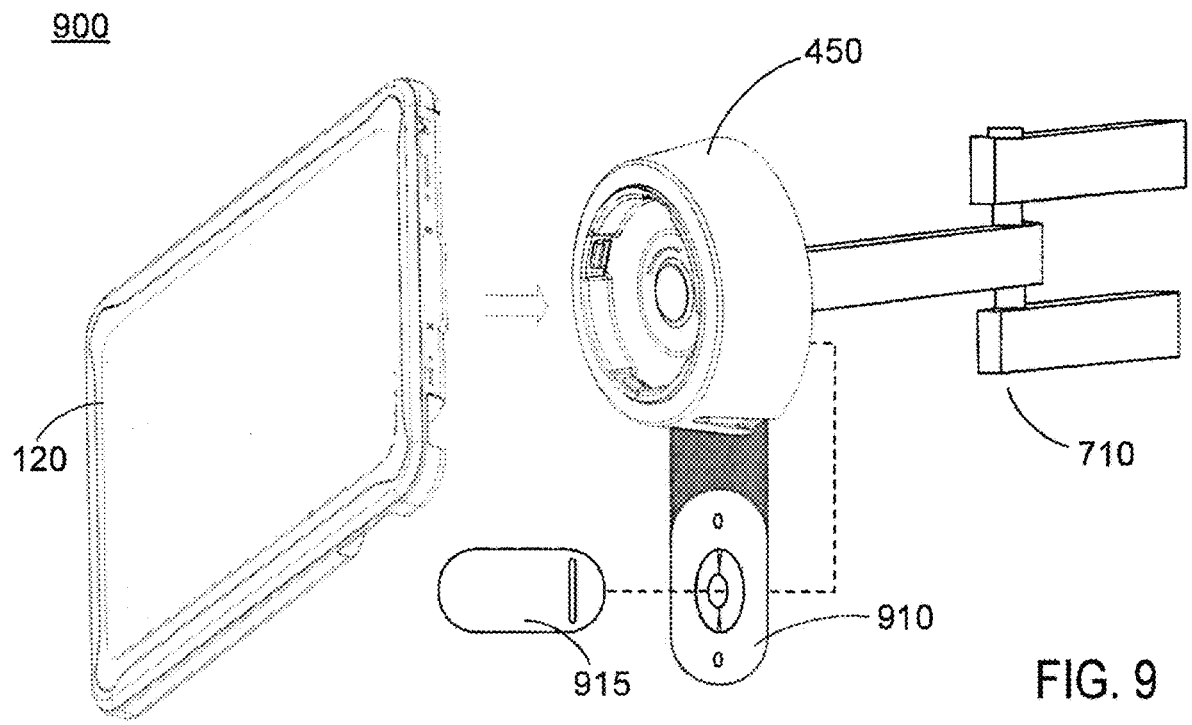
FIG. 9 is a view illustrating an example mount suitable for operation with Radio Frequency Identification (RFID) according to an embodiment.

FIG. 9 is a view illustrating a mount suitable for operation with Radio Frequency Identification (RFID) according to an embodiment 900. As indicated in FIG. 9, RFID mount 910 may be mounted beneath base mount 450. In embodiments, RFID mount 910 may accommodate a number of mounting features, which may permit RFID sensor 915 two comprise any one of a number of RFID sensors available from a number of manufacturers, such as Motorola®, Alien® Technology, Applied Wireless®, and so forth. Thus, in embodiments, a mounting feature of a desired RFID sensor may be utilized to secure RFID sensor 915 to mount 910 mounted beneath base mount 450. In embodiments, such a capability of mount 910 to accommodate a number of diverse types of RFID sensors may permit a customer to modify and RFID sensor without modifying, for example, base mount 450. Accordingly, in an environment that utilizes an installed base of RFID sensors for other types of equipment (e.g., RFID sensors to permit access control to sensitive areas of a factory) a user may be provided with the capability of employing identical, or at least compatible, RFID sensors to control latching and unlatching of enclosure 120 from base mount 450.

It should be noted that although RFID mount 910 is shown disposed directly beneath base mount 450, in other embodiments, mount 910 may be positioned at different locations, for a variety of reasons, such as ergonomics, handicapped access (Americans with Disabilities Act), speed, and/or ease of use.

Figure 10:
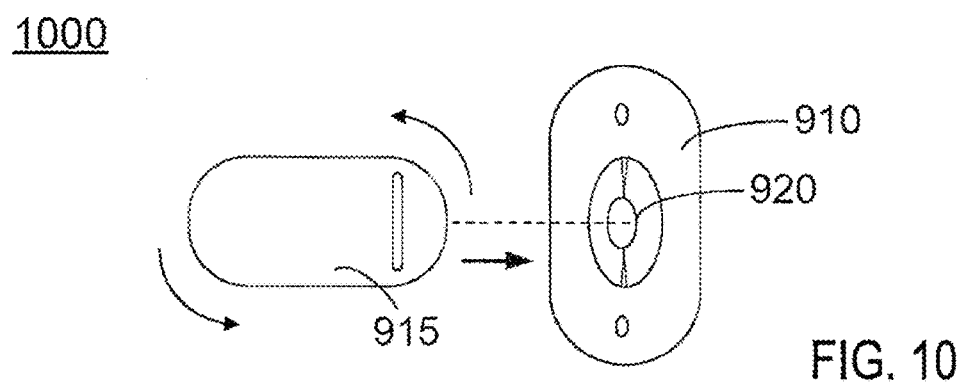
FIG. 10 is another view illustrating an example mount suitable for operation with RFID according to an embodiment.

FIG. 10 is another view illustrating a mount suitable for operation with RFID according to an embodiment 1000. In the embodiment of FIG. 10, a physical feature of RFID sensor 915 may be inserted into recess 920, and rotated counterclockwise, for example, which may permit RFID sensor 915 to be locked into recess 920, for example. In embodiments, cabling between RFID sensor and base mount 450 may be constructed so as to allow rotation of sensor 915 with respect to RFID mount 910.

Figure 11A:
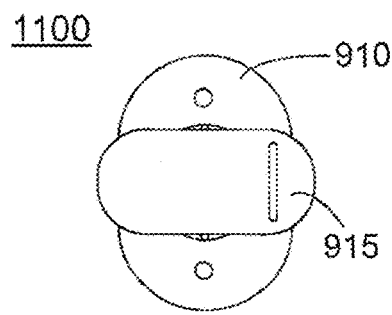
FIGS. 11A-11B is a view of an example mount suitable for use with RFID, showing first and second orientations, which may be rotated by the user, according to an embodiment.
Figure 11B:
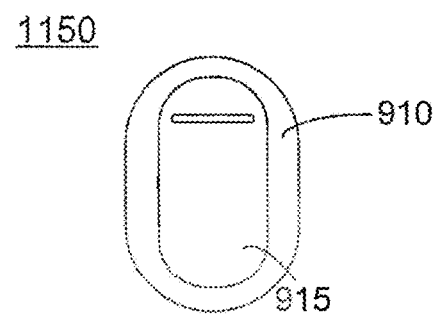

FIGS. 11A-11B is a view of a mount suitable for use with RFID, showing first and second orientations, which may be rotated by the user, according to embodiments. In embodiment 1100 (FIG. 11A), the axis of RFID sensor 915 is shown oriented at an angle of approximately 90.0° with respect to the axis of RFID mount 910. In embodiment 1150, (FIG. 11B) the axis of RFID sensor 915 is shown as oriented so as to at least approximately coincide with the axis of RFID mount 910.

Figure 12A:
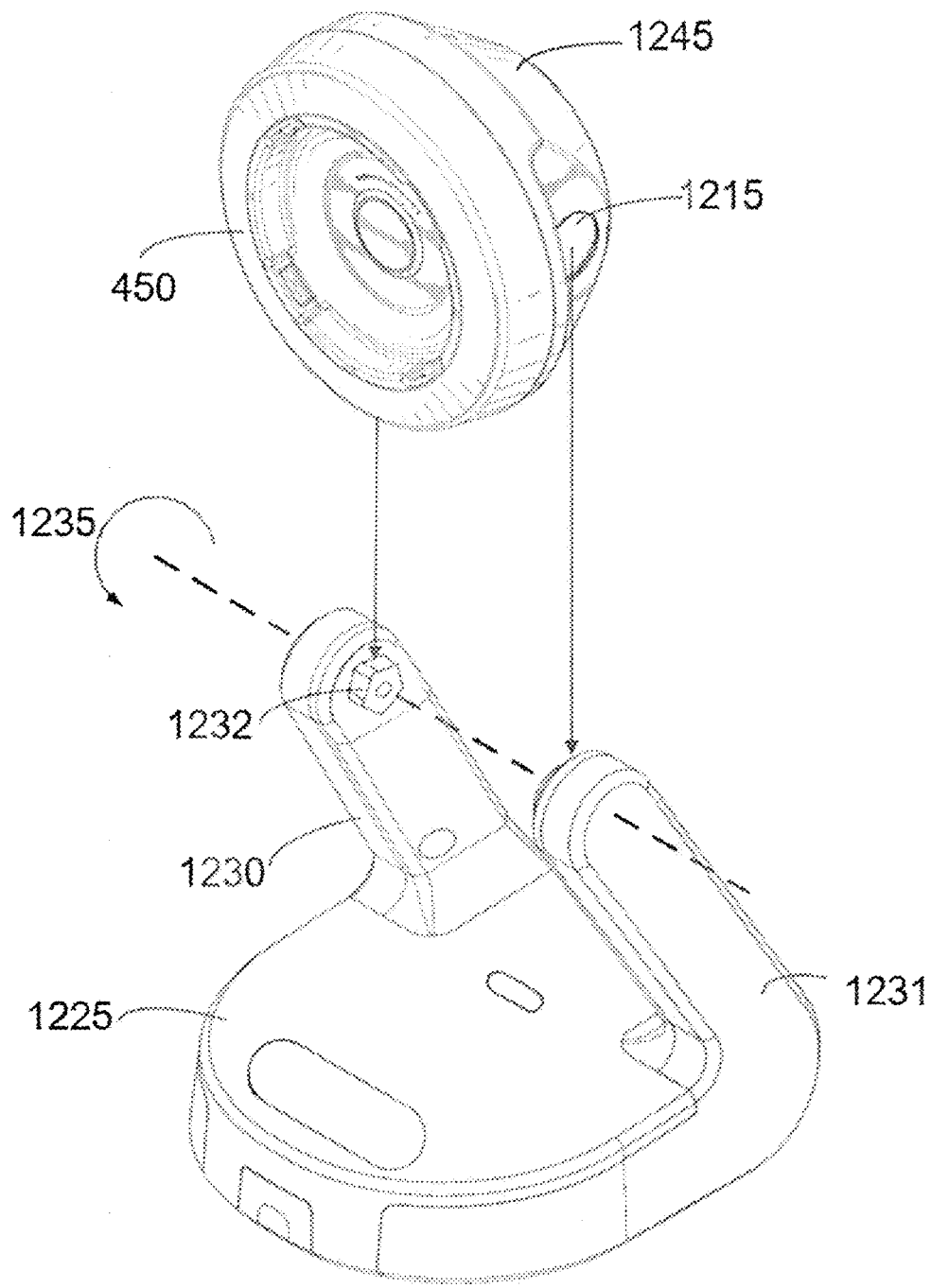
FIG. 12A is a view of an example base mount and housing suitable for attaching to a table stand according to an embodiment.

FIG. 12A is a view of a base mount and housing suitable for attaching to a table stand according to an embodiment 1200. In the embodiment of FIG. 12, base mount 450 is disposed within a housing 1245. Housing 1245 comprises mating provisions 1215 to allow insertion between vertical arms 1230 and 1231 of table stand 1225. In embodiments, insertion of housing 1245 between vertical arms 1230 and 1231 of table stand 1225 may permit rotation of housing 1245 about axis 1235.

In particular embodiments, hinge 1232 may be designed to present a predetermined threshold amount of friction during, for example, rotation of base mount 450 and housing 1245 about axis 1235. In an example embodiment, hinge 1232 may be capable of presenting sufficient friction so as to require torque approximately in the range of 1.0-10.0 Nm to rotate base mount 450 and housing 1245 about axis 1235.

Figure 12B:
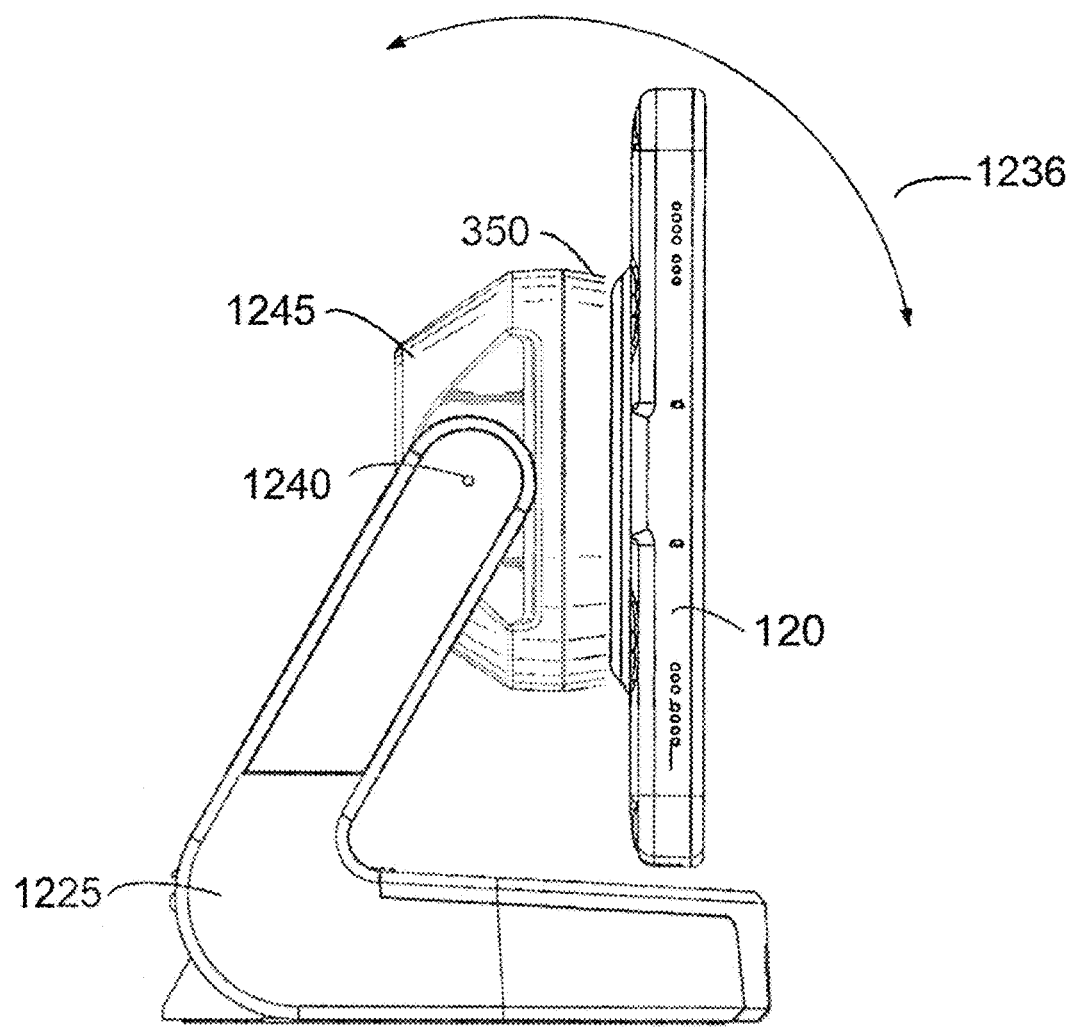
FIG. 12B is a view of an example base mount within a housing physically connected to a case mount according to an embodiment.

FIG. 12B is a view of a base mount within a housing physically connected to a case mount 350 according to an embodiment 1250. Case mount 350 is shown in FIG. 12B as physically connected to enclosure 120 so as to permit rotation of enclosure 120 with respect to axis 1240. In particular embodiments, such a configuration may permit case mount 350 and portable computing device enclosure 120 to be rotated with respect to axis 1240. In the embodiment of FIG. 12B, which may be advantageous for use in a retail establishment, for example, an employee of the retail establishment may initiate a transaction, such as via a portable computing device with in enclosure 120. After such initiation, the employee may rotate computing device enclosure 120 about axis 1240, such as depicted by arrow 1236, which may permit a customer, for example, to approve the initiated transaction. In embodiments, such approval may involve a user, such as a customer, for example, signing his or her name at an appropriate location, such as via a stylus or via an index finger, for example.

Improved Data Transfer Between Base Mount and Case Mount

It is believed that shortcomings in the art exist with respect to how well docking systems are able to maintain a data communication connection between a case portion of the docking system (that protectively encloses a computing device such as a tablet computer) and the base portion of the docking system. This can be a particular problem when the data communication connection employs a messaging protocol that does not guarantee data delivery such as a USB data connection. Given the variety of forces and stresses that are imparted on a docking system as users interact with the docking system it has been found that, over time, the data connection between the base portion and the case portion will sometimes fail, which leads to undesirable data loss and temporary system failures. Examples of forces and stresses include those that arise as a result of rotating the case portion relative to the docking portion and pulling/pushing/torquing forces applied to different areas of the case portion. In an effort to solve these problematic losses in data communications between the base portion and the case portion of the docking system, a number of technical innovations are disclosed that reduce the likelihood of unexpected data connection failures.

For example, various improvements in the cabling that connects different circuit components of the base portion of a docking system are disclosed. To reduce the risk of data loss arising from frayed wires and/or a loss of connection between a cable and a circuit board, disclosed herein are the use of unbundled conductors in the cable and/or a locked physical connection between the cable and a circuit board in the base portion. Also disclosed are example embodiments where an innovative shuttle is positioned in the interior portion of an arm that extends from a stand to a base mount, where this shuttle protects the cabling that connects different circuit components of the base mount and stand portions of a docking system. Example embodiments for such designs are described in greater detail below.

As another example, a variety of embodiments are disclosed that are designed to maintain the connections between contacts on a case enclosure and base mount in a docking system (when the case enclosure is docked with the base mount) over a wide range of operational uses of the docking system. It is believed that because of the tolerances and wear issues that exist with respect to aspects of the case enclosure and base mount and how they dock with each other (e.g., air gaps that facilitate eased docking, degradations in the shape of contacts over time, etc.), the ability of the case enclosure to move relative to the base mount when docked can lead to instances where the physical connection between contacts of the base mount and case enclosure is lost and/or where the nature of the electrical connection between contacts of the base mount and case enclosure is sufficiently changed to degrade signal quality beyond an acceptable level. In an example embodiment, magnets can be used to create a magnetic attraction between the base mount and case enclosure that restricts relative motion between the case enclosure and the base mount sufficient to prevent a loss of the data communication connection during operation. In another example embodiment, contacts can be deployed in the base mount such that they extend from a circuit board of the base mount at an angle that is not perpendicular from the circuit board. As an example, resilient contact pins such as pogo pin contacts can be deployed in this fashion as part of the base mount. In still other example embodiments, the shapes of the surfaces of the contacts on the case enclosure and/or base mount can be modified to improve the reliability of the physical connection between contacts when the case enclosure is docked with the base mount.

Improved Cabling in Docking System Base Portion

Figure 13:
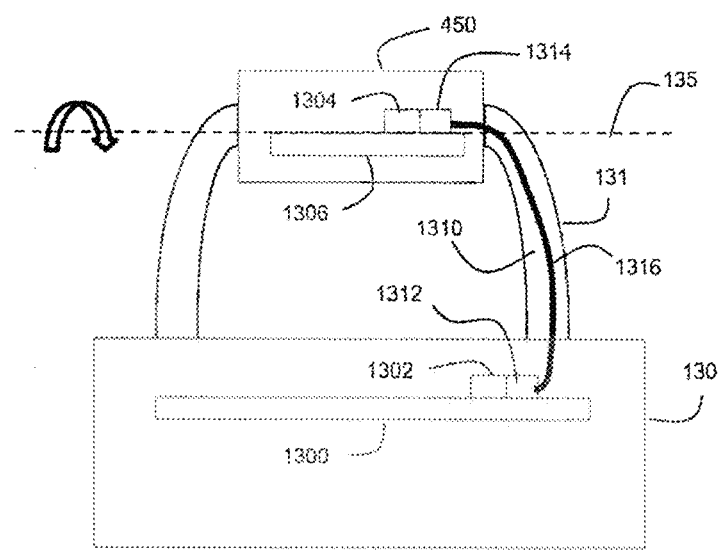
FIG. 13 shows a cross-sectional view of an example docking system.

FIG. 13 shows an example docking system that includes a stand 130 and base mount 450, where the stand 130 is connected to the base mount 450 via arms 131 that extend from the stand 130 (e.g., arms that extend upward from the stand from the perspective of a docking system positioned on a table or the like), as discussed above. In this example, a circuit board 1300 in the stand 130 carries circuitry for performing a variety of operations (e.g., power conditioning, power distribution, and/or networking with remote computer systems, etc.). Also, a circuit board 1304 in the base mount 450 carries circuitry for performing a variety of additional operations (e.g., see FIG. 6). A cable 1316 includes a connector 1312 that connects with connector 1302 on circuit board 1300 to electrically connect the cable 1316 with circuit board 1300. The cable 1316 also includes a connector 1314 that connects with connector 1304 on circuit board 1306 to electrically connect the cable with circuit board 1306. In this fashion, cable 1316 electrically connects circuit board 1300 with circuit board 1306 to permit the exchange of signals/data between circuit boards.

In a conventional approach for a docking system, this cable 1316 includes a single sheath that bundles a plurality of conductors within the sheath (where each conductor may carry a different signal for communication via a different pin of the connectors 1312 and 1314, and the connectors 1312 and 1314 for this cable 1316 are conventional male friction connector such as a standard USB connector. However, as the base mount 450 rotates about axis 135, this conventional approach to cabling often fails over time. It is observed that as the base mount 450 rotates about axis 135, forces are imparted on the cable 1316 which cause the cable 1316 to sometimes work itself loose from circuit board 1300 due to the looseness of the friction connection between connectors 1312 and 1302 and/or cause the cable to become frayed as the sheathed bundle of conductors rub and twist against the walls of the interior portion 1310 of arm 131.

As a solution to this, examples are disclosed herein where a locking connector is used for connector 1312 (and where connector 1302 is a complementary locking connector). While a friction connector only requires that force be applied in a single direction to disconnect connector 1312 from connector 1302 (e.g. an outward pulling force), a locking connector requires that force be applied in multiple directions to disconnect connector 1312 from connector 1302 (e.g., a sideways pushing force and an outward pulling force, possibly at the same time). It is believed that the use of a locking connector as connector 1312 helps mitigate data loss and/or power loss arising from a disconnected cable 1316. While the examples discussed below employ a locking connector for connector 1312, it should be understood that the cable 1316 can also employ a locking connector as connector 1314 if desired by a practitioner.

Figure 14A:
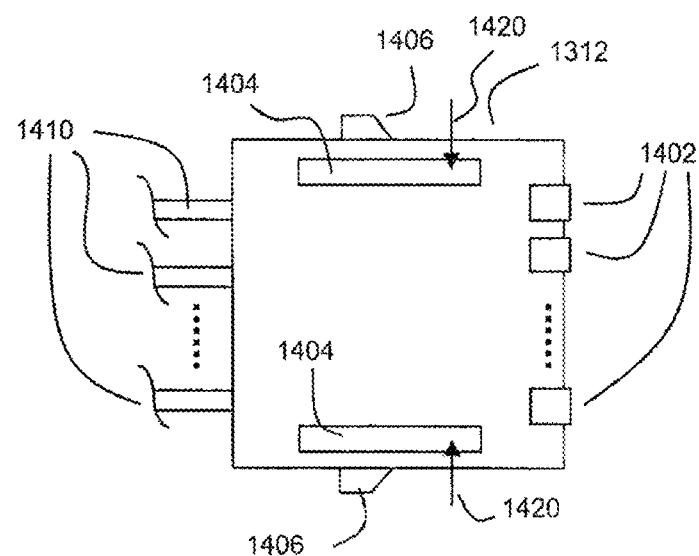
FIG. 14A shows a top view of an example locking connector.

As an example, the locking connector can provide a friction lock. An example of a friction lock connector 1312 is shown by FIG. 14A. FIG. 14A shows a top view of a friction lock connector 1312. The friction lock connector 1312 is located at a distal end of cable 1316 and comprises a plurality of contacts 1402 at its distal end that will engage with complementary contacts in a complementary connector when connector 1312 is connected with the complementary connector. In this example, the cable can include a plurality of unbundled conductors 1410 (discussed in greater detail below), although this need not be the case. The friction lock connector 1312 also includes one or more recesses 1404 (two in the example of FIG. 14A) that allow for one or more tabs 1406 that extend from the surface of the friction lock connector 1316 to deflect inward in the event of force being applied to the friction lock connector 1316 as shown by arrows 1420. This deflection can allow the tab 1406 to slide past an engaging portion of the complementary connector and then return to their natural positions as shown by FIG. 14A to thus lock the friction lock connector 1312 into place such that the contacts 1402 remain engaged with the complementary contacts of the complementary connector.

Figure 14B:
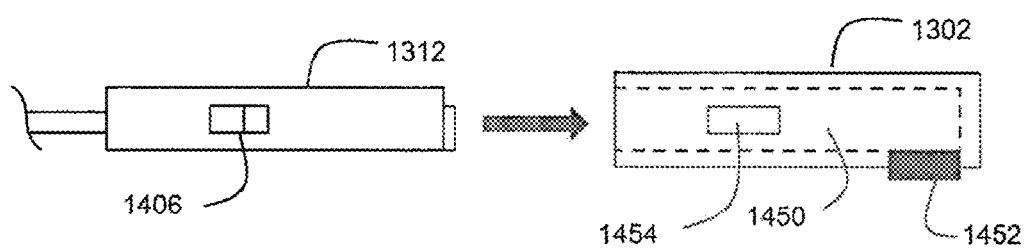
FIG. 14B shows a side view of example complementary locking connectors.

FIG. 14B shows a side view of the friction lock connector 1312 and its cooperation with a complementary connector 1302. This side view is such that the horizontal dimension corresponds to a plane that is parallel to circuit board 1300. As can be seen from FIG. 14A, the friction lock connector 1312 is a male connector that gets inserted into female connector 1302. A physical and electrical connection is established when contacts 1402 engage with contacts 1452 of the female connector 1302. Female connector 1302 has an open interior 1450 into which friction lock connector 1312 is inserted. Given the parallel orientation of connector 1302 with respect to circuit board 1300, it should be understood that the plane of the opening through which the friction lock connector 1312 is inserted is perpendicular to the circuit board 1300.

Figure 14C:
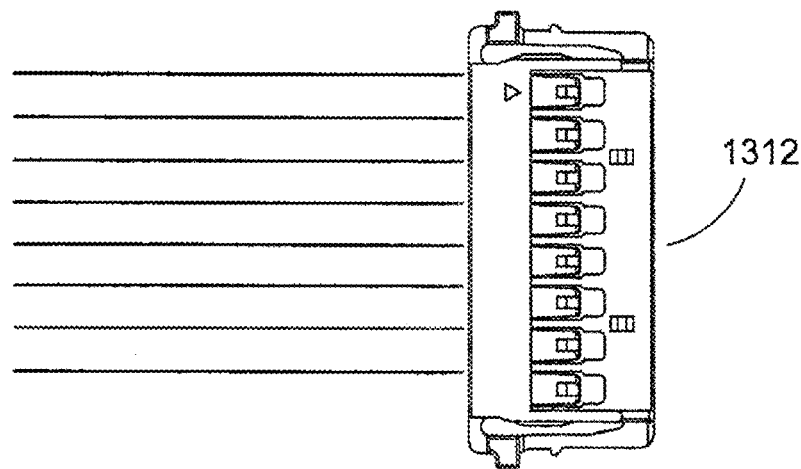
FIG. 14C shows a pico connector.

The sidewalls of the female connector can include a recess 1454 for receiving tab 1406. However, it should be understood that the recess 1454 need not be on a sidewall; for example, the recess 1454 could be included hi the top wall (in which case tab 1406 would extend from the top surface of the connector 1312 rather than the side surface). As connector 1312 is slidingly inserted into connector 1302 in the direction of the arrow shown in FIG. 14B, the tab 1406 will engage with the corresponding sidewall of connector 1302, which causes the tab 1406 to deflect inward in the direction of arrow 1420 via recess 1404 shown by FIG. 14A. Then, as the connector 1312 continues to be slid forward, the tab 1406 will reach recess 1454, whereupon the deflected tab 1406 returns to its natural state to thereby form a friction locking engagement between the tab 1406 and recess 1454. To remove the connector 1312 from connector 1302, a force will need to be applied to once again deflect the tab 1406 inward while also pulling on the connector 1312 to apply an additional force in the direction opposite the arrow shown in FIG. 14B. An example of a suitable friction lock connector is a pico connector available from Molex, which can be used as part of a pico-lock connector system with a complementary header connector. A photograph of a receptacle Molex pico connector 1312 is shown by FIG. 14C. In this example, the pico connector receptacle is inserted into the pico connector header, whereupon male pins in the header fit into female contacts within the receptacle housing. From the perspective of the locked physical connection, the pico connector receptacle serves as the male connector, while the pico connector header serves as the female connector.

As another solution to this, a plurality of the conductors that form part of cable 1316 can be unbundled relative to each other, which is believed will ease some of the stresses that are imparted on the conventional bundled cable during rotational operation of the base mount 450. By unbundling a plurality of conductors, there is more flexibility and room available for the various conductors to move away from interior walls of the arm 131 and thereby reduce the wear and tear on such conductors as the base mount 450 rotates about axis 135. It should be understood that the term "unbundled" and/or "not bundled" in this context as between Conductor 1 relative to Conductor 2 means Conductors 1 and 2 are not commonly enclosed within a protective sheath that surrounds both Conductors 1 and 2 and runs along the axial length of Conductors 1 and 2. The use of a wire tie or the like to group Conductors 1 and 2 over a short axial length of the cable does not qualify as "bundling" in this context.

Figure 15:
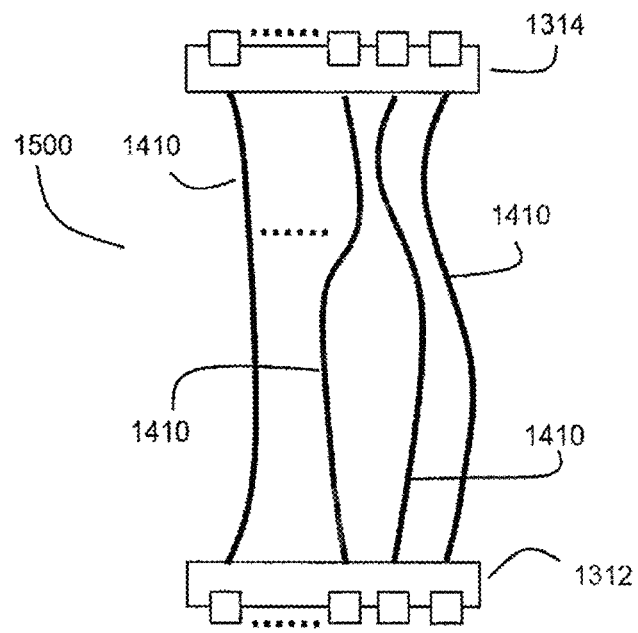
FIG. 15 shows an example cable having a plurality of unbundled conductors.

FIG. 15 shows an example of a cable 1500 for use with connectors 1312 and 1314 where a plurality of the conductors 1410 within the cable 1500 are not bundled relative to each other. Thus, while a given conductor 1410 may be enclosed within a protective sheath, all of the conductors 1410 are not surrounded by the same protective sheath as they were with a conventional design. The conductors 1410 terminate at either end at connectors 1312 and 1314.

Figure 16A:
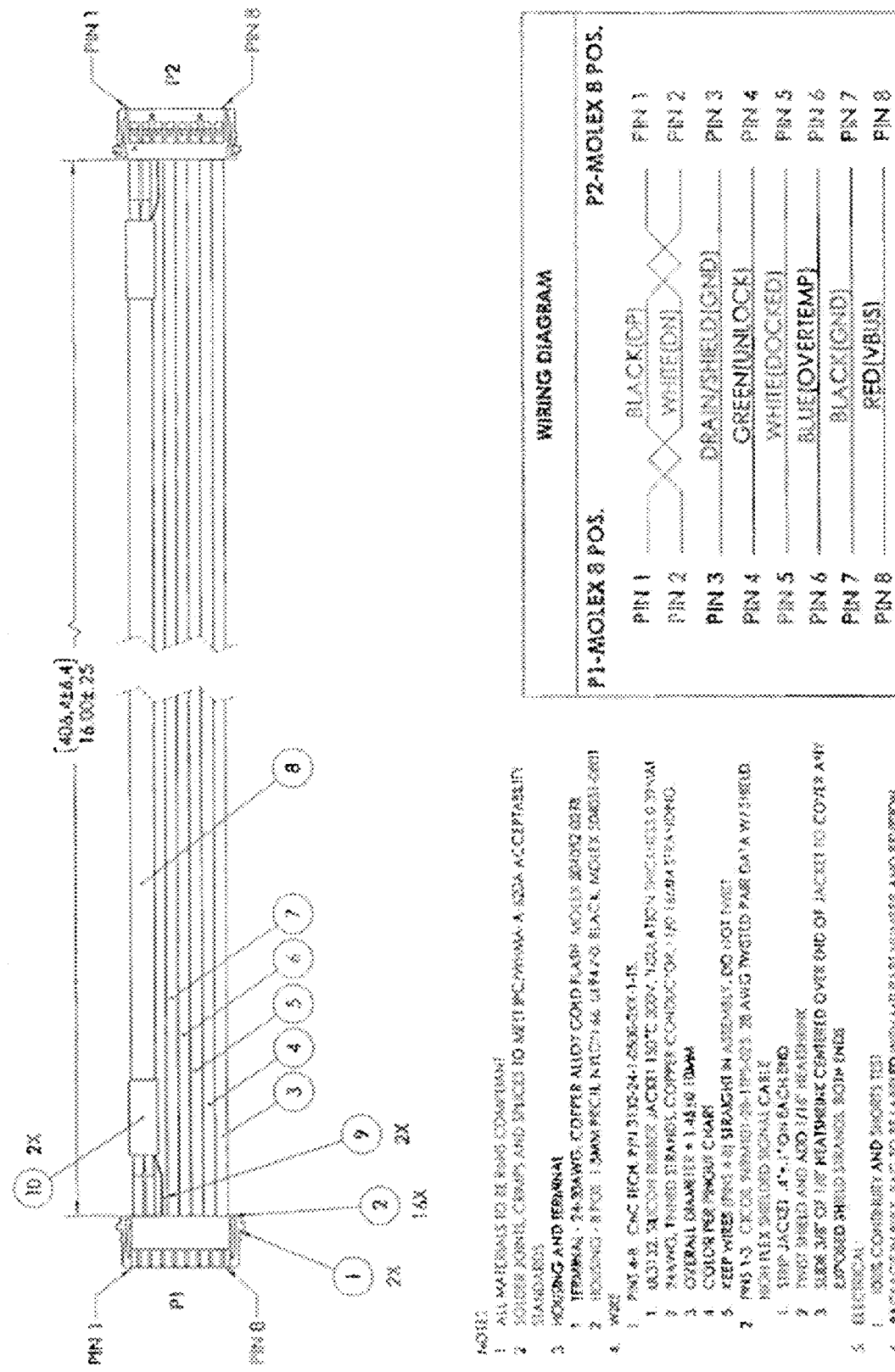

However, it should be understood that some of the conductors 1410 may be bundled together within a sheath, but such bundled conductors would be unbundled relative to other conductors 1410 of the cable 1500. For example, FIG. 16A shows an example of cable 1500 where the conductors 1410 for Pins 1-3 are commonly bundled within a protective sheath, while the conductors 1410 for Pins 4-8 of the cable 1500 are lone conductors within their respective sheathes. Thus, the conductors for Pins 1-3 are unbundled relative to each of the conductors for Pins 4-8. In this example, Pins I and 2 can be used for data, Pin 3 can be used for a data ground drain/shield, Pin 4 can be used for an unlock flag, Pin 5 can be used for a dock detect flag, Pin 6 can be used for an overtemperature flag, Pin 7 can be used for ground, and Pin 8 can be used as a voltage bus. In this example where the conductors for Pins 1-3 are commonly bundled by a sheath, the conductors for Pins 1-2 can be arranged as a twisted pair within the sheath to support high speed data transfer, such as high speed USB data transfer (e.g., USB data transfers in compliance with the USB 2.0 specification). The conductor for Pin 3 can serve as a shield for the twisted pair. Additional specifications for an example embodiment of cable 1500 are shown by the legend notes in FIG. 16A.

FIG. 16B shows an example of a cable 1500 where all of the conductors are unbundled relative to each other. In this example, each of the 8 pins has its own unbundled conductor. Additional specifications for another example embodiment of cable 1500 are shown by the legend notes in FIG. 16B.

Figure 17:
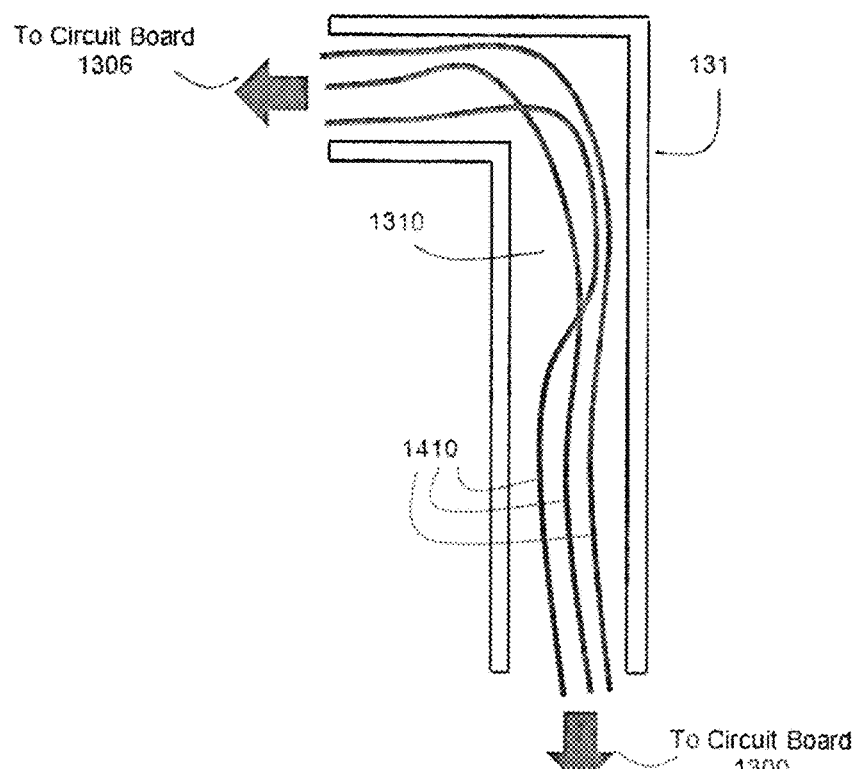
FIG. 17 shows an example of how unbundled conductors can be run through an arm interior portion of a docking system.

FIG. 17 shows how the unbundled conductors 1410 of cable 1500 can float freely within the interior portion 1310 of arm 131. As can be seen, the interior portion of the arm 131 terminates in openings that are perpendicular to each other such that there is a 90 degree angle for the opening where cable 1500 exits arm 131 to connect with circuit board 1306 relative to the opening where cable 1500 exits arm 131 to connect with circuit board 1300. This angle means that there is a cable bend in the interior portion 1310, and this cable bend provides an opportunity for wear and tear on the cable 1500, particularly as the base mount 450 rotates about axis 135 and variable pushing/pulling/twisting forces are imparted onto the cable 1500. While for ease of illustration FIG. 17 shows this interior bend as a sharp right angle, but it should be understood that curving/contours can be used to soften this bend and further relieve the stresses on the cable 1500. Furthermore, while the example of FIG. 17 shows a 90 degree angle between the upper opening and lower opening of the interior portion 1310 of arm 131 where in the example of FIG. 17, the upper opening is shown in a vertical direction while the lower opening is shown in a horizontal direction), it should be understood that other angles can be used depending upon the desires of a practitioner. For example, the angle between the upper opening and lower opening of the interior portion 1310 of arm 131 could be an angle within the range of 60 degrees and 120 degrees.

In an example embodiment, the cable 1500 can employ both a plurality of conductors that are unbundled relative to each other and a locking connector at one or both of its ends in order to improve the reliability of the connection between circuit boards 1300 and 1306 over the life of the docking system. However, a practitioner may also choose to employ either of these solutions if one of the solutions provides sufficient improvements for the practitioner's purposes.

Figure 18A:
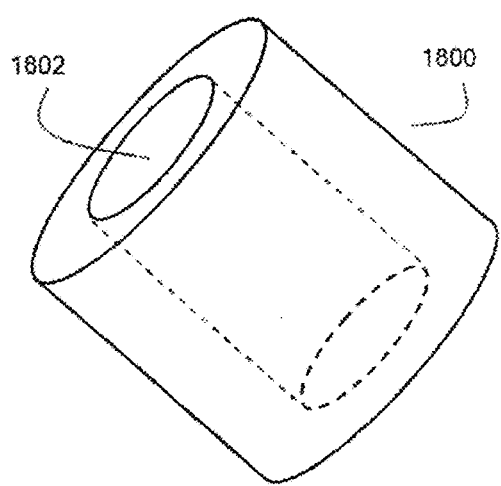
FIGS. 18A-18B shows example shuttles for use in an arm interior portion of a docking system.
Figure 18B:
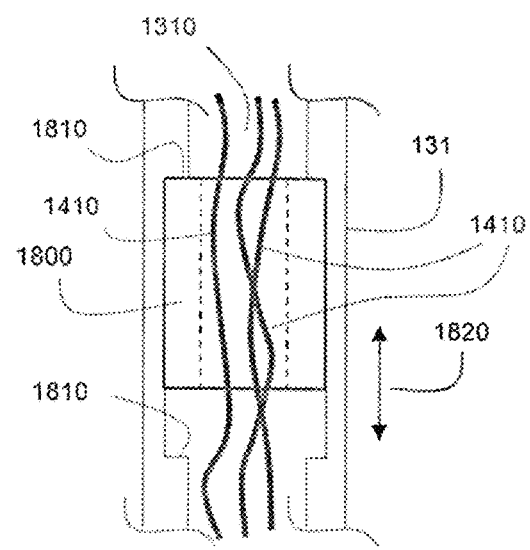

FIGS. 18A and 1813 disclose an example embodiment where a shuttle 1800 is positioned inside the interior portion 1310 of arm 131 such that the shuttle 1800 is able to slidingly move along a portion of the length of the interior portion 1310 as forces are imparted onto the cable 1500 during rotational operation of the base mount 450. An example, the shuttle can be a cylindrical member as shown by FIG. 18A with a hollow interior 1802 through which the cable 1316 or 1500 extends. FIG. 18B shows an example where the conductors 1410 of cable 1500 extend through the shuttle interior 1802. The interior portion 1310 of arm 131 can be shaped to permit sliding movement of the shuttle 1800 within interior portion, which is believed to relieve the wear and tear on the cable over time.

In the example of FIG. 1813, the slidability of the shuttle 1800 in the directions of arrow 1820 can be provided via a wider diameter in the interior portion 1310 for the length over which the shuttle 1800 can move, and where shoulders 1810 in the interior portion can define the limits of movement for shuttle 1800. However, it should be understood that other arrangements for permitting the movement of shuttle 1800 within interior portion 1310 could be employed.

Also, while the example of FIGS. 18A and 18B show a shuttle 1800 that has a cylindrical shape, it should be understood that other shapes could be employed. For example, a contoured elbow shape (with a hollow interior portion) could be used in combination with a complementarily contoured segment of interior portion 1310 to allow for the shuttle to relieve wear and tear on the cable at the likely spot of cable bend.

Maintaining Contact Connections Between Base Mount and Case Mount During Use of Docking System As noted above, a variety of embodiments are also disclosed that are designed to maintain the connections between contacts on a case enclosure and base mount in a docking system (when the case enclosure is docked with the base mount) over a wide range of operational uses of the docking system.

Figure 19A:
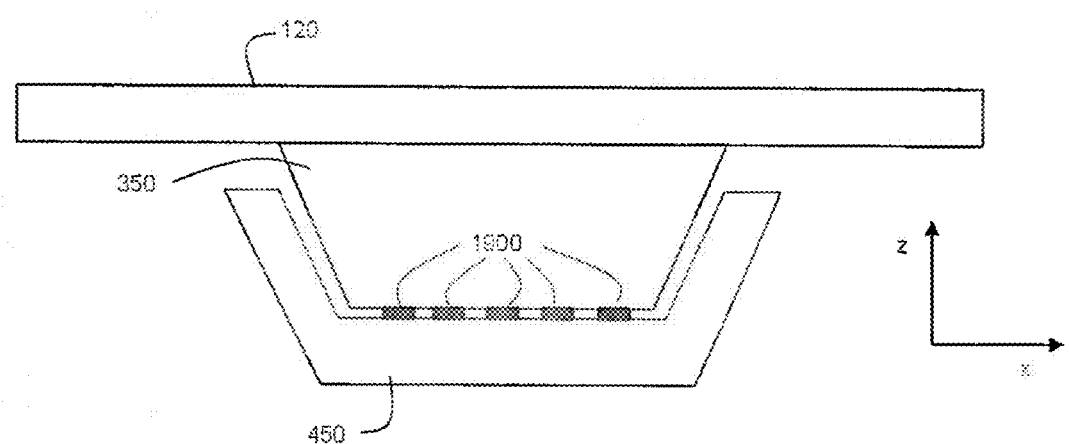
FIG. 19A shows a cross-sectional view of an example case enclosure docked with an example base mount.

FIG. 19A shows a cross-sectional view of a case enclosure 120 docked with a base mount 450. In this example, case enclosure 120 includes case mount 350, and the contacts of the case enclosure that engage with contacts of the base mount are located on an external surface of the case mount 350 facing the base mount 450 when docked. In FIG. 19A, the connections between these contacts are shown as 1900. While 5 connections 1900 are shown in FIG. 19A, it should be understood that this is an example only, and a practitioner may choose to employ more or fewer contact connections. For example, an example embodiment discussed above employs 12 contact connections 1900. One or more of these contact connections 1900 can provide data connectivity between the base mount 450 and case enclosure 120, and this data connectivity may employ a communication protocol that does not guarantee data delivery. For example, the data connectivity through one or more contact connections 1900 may be USB data connections.

It is believed that because of the tolerances and wear issues that exist with respect to aspects of the case enclosure and base mount and how they dock with each other (e.g., air gaps that facilitate eased docking, degradations in the shape of contacts over time, etc.), the ability of the case enclosure to move relative to the base mount when docked can lead to instances where one or more of the physical connections 1900 between contacts of the base mount and case enclosure is lost and/or where the nature of the electrical connection between contacts of the base mount and case enclosure is sufficiently changed to degrade signal quality beyond an acceptable level.

For example, movement of the case mount 350 relative to the base mount in the z-direction (with reference to the x-z dimensions shown in FIG. 19A, and where the y dimension is in the direction coining out of and extending into the page) can cause a loss in one or more of the contact connections 1900. Such z-displacement can occur as a result of pulling forces or other shocks that are applied to the case enclosure 120 in any of a number of directions during operation, particularly during rotational movements of the base mount 450 relative to axis 135. However, it is also believed that movement of the case mount 350 relative to the base mount 450 in the x-direction and/or v-direction can also lead to a loss of one or more contact connections 1900 or degradation in signal quality that leads to a data loss in the data connectivity between the case mount 350 and base mount 450.

Figure 19B:
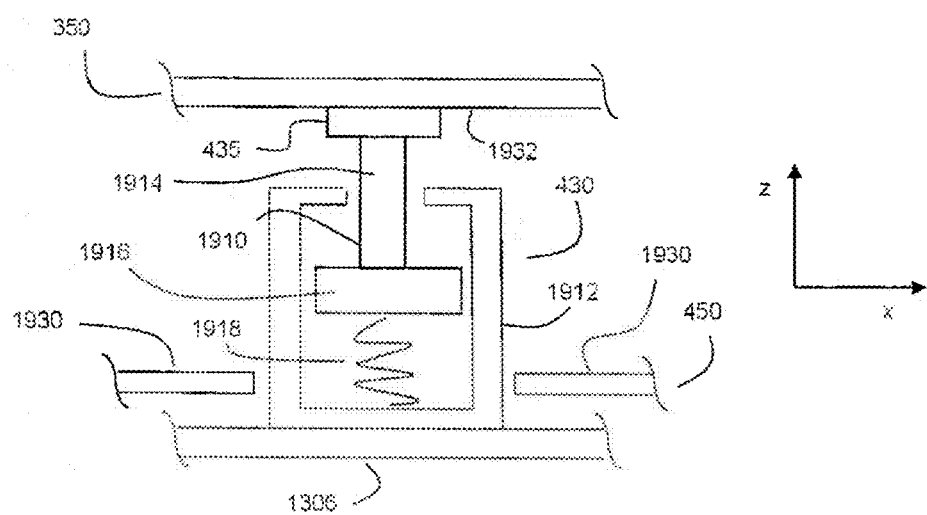
FIG. 19B shows a cross-sectional view of a pogo pin contact that connects with a contact when a case enclosure is docked with a base mount.

For example, FIG. 19B shows how lateral movement of the base mount 450 relative to the case mount 350 in the x-direction and/or y-direction can lead to a transient state where a pogo pin contact 430 becomes highly inductive because a spring 1918 in the pogo pin contact 430 serves as the primary conduit for signal. This high inductance can lead to a degradation in signal quality that may result in data loss. This can particularly be the case if two pogo pin contacts 430 that are used for paired data transmissions are oriented differently such that they exhibit different inductances. If the magnitude of the differential between the inductances is too high, data loss may result.

With reference to FIG. 19B, a pogo pin contact 430 connects with circuit board 1306 and it passes through an opening in an external surface 1930 of base mount 450 as shown in the cross-sectional view of FIG. 19B. While only a single pogo pin contact 430 is shown in FIG. 19B, it should be understood that the base mount 450 may employ a plurality of such pogo pin contacts 430. The pogo pin contact 430 includes a pogo pin plunger 1910 with an upper portion 1914 serving as a pogo pin tip that extends from a pogo pin casing 1912. The pogo pin casing 1912 serves as a body portion of the pogo pin contact 430 and includes an internal void 1920 that allows for movement of the plunger 1910. The plunger 1910 can also have a lower portion 1916 that exhibits a wider dimension and the upper portion 1910 to prevent the plunger 1910 from overly extending out of the casing 1912. As can be seen via FIG. 19a the lower portion 1916 of plunger 1910 can serve as a shoulder that will abut against a top portion of the casing 1912 if the plunger 1910 is maximally extended outward. The upper surface of the upper portion 1914 of plunger 1910 engages with contact 435 on an external surface 1932 of case mount 350 when the case mount 350 is docked to the base mount 450 to form a contact connection 1900. The plunger 1910 is connected to the casing 1912 via a spring 1918 that provides the pogo-effect for the pogo pin contact 430 such that the plunger 1910 compresses the spring when the contact 435 exerts force on the plunger 1910, and the bias of the spring 1918 operates to extend the plunger outward when the force from contact 430 is removed.

To maintain a strong signal through the contact connection 1900 formed by the physical connection between pogo pin contact 430 and case enclosure contact 430, it is generally best if the plunger 1914 directly contacts some portion of the casing 1912 to provide a direct conductive path for signal to the circuit board 1306. However, as the base mount 450 is rotated, and as forces of various types and directions are applied to the docked case enclosure 120, it is believed that over time the pogo pin contact 430 will occasionally enter the transient state shown by FIG. 19B where the primary signal connection between the plunger 1910 and the circuit board is through the spring 1918 which acts as an inductor. It is believed that these transient states can lead to data losses, particularly when the data connectivity through the pogo pin contact 430 is a USB connection. In an effort to reduce and minimize these data losses over long term operational use of the docking system, a number of innovative solutions are disclosed and discussed in greater detail below.

An example of such a solution is the use of magnets. For example, as noted above, one or more magnets can be deployed in the base mount 450 to secure the base mount 450 to the case mount 350 when the case enclosure 120 is docked to the base mount 450. Such magnets can be used to create a magnetic attraction between the magnets in the base mount 450 and corresponding metallic elements in the case mount 350 that restricts relative motion between the base mount 450 and the docked case mount 350 sufficient to prevent a loss of the data communication connection during operation. This restriction can be a restriction of relative movement in the x-direction, y-direction, and/or z-direction.

Figure 20A:
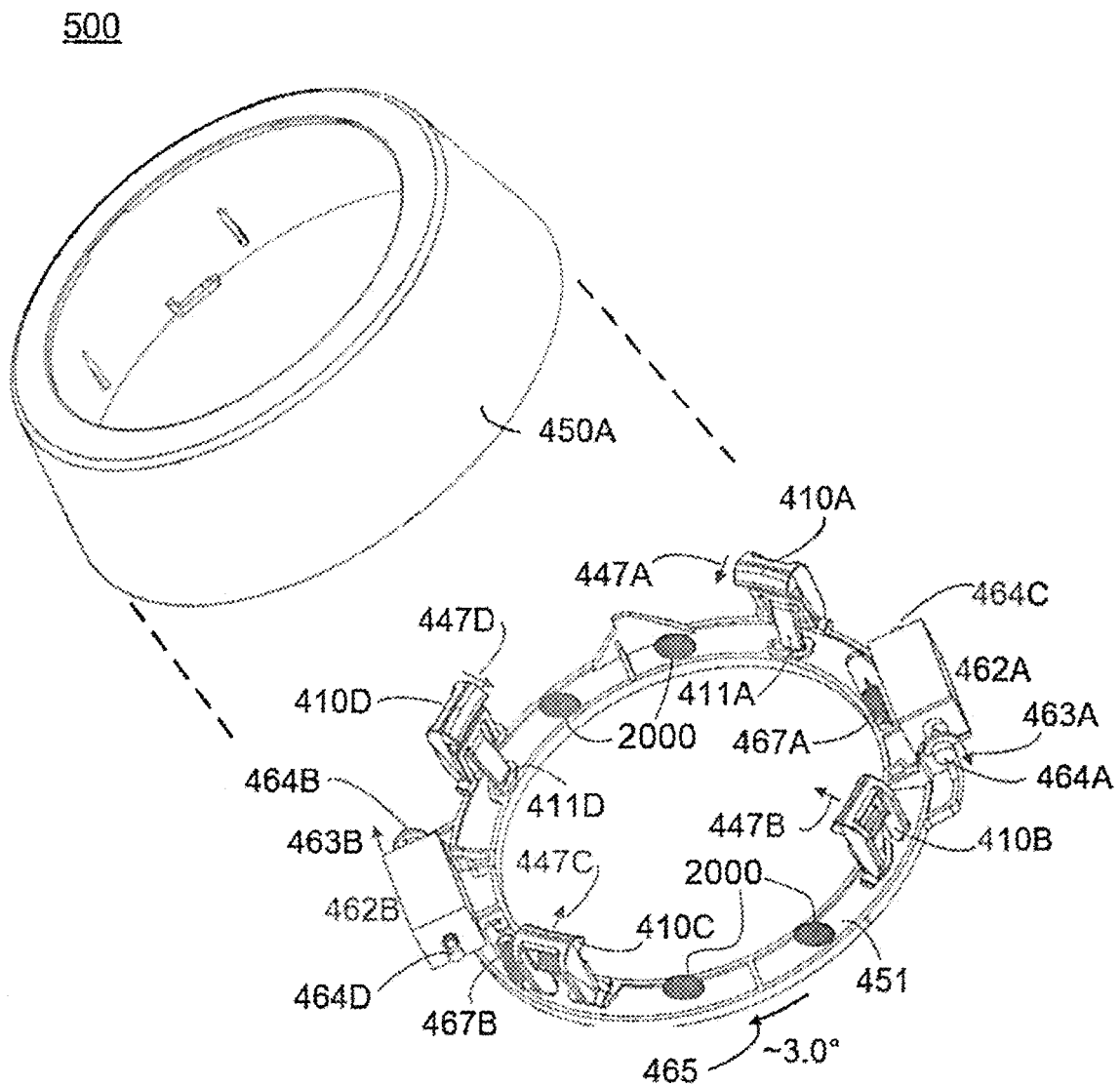
FIG. 20A is a perspective view of the example base mount of FIG. 5 with a plurality of magnets positioned therein.

FIG. 20A shows an example where a plurality of magnets 2000 are positioned in various locations around cam ring 451 of the base mount 450. A practitioner can choose the number of magnets 2000 and where to locate them in the base mount 450 in a manner that yields a desirable reduction in data loss. In an example embodiment, magnets can be deployed at 4 locations around the cam ring 451 at roughly 90 degree intervals. However, as noted, other arrangements can be employed.

Figure 20B:
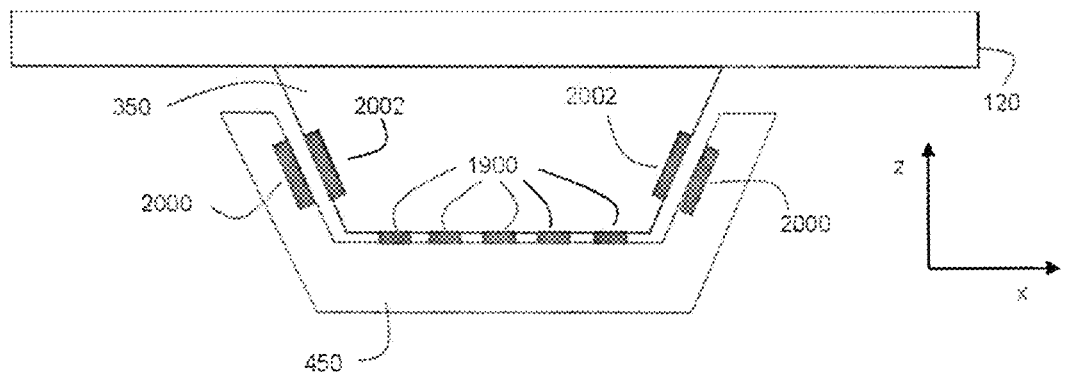
FIG. 20B shows a cross-sectional view of an example case enclosure docked with an example base mount where magnetic attraction is used to restrict relative motion of the case mount and the base mount.

FIG. 20B shows a cross-sectional view of a case enclosure 120 docked with base mount 450, where the case enclosure 120 includes case mount 350. Magnets 2000 in the base mount 450 create a magnetic attraction force with corresponding metallic elements 2002 in the case mount 350 when the case mount 350 is docked with the base mount 450. This magnetic attraction force restricts relative motion between the base mount 450 and case mount 350 in a manner that maintains the reliability of contact connections 1900 to avoid data loss in the event of various forces being applied to the docking system (including forces arising from rotation of the base mount 450 about axis 135, forces applied to the case enclosure arising from users pulling, pushing, and/or hanging on the case enclosure 120, and/or vibrational forces arising from users or objects striking the case enclosure 120 and/or base mount 450). The physical connections 1900 can be formed by contacts on the base mount 450 and case mount 350 that contact each other when the case mount 350 is docked with the base mount 450, In an example embodiment, the base mount contacts may comprise resilient connector pins such as pogo pin contacts 430, and the case mount contacts may comprise contact pads such as contacts 435.

A number of factors will impact the strength of the magnetic force attraction between magnets 2000 and metallic elements 2002. For example, the size, strength, shape, composition, and positioning of magnets 2000 can affect how strong the magnetic force attraction is between magnets 2000 and metallic elements 2002. Similarly, the size, shape, composition, and positioning of metallic elements 2002 can also affect how strong the magnetic force attraction is between magnets 2000 and metallic elements 2002. It should also be understood that design trade-offs exist with respect improved data reliability versus ease of undocking. Generally speaking, using stronger magnets to further reduce relative motion between base mount 450 and case mount 350 (and thereby improve data reliability) can lead to difficulties for users when they undock a case enclosure 120 from the base mount 450. But, if the magnet force attraction is too weak, it is expected that data loss rates will increase. A practitioner can use these factors to arrive at a tradeoff between magnetic strength and ease of undocking that is desirable. In an example embodiment, the magnets 200 and metallic elements 2002 have been selected and arranged to provide the docking system with a requirement of approximately 11.8 kg of straight pull force on the docked case enclosure 120 in the z-direction away from the base mount 450 (e.g., in an opposing direction that is normal to a user interface plane of computing device 150 enclosed by the case enclosure) to undock the docked case enclosure 120 from the base mount 450. However, it should be understood that stronger or weaker magnetic attraction forces may be employed if the design provides a practitioner with a sufficient balance between data reliability and ease of undocking. For example, the magnets 200 and metallic elements 2002 can be selected and arranged to provide the docking system with the ability to withstand a range of 5 kg to 20 kg of straight pull force of the docked case enclosure 120 in the z-direction away from the base mount 450 to undock the docked case enclosure 120 from the base mount 450.

Preliminary testing has been conducted on an example embodiment in accordance with the designs of FIGS. 20A and 20B, where this testing checks for a loss in the data connection between the base mount 350 and case mount 450 over a number of rotational cycles of the base mount 450 where forces are applied to the docked case enclosure 120 (with a tablet computer enclosed thereby). Testing was conducted on a docking system with the case enclosure 120 (with tablet computer) docked such that the contacts 435 on case mount 350 engage with pogo pin contacts 430 on base mount 450. Magnets 2000 were used to create a magnetic attraction force of approximately 13 kg in the z-direction away from the base mount 450, and the effect of the springs within pogo pin contacts 430 caused a counterforce of approximately 1.2 kg leading to a net attractive force of around 11.8 kg. As part of this testing, the docking system in such a docked state was rotated through approximately 150° about axis 135 by applying a force to the end of the case enclosure 120. The magnetic coupling of case mount 350 to base mount 450 caused the base mount 450 to pivot rotationally about axis 135, thereby permitting the tilting function. The hub of the axis 135 created a resisting torque that required a force to be applied to the end of the case enclosure 120 to cause the movement. The force required to cause rotation was approximately 2 kg applied in a rotational or tangential direction to the rotation hub axis 135. This tilt cycle was performed for over 250 k cycles without any loss of data connection, and 440 k cycles with less than 100 data drops. Data drops were detected via a USB loopback device that detects USB data losses and system re-numeration as a result of USB handshaking to trigger an updated count of data losses. A single tilt cycle was defined as a rotational movement of 150° in one direction followed by a second rotational movement of 150° in the opposite direction. This preliminary testing shows that a significant improvement over other docking system designs where data losses were orders of magnitude higher during such rotational testing. Depending on the desires of a practitioner with respect to trading off data reliability for ease of undocking, a practitioner may choose to vary the strength of the magnetic force attraction such that no data loss is experienced over the course of any value within a range of around 50,000 rotation cycles as discussed above to around 400,000 rotation cycles (e.g., around 50,000, 75,000, 100,000, 125,000, 150,000, 175,000, 200,000, 225,000, 250,000 rotations, etc.).

Furthermore, in an example embodiment where solenoids 462 are used to actuate latches to physically lock the docked case mount 350 with the base mount 450 (see FIG. 20A), the magnets 2000 should be positioned such that their magnetic fields do not impede the effective operation of the solenoids 462. For example, if the magnets 2000 are positioned to close to the solenoids 462, the magnetic fields arising from such magnets 2000 may force the solenoids to be in an always open or always closed position. To avoid this, the spacing between magnets 2000 and solenoids 462 should be sufficient to prevent a sufficiently large magnetic field from forcing the solenoids to the open or closed position. In an example where magnets are placed at 90 degree intervals around the base mount cam ring, a practitioner may choose to place the solenoids 462 roughly 45 degrees off the magnets 2000. However, it should be understood that other spacings may be suitable for given magnet strengths.

The magnets 2000 can be permanent magnets such as neodymium (NdFeB) magnets; for example N-52 magnets. However, it should be understood that magnets 2000 could be formed from any of a number of magnetic materials that provide a suitable amount of magnetic force attraction with metallic elements 2002. The metallic elements 2002 can be any metal that is suitably attracted to magnets 2000.

FIGS. 21A-21E show various examples of magnet assemblies 2100 that can be used to deploy magnets 2000 in the base mount 450.

Figure 21A:
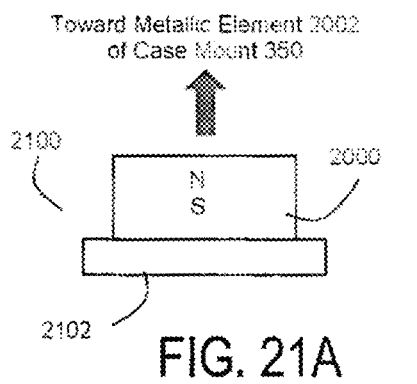
FIGS. 21A-21F show example magnet assemblies that can be used with the example embodiment of FIGS. 20A-20B.

FIG. 21A shows a cross-sectional view of a magnet assembly 2100 that includes a magnet 2000 located on a backing metal 2102. The backing metal 2102 helps re-direct the magnetic field toward metallic element 2002 as shown by the arrow in FIG. 21A, which allows for stronger magnetic force attractions using smaller magnets than would be possible if no backing metal 2102 were used. The magnet 2000 can be a disk-shaped magnet, although it should be understood that other shapes such as bar magnets could be used if desired by a practitioner. While the example of FIG. 21A shows a north-south orientation where the north magnet pole is located closest to the metallic element 2002 when docked, it should be understood that the opposite orientation could also be used (as shown by FIG. 21B).

Figure 21B:
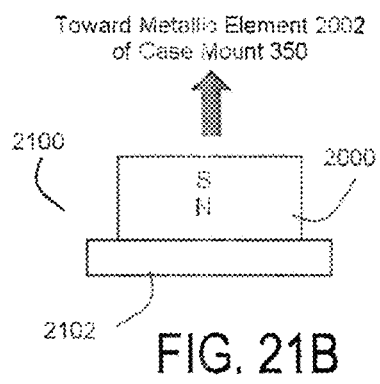
Figure 21C:
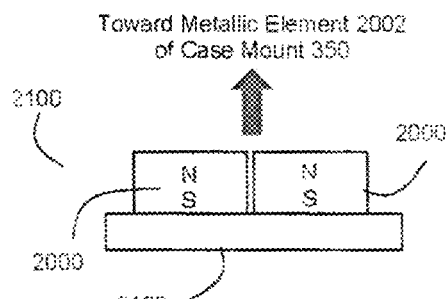
Figure 21D:
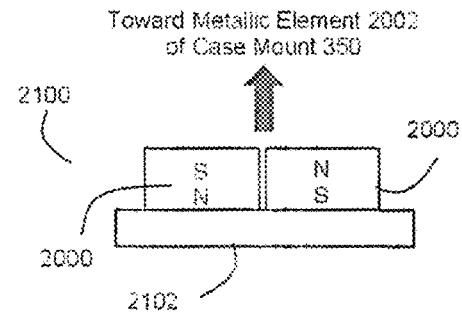

FIG. 21B shows a cross-sectional view of a magnet assembly 2100 that includes two magnets 2000 located on a backing metal 2102. Magnets 2000 can be disk-shaped magnets (see, for example, the top view of FIG. 21E), although it should be understood that other shapes such as bar magnets could be used if desired by a practitioner. The two magnets 2000 can be oriented on the backing metal 2102 such that both magnets 2000 have the same pole closest to the metallic element 2002 when docked as shown in FIG. 21C. However, a practitioner may also orient the two magnets 2000 on the backing metal 2102 such that each magnet 2000 has a different pole closest to the metallic element 2002 when docked as shown in FIG. 21D. The approach of FIG. 21D may be beneficial in better focusing the magnetic field in the direction of the metallic element 2002 such that less magnetic field spreads laterally away from the sides of the magnetic assembly 2100. Also, while the example of FIG. 21C shows the north pole at the top of the magnet assembly 2100, it should be understood that these poles could also be the south pole if desired by a practitioner. Similarly, with the example of FIG. 21B, it should be understood that the polar orientations of the two magnets 2000 could also be flipped if desired by a practitioner.

Furthermore, the backing metal 2102 could be shaped in a manner that accommodates any curvature that may be present in the base mount where the magnets 2000 are deployed. For example, in an example embodiment where the base mount 450 and case mount 350 exhibit disk shapes as shown by FIG. 20A, the backing metal 2102 can be angled as shown by FIG. 21F to exhibit a slight V-shape that accommodates the curvature of the base mount 450. In such a case, the magnets 2000 in the two-magnet embodiments would be similarly tilted as shown by FIG. 21F. Also, while the example of FIG. 21F shows that the backing metal 2102 exhibits a V-shape in a side view, it should be understood that the backing metal 2102 and magnet(s) 2000 could also be curved to accommodate the curvature of the disk-shaped base mount 450.

Figure 21E:
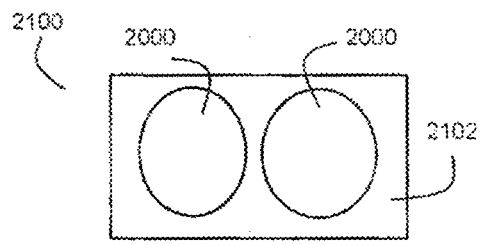
Figure 21F:
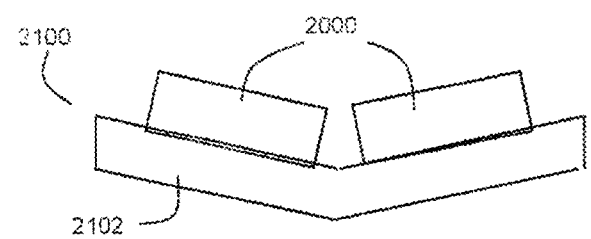

In an example embodiment, the docking system may include 4 magnetic assemblies 2100 with a proximity and orientation as shown by FIGS. 21D-F arranged in the base mount 450 as shown by FIG. 20A such that the base mount 450 includes a total of 8 magnets 2000. Each magnet 2000 can be a cylindrical magnet with a diameter of approximately 9/16" (0.563") and a thickness of approximately 3/16" (0.188"). The magnetic force varies as an inverse function of the distance between the magnet 2000 and corresponding metallic element 2002. At a distance between magnet 2000 and metallic element 2002 of approximately 0.160", each individual magnet 2000 in such an arrangement would exert a force of approximately 1.5 kg. However, it should be understood that this arrangement is an example only, and as discussed above a practitioner may choose to deploy magnets in different orientations and strengths in view of desired tradeoffs between data reliability and ease of undocking.

Figure 21G:
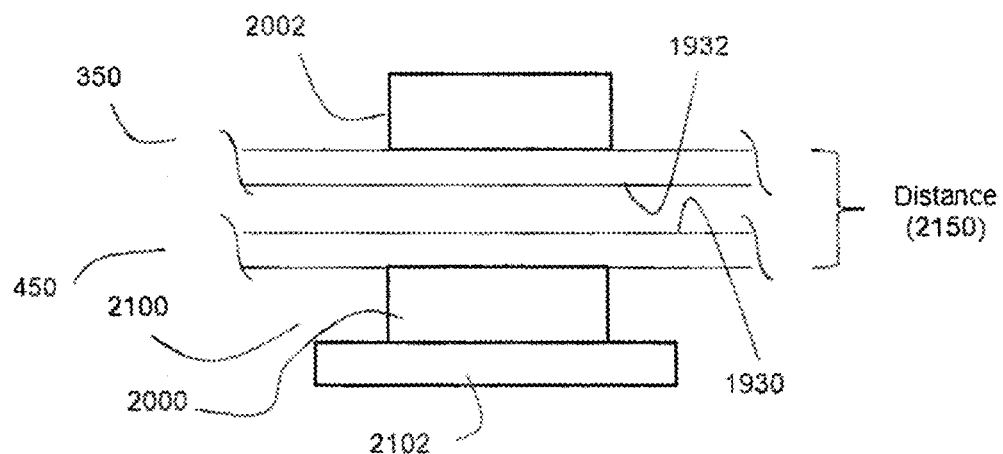
FIGS. 21G-21H show examples of how magnets in a base mount can be positioned relative to metallic elements in a case mount when docked.
Figure 21H:
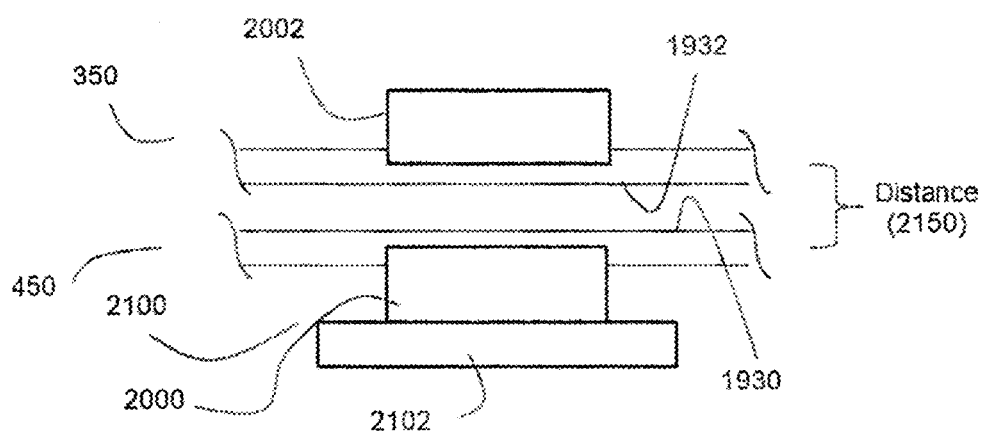

Another factor that can be chosen to adjust the magnetic force attraction between magnets 2000 and metallic elements 2002 is the distance between the magnets 2000 and metallic elements 2002 when docked. FIG. 21G shows a cross-section view of a magnet 2000 with a metallic element 2002 when the case enclosure 120 is docked with the base mount 450. Distance 2150 will impact the strength of the magnet force attraction. If a practitioner desires a stronger magnetic force attraction for a given size of magnet, one approach that can be taken is to reduce the distance 2150 by adding recesses to the outer shells of the base mount 450 and case mount as shown by FIG. 21H, This allows the magnet 2000 to be brought closer to metallic element 2002 and thereby increase the strength of magnetic force attraction for a given magnet 2000 and metallic element 2002. While the example of FIG. 21H shows recesses being included in both the case mount shell and the base mount shell to bring the magnet 2000 and metallic element 2002 closer together, it should be understood that recesses need not necessarily be added to both (e.g., a recess in the base mount shell or the case mom shell) if so desired by a practitioner. Further still, a practitioner might choose to form the outer shell of the case mount (or a portion of the outer shell of the case mount) from a metallic element to further reduce distance 2150. Another approach for adjusting the magnetic force attraction can be to use thicker or thinner metallic elements 2002 as may be desired.

Thus, as noted above, the magnetic attraction force between magnets 2000 and metallic elements 2002 helps restrict the relative movement between case mount 350 and base mount 450 when the case enclosure 120 is docked with the base mount 450, which in turn yields a more reliable data connection between the base mount 450 and case mount 350, particularly when the data connection employs a protocol that does not guarantee data delivery (e.g., no protocol for sending and receiving acks and then re-sending data when acks are not received). This design can lead to long operational lives for docking systems such that no data losses are experienced over the course of rotations of the base mount 450 with docked case enclosure 120 (and tablet computer) in a range between 25,000 and 250,000 or more rotations.

Another approach for the use of magnets is to use one or more electromagnets rather than permanent magnets. By using an electromagnet, a practitioner can vary the strength of the magnet attraction with the metallic elements 2002 to allow for easier undocking of the case enclosure 120. For example, to permit easy undocking, a circuit in the base mount 450 can selectively control the electromagnet(s) to make undocking easier (e.g., via control of a voltage delivered to the electromagnet(s)). For example, the base mount circuit can disable or reduce power delivered to the electromagnet or even reverse the power to cause a reactive force that may force an undocking movement. Selective control over the electromagnet can be triggered by the receipt of an unlock command from an authorized user. The circuit can also enable the electromagnet(s) in response to detecting a docking as between the case mount 350 and base mount 450 (e.g., detecting the presence of a signal on a dock detect pin among contact connections 1900). Once powered, the electromagnet(s) can provide sufficient magnet attraction force to restrict the relative motion between the base mount 450 and case mount 350 to thereby provide a reliable data connection between the base mount 450 and case mount 350.

Another example of a solution to the problem of data loss is the use of angled contacts, such as angled base mount contacts. The base mount contacts may be resilient connector pins that extend from the base mount, such as pogo pin contacts 430. The conventional approach to deploying pogo pin contacts on a circuit board is to have the pogo pin contacts extend perpendicularly from the circuit board (see, FIG. 19B, for example, which shows pogo pin contact 430 extending in a perpendicular orientation from circuit board 1306). However, as noted in connection with FIG. 19B, there may be instances where the pogo pin contact 430 becomes highly inductive due to a transient state during shifting of the base mount 450 and/or case mount 350 where the signal from the pogo pin contact 430 is highly inductive. As a solution to this problem, pogo pin contacts 430 that extend from the circuit board 1306 at an angle that is off-perpendicular relative to circuit board 1306 can be used.

Figure 22A:
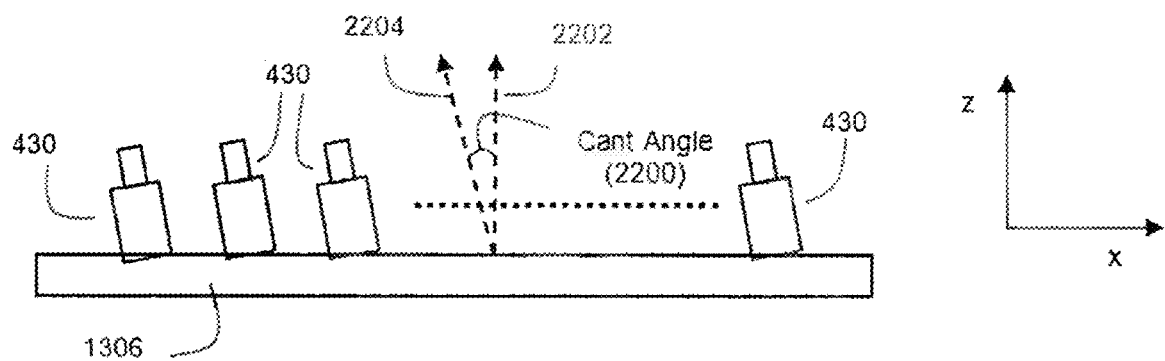
FIG. 22A shows a side view of an example circuit board with pogo pin contacts that extend therefrom at a canted angle.

FIG. 22A shows an example embodiment where angled resilient contacts such as angled pogo pin contacts 430 are used. Arrow 2202 shows the direction that is perpendicular relative to circuit board 1306. Pogo pin contacts 430 are deployed on the circuit board such that they extend from the circuit board at a cant angle 2200 relative to the perpendicular line 2202. The direction of this canted extension is shown by arrow 2204. While FIG. 22A shows an example where the cant angle 2200 causes a tilt in the −x direction (with respect to the reference frame shown in FIG. 22A, where the x-dimension is horizontal with respect to the page, the z-direction is vertical with respect to the page, and the y-direction extends out of and into the page), it should be understood that this cant angle 2200 could tilt in other directions off the perpendicular 2202 (where the perpendicular 2202 corresponds to the z-axis). For example, the cant angle 2200 could tilt in the +x direction, the −y direction, or the +y direction (as well as any combination of the −x/+x and −y/+y directions). An example of a cant angle 2200 that could be used is 1 degree. Another example of a cant angle 2200 that could be used is 1.5 degrees. Another example of a cant angle 2200 that could be used is 3.0 degrees. However, it should be understood that other values of cant angles could be used if desired by a practitioner. An example of a suitable range for cant angle values can be from 0.5 degrees to 10.0 degrees.

Figure 22B:
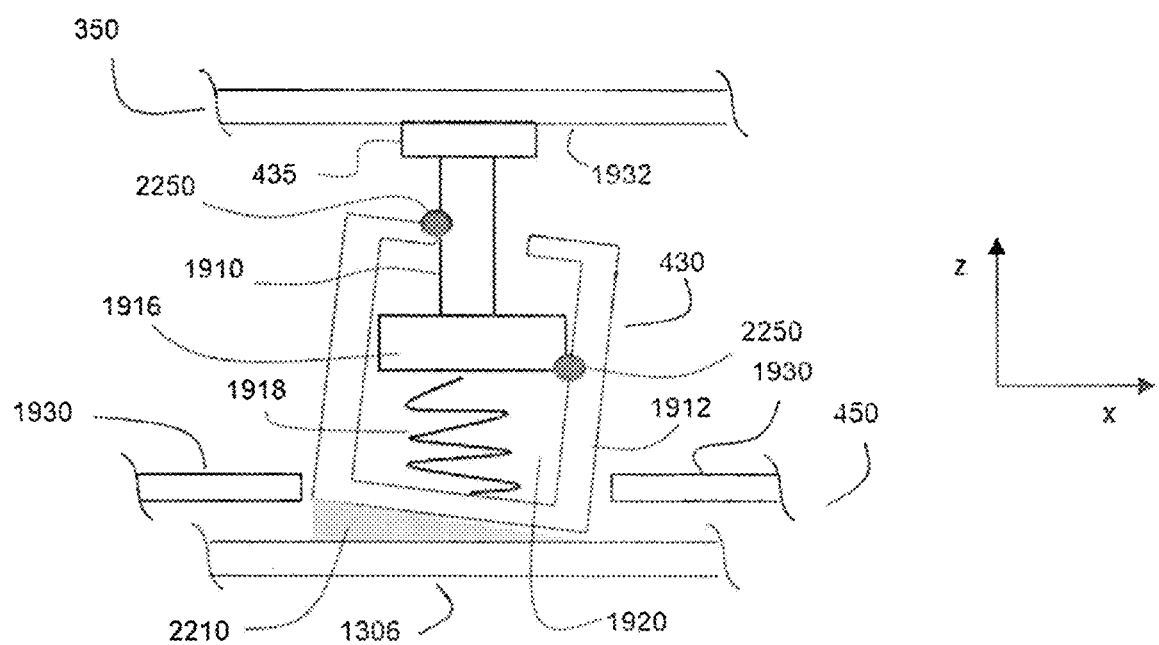
FIG. 22B shows a cross-sectional view of an example canted pogo pin contact that connects with a contact when a case enclosure is docked with a base mount.

FIG. 22B shows an example cross-sectional view of a canted pogo pin contact 430 when engaged with a contact 435 on a case mount 350 when the case mount 350 is docked to the base mount 450. The desired cant angle 2200 can be achieved by depositing the pogo pin contact casing 1912 onto the circuit board 1306 on a tilted base platform 2210 that is effective to angle the pogo pin contact casing 1912 at the desired cant angle 2200. This cant angle 2200 is expected to make it more likely that the pogo pin plunger 1910 will maintain a direct physical contact with the casing 1912 when the distal end of the plunger 1910 is engaged with contact 435 while docked. In the example of FIG. 22B, the points of direct physical contact between the plunger 1910 and the casing 1912 are shown by points 2250. It is believed that the cant angle 2200 will reduce the likelihood of the pogo pin contact 430 from exhibiting the highly inductive transient state shown by FIG. 19B where the only connection between the plunger 1910 and the casing 1912 is indirectly through spring 1918. By reducing the likelihood of entering the state of FIG. 19B, the angled pogo pin contact 430 of FIGS. 22A and 22B can lead to more reliable data connections between circuitry in the base mount 450 and case mount 350.

While the example of FIG. 22A shows a plurality of angled pogo pin contacts 430 sharing the same cant angle 2200, it should be understood that a practitioner might find it desirable to use different cant angles 2200 (and/or different cant directions in the x/y dimensions) for a plurality of different pogo pin contacts 430. For example, each pogo pin contact 430 could be tilted at a different cant angle 2200 and/or cant direction. Furthermore, a practitioner might find it desirable to tilt less than all of the pogo pin contacts 430. For example, a practitioner might find it desirable to tilt the pogo pin contacts 430 that support data connections (such as USB data connections) but not tilt other pogo pin contacts 430.

Another example of a solution to the problem of data loss is the use of a stronger spring 1918 in one or more of the pogo pin contacts 430 to more reliably establish a firmer engagement between the distal end of plunger 1910 and contact 435 when docked. Forces imparted onto the case enclosure 120 and/or base mount 450 can potentially cause movement of the case mount 350 relative to the base mount 450 in the z-direction that could create shock waves that cause the plunger 1910 to bounce off contact 435. A stronger spring 1918 can help prevent this. For example, the spring 1918 can exhibit a 25 g pre-load force characteristic and a 100 g full travel force characteristic to more reliably engage with the contact 435 when docked. Such a spring 1918 can be formed from stainless steel.

Another example of a solution to the problem of data loss is the use of intelligently shaped surfaces on the contacts 435 (and/or pogo pin contacts 430). For example, the shapes of the engagement surfaces of the contacts 430 and pogo pin contacts 435 mount can be modified to improve the reliability of the physical connection between contacts when the case enclosure 120 is docked with the base mount 450. In a conventional approach, the engagement surfaces of the contacts 430 and 435 are generally flat, with some curving at the edges to avoid sharp corners. However, it is believed that over time such surface shapes will wear down and result in instances where the contacts may periodically lose physical connection with each other in response to forces that are applied to the base mount and/or docked case enclosure.

Figure 23:
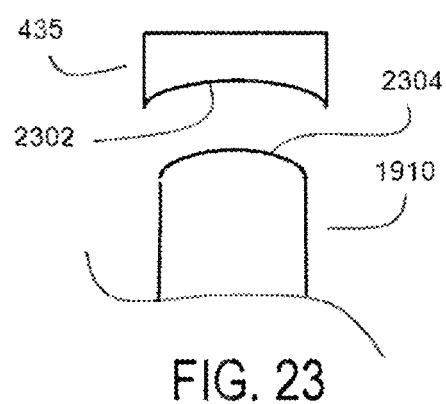
FIG. 23 shows an example of surface shapes for the contacts on the base mount and case mount that can facilitate reliable engagement when docked.

FIG. 23 shows an example embodiment where the engagement surface 2302 of contact 435 has a concave shape and where the engagement surface 2304 of pogo pin plunger 1910 is shaped to exhibit a convex shape (e.g., a rounded dome shape). Such shaping of the engagement surfaces 2302 and 2304 can yield a more reliable physical connection therebetween when docked.

However, it should be understood that a wide variety of other shapes for the engagement surfaces 2302 and/or 2304 could be employed; examples of which are discussed below.

As discussed above, in example embodiments, case mount 350 may comprise, for example, a circular-shaped body having a plurality of contact pads 435, and one or more notches 420A-420D. Also in example embodiments, base mount 450 may comprise a plurality of resilient and/or spring-loaded connector pins such as "pogo" pin contacts 430 and one or more latches 410A-410D. Case mount 350 may be matingly received by base mount 450 in a manner that engages latches 410A-410D with corresponding notches 420A-420D. In embodiments, when latches 410A-410D are engaged with corresponding notches 420A-420D, a plurality of contacts 435 (e.g. contact pads) are brought into physical contact with pogo pin contacts 430 of base mount 450. In embodiments, contacts 435 are precluded from engaging with pogo pin contacts 430 of base mount 450 until one or more of latches 410A-410D is precisely aligned with one or more of corresponding notches 420A-420D. Such precise alignment of latches 410A-410D with 420A-420D may prohibit, or at least significantly reduce, lateral and/or combined lateral and axial (perpendicular) motion of contacts 435 relative to the pogo pin contacts 430 of a base mount. In embodiments, by reducing lateral motion of contacts 435 relative to the pogo pin contacts 430 of base mount 450, the pogo pin contacts 430 can be prevented from bending and/or contorting via interaction with contacts 435.

As previously mentioned, base mount contacts 510 may comprise, for example, a number of spring-loaded connector pins, such as "pogo" pins comprising, for example, relatively slender cylinder-shaped pins, wherein a tip and/or distal portion of a pogo pin is capable of extension and/or retraction relative to a body portion of the resilient connector pin.

Figure 24A:
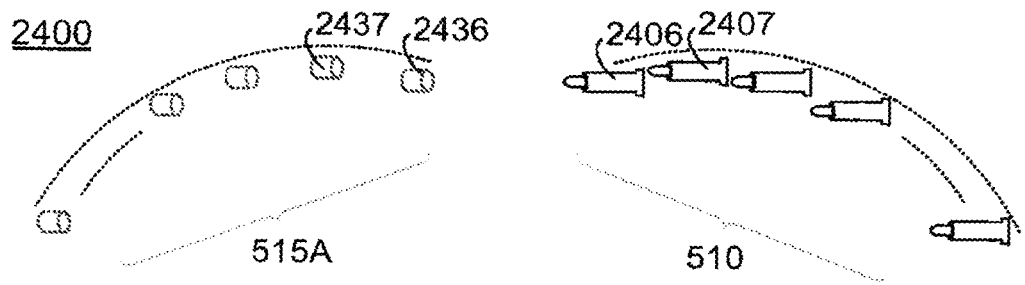
FIG. 24A is a perspective view of an arrangement of resilient connector pins of the base mount and contact pads of the case mount of FIG. 4, according to an example embodiment.

FIG. 24A is a perspective view of an example arrangement of resilient connector pins of the base mount and contacts of the case mount of FIG. 4, according to an embodiment 2400. In the embodiment of FIG. 24A, base mount connector pin group 510 is shown arranged along a portion of a circular-shaped arc, although other arrangements of base mount connector pins may be employed, such as linear arrangements, two-dimensional grid arrangements, and so forth. An example of FIG. 24A, resilient connector pin 2406 may be brought into contact with contact pad 2436. Additionally, resilient connector pin 2407 may be brought into contact with contact pad 2437. In like manner, additional resilient connector pins of connector pin group 510 may be brought into contact with corresponding contact pads of contact group 515. Additionally, although contact group 515A is shown as arranged along a portion of a circular-shaped arc, other arrangements of contacts may be employed, such as linear arrangements, two-dimensional grid arrangements, and so forth.

Figure 24B:
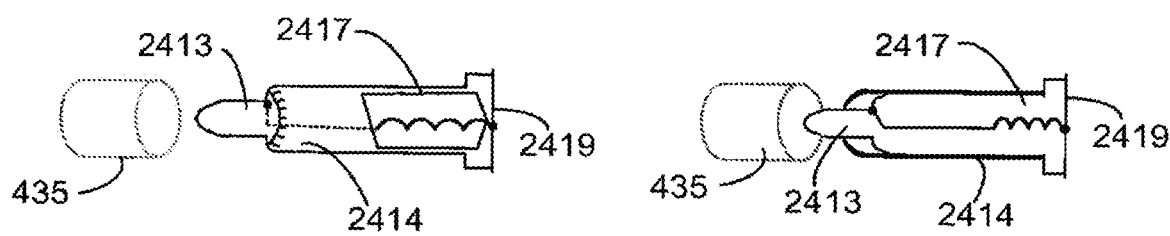
FIG. 24B is a schematic view of a resilient connector pin separated from, and in contact with, a contact pad, according to example embodiments.

FIG. 24B is a schematic view of a resilient connector pin, which may operate as a connector pin of a base mount connector pin group of a docking system. FIG. 24B additionally shows a resilient connector pin separated from a contact pad according to an embodiment 2401. FIG. 24B additionally includes a schematic view of a resilient connector pin in contact with contact pad 435. In an implementation, contact pad 435, which may comprise, for example, a conductive material, such as nickel, copper or gold, or any combination thereof, comprises, for example, an approximately cylindrical shape. As shown in FIG. 24B, a surface of contact pad 435 may establish an electrical contact with connector pin tip 2413 of a resilient connector pin. In one embodiment, as contact pad 435 is brought into contact with connector pin tip 2413, a resilient element, such as spring 2417 of the resilient connector pin, may compress, thereby exerting a force in the direction of contact pad 2435. It should be noted that although the resilient connector pin of FIG. 24B may utilize spring 2417 as a resilient element, it should be understood that other types of resilient and/or coiled elements for use in a resilient connector pin. In the embodiment of FIG. 24B, responsive to a force exerted by connector pin tip 2413 toward the surface of contact pad 435, an electrical contact between connector pin tip 2413 and contact pad 435 may be maintained.

As shown in FIG. 24B, upon contact with contact pad 435, a proximal portion of connector pin tip 2413 is shown making slidable contact at an inwardly tapered surface of a distal portion of body portion 2414 of the resilient connector pin. In many instances, slidable contact between connector pin tip 2413 and body portion 2414 of the resilient connector pin of FIG. 24B may comprise, for example, a high-integrity, metal-to-metal connection suitable for conducting an electrical signal, such as a digital signal, without introducing significant distortion in a conducted electrical signal. Accordingly, an electrical signal coupled to contact pad 435 may conduct through the contact pad and through connector pin tip 2413. Upon reaching connector pin tip 2413, the electrical signal may be conducted along body portion 2414 to arrive at connector pin base 2419. In addition, in some instances, such as responsive to a degradation in the quality of an electrical connection between connector pin tip 2413 and body portion 2414, for example, at least a portion of an electrical current conducted through connector pin tip 2413 may conduct through spring 2417, before arriving at connector pin base 2419.

Figure 24C:
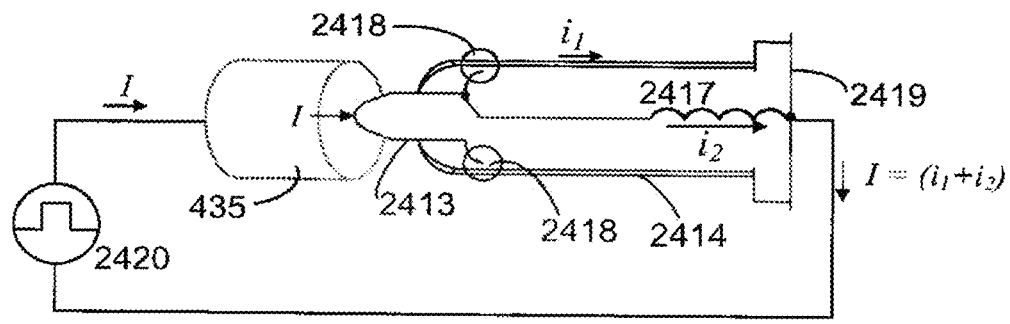
FIG. 24C is a schematic view showing electrical current flow from a signal generator through a contact pad and through a resilient connector pin, according to an example embodiment.

FIG. 24C is an example of a schematic view showing electrical current flow from a signal generator through a contact pad and through a resilient connector pin, according to an embodiment 2402. As shown in FIG. 24C, signal generator 2420, which may represent a digital signal generator, may operate in compliance with one or more revisions of the Universal Serial Bus (USB) specification. However, signal generator 2420 may be compliant with any other type of digital or analog signal generator, such as signal generators operating in compliance with standards and/or protocols such as ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25, just to name a few examples.

As shown in FIG. 24C, an electrical current (I) from signal generator 2420 may travel along a suitable electrical conductor, which may be coupled, or may be directly connected to, contact pad 435. In the embodiment of FIG. 24C, wherein connector pin tip 2413 is shown as making an electrical connection with contact pad 2435, electrical current (I) may be conveyed through connector pin tip 2413, in the direction of body portion 2414. However, at times, the integrity of slidable contact region 2418, which lies at the proximal metal-to-metal interface of connector pin tip 2413 and a distal portion of body portion 2414 of the resilient connector pin, may be insufficient to convey a large portion of electrical current (I) along body portion 2414 to pin base 2419. Accordingly, a portion, such as a significant portion, of electrical current (I), may be conducted from connector pin tip 2413, through spring 2417, to pin base 2419. Thus, as shown in FIG. 24C, an electrical current conducted from signal generator 2420, through contact pad 435, and through connector pin tip 2413. At connector pin tip 2413, an electrical current (I) may be divided between a first current portion ($i_1$), conducted along body portion 2414 to connector pin base 2419, and a second current portion ($i_2$), conducted via spring 2417 to connector pin base 2419. In the embodiment of FIG. 24C, electrical currents $i_1$ and $i_2$ may be combined at connector pin base 2419 and return to a signal ground of signal generator 2420, for example.

In particular embodiments, the integrity of an electrical connection of slidable contact region 2418, so as to maintain positive contact between connector pin tip 2413 and body portion 2414 of the resilient connector pin may vary responsive to various environmental conditions, such as mechanical shock and/or mechanical vibration subjected to the resilient connector pin. For example, in particular instances, such as instances in which the resilient connector pin of FIG. 24C is deployed in a relatively benign mechanical environment (e.g., relatively low levels of mechanical vibration and/or mechanical shock) slidable contact between connector pin tip 2413 and body portion 2414 may comprise, for example, a relatively low-impedance connection. In embodiments, a relatively low-impedance electrical connection between connector pin tip 2413 and body portion 2414 may be brought about via significant metal-to-metal contact at slidable contact region 2418 between tip 2413 and body portion 2414. Consequently, a significant portion of electrical current (I) may be conducted along body portion 2414, and a relatively small (or even negligible) portion of an electrical current may be conducted through spring 2417 ($i_1 > i_2$ or $i_1 \gg i_2$) to reach connector pin base 2419.

However, responsive to the resilient connector pin of FIG. 24C being utilized in a relatively harsh mechanical environment (e.g., relatively high levels of mechanical vibration and/or mechanical shock) slidable contact region 2418, between connector pin tip 2413 and body portion 2414, may comprise, for example, a relatively high-impedance interface. In embodiments, a relatively high-impedance interface between connector pin tip 2413 and body portion 2414 may be brought about via slidable contact region 2418 comprising, for example, decreased metal-to-metal contact area. In other embodiments, a relatively high-impedance interface between connector pin tip 2413 and body portion 2414 may be brought about responsive to other conditions, such as increased oxidation of metallic surfaces of slidable contact region 2418, just to name an example. Consequently, a significant portion of electrical current (I) may be conducted through connector pin tip 2413 and through spring 2417, while a relatively small portion may be conducted along body portion 2414 ($i_2 > i_1$ or $i_2 \gg i_1$). In addition, in particular embodiments, impedance of slidable contact region 2418 between connector pin tip 2413 and body portion 2414 may vary in a substantially unpredictable manner, for example, in which during a first duration, and $i_2 > i_1$ during a second duration. In embodiments, the first duration and the second duration may vary widely, such as from about 10.0 μs to about 10.0 minutes, for example, yet it should be understood that alternate time durations are possible. It should also be noted that the first and second durations, during which a ratio of $i_1$ to $i_2$, may vary widely, may comprise, for example, a quality of being substantially intermittent and/or unpredictable.

Figure 25A:
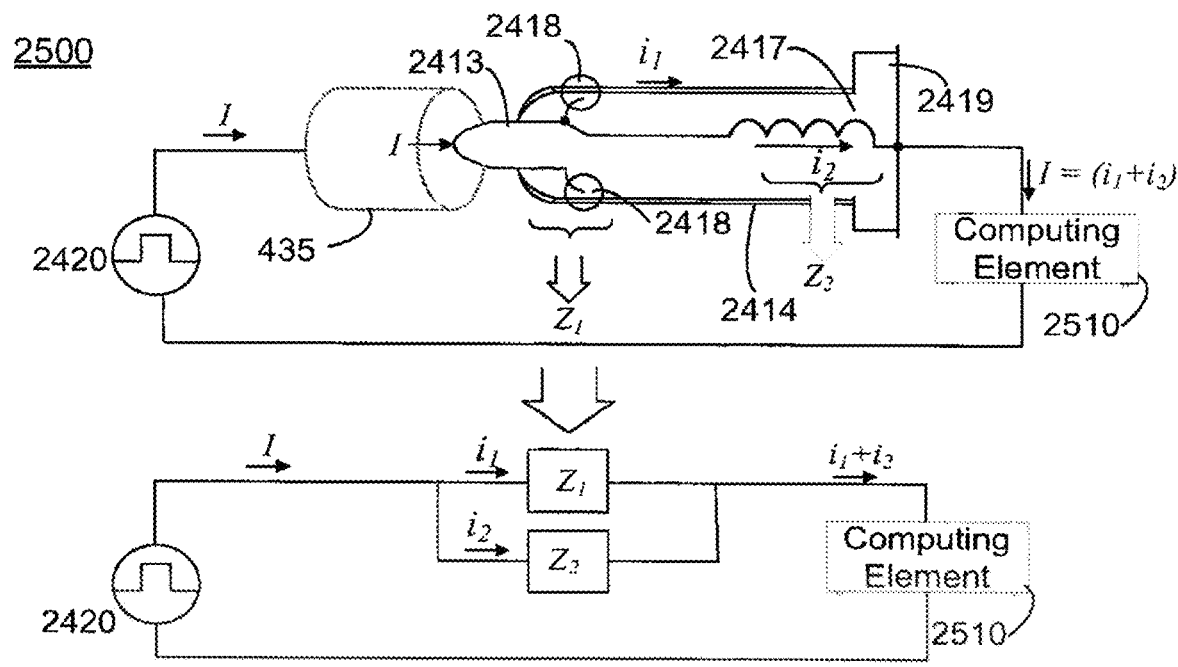
FIGS. 25A-25B are schematic views and equivalent circuits to show electrical current flow from a signal generator through a contact pad and through a resilient connector pin to a computing element, according to an example embodiment.
Figure 25B:
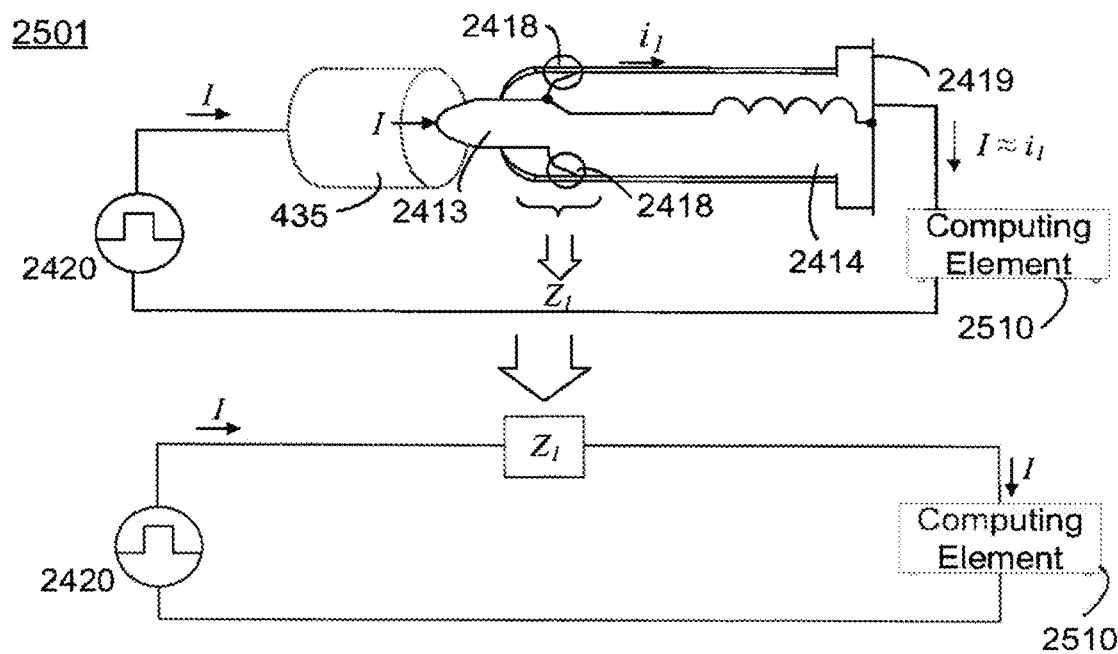

FIGS. 25A-25B are schematic views and equivalent circuits to show electrical current flow from a signal generator through a contact pad and through a resilient connector pin to a computing element, according to an embodiment 2500. As described with reference to FIG. 24C, impedance of slidable contact region 2418, between connector pin tip 2413 and body portion 2414 of the resilient connector pin, may unpredictably and/or intermittently vary. Accordingly, as indicated in FIG. 25A, responsive to coupling of a resilient connector pin to computing element 2510, the computing element may receive a digital signal, such as a signal generated by signal generator 2420, wherein the received signal comprises, for example, a combination of electrical currents $i_1$ and $i_2$. In one particular embodiment, computing element 2510 may represent a USB 2.0-compliant device, which may operate at an information transfer rate of approximately 400.0 Mb per second, for example. However, the computing element 2510 may operate at other information transfer rates (e.g., such as a rate of less than 400.0 Mb per second, such as 100.0 Mb per second, 200.0 Mb per second, etc.). In other embodiments, computing element 2510 may operate at greater information transfer rates, such as 500.0 Mb per second, 750.0 Mb per second, 800.0 Mb per second, and so forth.

In the embodiment of FIG. 25A, slidable contact region 2418 between connector pin tip 2413 and body portion 2414 may be modeled as a first impedance ($Z_1$). In particular embodiments, such as those instances in which a slidable contact region 2418 between connector pin tip 2413 and body portion 2414 comprises, for example, a high-integrity connection, such as responsive to significant metal-to-metal contact between connector pin tip 2413 and body portion 2414, first impedance ($Z_1$) may comprise, for example, a relatively small resistance value, such as between about 5.0 milliohm and about 30.0 milliohm. Additionally, first impedance ($Z_1$) may comprise, for example, a substantially negligible range of values of parasitic capacitance and/or inductance, such as a capacitance below approximately 1.0 pF and an inductance of less than 50.0 picohenry, for example.

Also in the embodiment of FIG. 25A, spring 2417 may be modeled as a second impedance ($Z_2$). However, at least partially in response to spring 2417 comprising, for example, a coil-like structure, spring 2417 may comprise, for example, a parasitic inductance, for example, substantially higher than ($Z_1$), such as between about 5.0 nanohenry to about 15.0 nanohenry. Accordingly, utilizing expression (1), below, it may be appreciated that, at least in particular embodiments, reactive impedance of spring 2417 may be computed according to expression (1):

$$Z_2 = j\omega L \quad (1)$$

Accordingly, in an embodiment in which spring 2417 comprises, for example, an inductance of 10.0 nanohenry and an information transfer rate of 400.0 Mb per second, expression (1) may be utilized to compute $Z_2$:

$$Z_2 = j(2)(400.0 \times 10^6)(1.0 \times 10^{-9}) \quad (2)$$

$$Z_2 = j25.0 \Omega \text{(Reactive)}$$

In which the information transfer rate of 400.0 Mb per second has been utilized to compute reactive impedance of spring 2417, without accounting for a harmonic content of signals generated, for example, by signal generator 2520.

FIG. 25B is a schematic view and equivalent circuit to show current flow from a signal generator through a contact pad and resilient connector pin to a computing element, according to an embodiment 2501. As indicated in FIG. 25B, if slidable contact region 2418 comprises a high-integrity connection, which may refer to an electrical connection comprising significant metal-to-metal contact between connector pin tip 2413 and body portion 2414, slidable contact region 2418 may comprise, for example, a relatively low-impedance connection ($Z_1$), such as a connection comprising a resistance of, for example, between about 5.0 milliohm and about 30.0 milliohm.

Figure 25C:
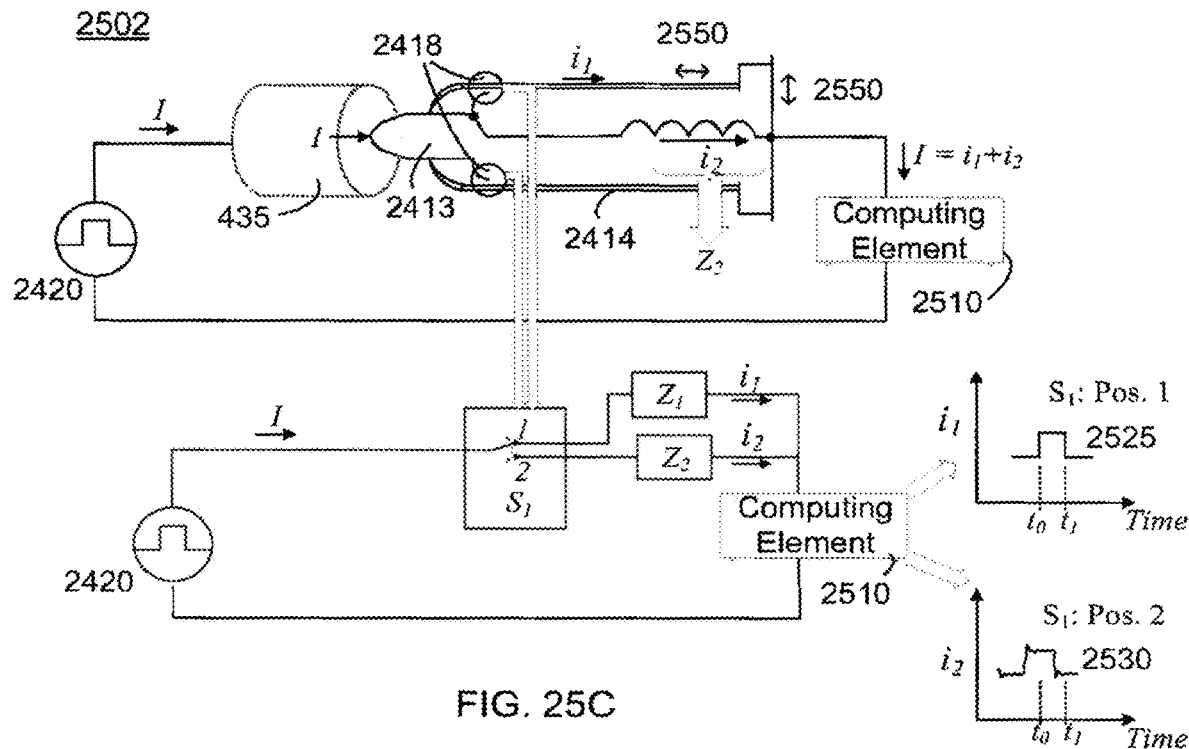
FIG. 25C is a schematic view and equivalent circuit to show an effect, on a signal waveform, of intermittent contact between a connector pin tip to a body portion of a resilient connector pin, according to an example embodiment.

FIG. 25C is a schematic view and equivalent circuit to show an effect, on a signal waveform, of intermittent contact between a resilient connector pin tip to a body portion of a resilient connector pin, according to an embodiment 2502. In FIG. 25C, arrows 2550 indicate that a resilient connector pin may be subjected to an increased level of mechanical vibration and/or mechanical shock. In particular embodiments, such mechanical vibration and/or mechanical shock may be responsive to use of resilient connector pins in an industrial environment, such as motion-prone environments comprising, for example, rotating or moving machinery, just as one possible example, yet use of resilient connector pins is intended to embrace a wide variety of environments.

In the embodiment of FIG. 25C, responsive to application of vibrations and/or mechanical shock to a resilient connector pin, slidable contact region 2418 may intermittently and/or randomly transition between a relatively high-integrity electrical connection and a relatively low-integrity electrical connection, which refers to an electrical connection lacking significant physical contact between adjacent metal surfaces. In addition, there may be significant discontinuities within slidable contact region 2418, which may, for example, introduce electrical noise, thereby degrading signal quality. Such transitioning may be brought about by motion of connector pin tip 2413 with respect to body portion 2414, which may momentarily increase and momentarily decrease metal-to-metal contact area of slidable contact region 2418. In some instances, motion of connector pin tip 2413 relative to body portion 2414 may give rise to momentary complete discontinuity of connector pin tip 2413 with respect to body portion 2414. Thus, responsive to relative motion of connector pin tip 2413 with respect to body portion 2414, electrical current from signal generator 2520 (I) may be intermittently and/or randomly divided between a first current ($i_1$), which may conduct through body portion 2414, and a second current ($i_2$), which may conduct through spring 2417. At connector pin base 2419, first current ($i_1$) and second current ($i_2$) may recombine to form current (I) for delivery to computing element 2510. It should be noted that relative motion of connector pin tip 2413 with respect to body portion 2414 may bring about other influences affecting an electrical current from signal generator 2420.

Thus, as shown in FIG. 25C, slidable contact region 2418, responsive to increased levels of mechanical vibration and/or mechanical shock (as indicated by arrows 2550), may be modeled by switch $S_1$, which may operate to intermittently and/or randomly switch between a first switch position (1) and a second switch position (2). In a first switch position (1), current from signal generator 2420 may conduct primarily along body portion 2414 and to computing element 2510. Thus, in a first switch position (1) current delivered to computing device 2510 may predominantly comprise, for example, current conducted along body portion 2414, as indicated by $I \approx i_1$ in FIG. 25C (and discussed further in reference to FIG. 25D). In contrast, in a second switch position (2), current delivered to computing device 2510 may be divided between current conducted along body portion 2414 and current conducted through spring 2417, as indicated by $I = i_1 + i_2$ in FIG. 25C (and discussed further in reference to FIG. 25D). It should be noted that although $S_1$ is shown as comprising two switch states (e.g., a first switch position and a second switch position), in particular embodiments, motion of connector pin tip 2413 relative to pin body 2414 may be depicted as a switch having any number of intermittent and/or randomly selected states, such as 3 switch states, 4 switch states, 5 switch states, 10 switch states, virtually without limitation.

Figure 25D:
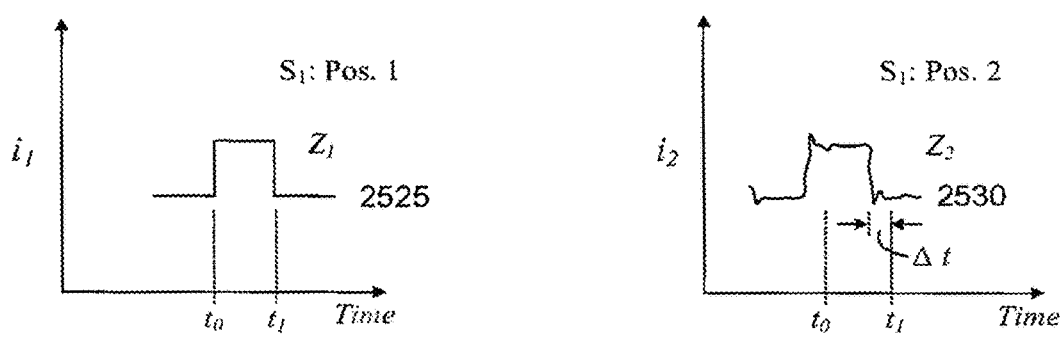
FIG. 25D shows first and second signal waveforms corresponding to electrical currents from a signal generator conducted through a resilient connector pin, according to example embodiments.

FIG. 25D shows first and second signal waveforms corresponding to electrical currents from a signal generator and conducted through a resilient connector pin, according to embodiment 2503. In a first example, which may correspond to an electrical current conducted predominantly through body portion 2414 of a resilient connector pin (e.g., relatively minor or insignificant current flow through spring 2417) a signal waveform may undergo, for example, negligible distortion. Accordingly, signal waveform 2525 may comprise, for example, a faithful reproduction of a waveform generated by a signal generator, such as signal generator 2420. In addition, responsive to faithful reproduction of the waveform generated by signal generator 2420, waveform 2525 indicates rising and falling edges occurring within expected timing windows, as indicated by times $t_0$ and $t_1$ of the time axis of FIG. 25D.

However, in a second example, which may occur responsive to an electrical current from signal generator 2420 being conducted primarily through spring 2417 operating as an inductive circuit element (negligible current conducted through body portion 2414). Accordingly, waveform 2530 may comprise, for example, a distorted version of a signal waveform generated by a signal generator, such as signal generator 2420. In addition, distortion indicated by waveform 2530, and also responsive to current flow through spring 2417 operating as an inductive circuit element, waveform 2530 may be additionally delayed in time. Thus, as shown FIG. 25D, a leading edge of waveform 2530 is indicated as being delayed from an expected time $t_1$ by an amount $\Delta t$.

Thus, as shown and described in reference to FIG. 25A-25D, mechanical vibration and/or mechanical shock, for example, may bring about intermittent and/or random changes to an impedance of a resilient connector pin, such as a pogo pin, for example. Such intermittent and/or random changes may degrade quality of a signal waveform, for example, conducting via the resilient connector pin. Such degradations in quality may give rise to distortions in a shape of a signal waveform, for example, as well as giving rise to delays in signal waveforms responsive to a portion of a signal waveform being diverted through a resilient element (e.g., a spring) of a connector pin, which may operate as an inductive circuit element. Intermittent and/or random changes to an impedance of a resilient connector pin may give rise to additional degradations in quality of a signal waveform. In particular embodiments, such as those in which computing element 2510, for example, comprises, for example, a high-speed data communications receiver, such as a USB device, utilizing an information transfer rate of, for example, 400 Mb per second, may bring about increases, for example, in observed bit error rate, communication session interruption, loss of data packets, and/or loss of data frames.

Figure 26:
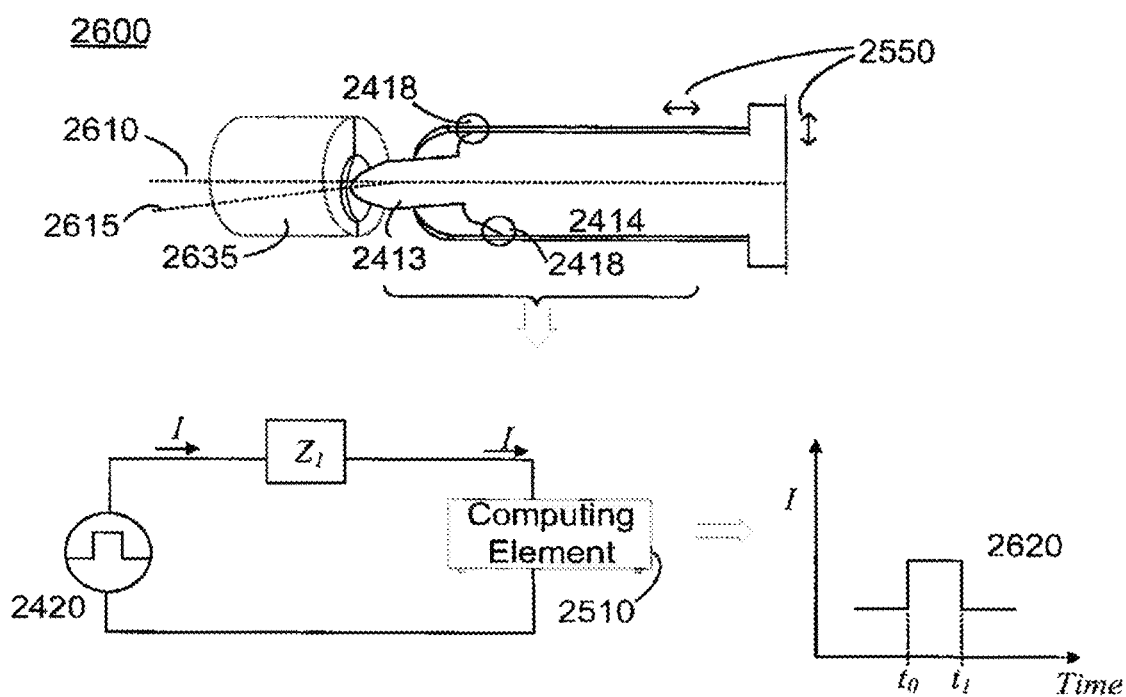
FIG. 26 is a schematic view and equivalent circuit to show an effect of a contact pad for off-axis connection of a connector pin tip of a resilient connector pin, according to an example embodiment.

FIG. 26 is a schematic view and equivalent circuit to show art effect of a contact pad for off-axis connection of a resilient connector pin, according to an embodiment 2600. FIG. 26 indicates longitudinal axis 2610. In the embodiment of FIG. 26, connector pin tip 2413, having an axis 2615 is oriented off-axis with respect to longitudinal axis 2610 via a depression or an indentation that has been machined or otherwise formed into a surface of contact pad 2635. Accordingly, responsive to orientation of connector pin tip 2413 in an off-axis direction, as shown via connector pin tip axis 2615, slidable contact region 2418 may maintain significant metal-to-metal contact between connector pin tip 2413 and body portion 2414. Further, in implementations, slidable contact region 2418 may maintain significant metal-to-metal contact while the resilient connector pin and contact pad of FIG. 26 are exposed to relatively high levels of mechanical vibration and/or mechanical shock.

Responsive to connector pin tip 2413 oriented in an off-axis direction, shown via connector pin tip axis 2615, slidable contact region 2418 may maintain a relatively-integrity connection between connector pin tip 2413 and body portion 2414. Thus, the resilient connector pin of FIG. 26 may present a first impedance ($Z_1$) comprising, for example, a relatively small resistance value, such as between about 5.0 milliohm and about 30.0 milliohm. Thus, as indicated in FIG. 26, a waveform generated by a signal generator, such as signal generator 2420, may be faithfully reproduced at input signal terminals of a computing element, such as computing element 2510. In addition, timing constraints, such as leading and falling edges of waveform 2620 may fall within expected timing windows, as indicated by times $t_0$ and $t_1$, of the time axis of FIG. 26.

FIGS. 27A-27D are schematic and/or perspective views of various examples of contact pad surface topologies to bring about off-axis connection of the connector pin tip to a contact pad, according to embodiments. However, it should be noted that a number of different contact pad surface topologies, shapes, profiles, contours etc. may be employed to bring about off-axis connection of a connector pin to a contact pad.

Figure 27A:
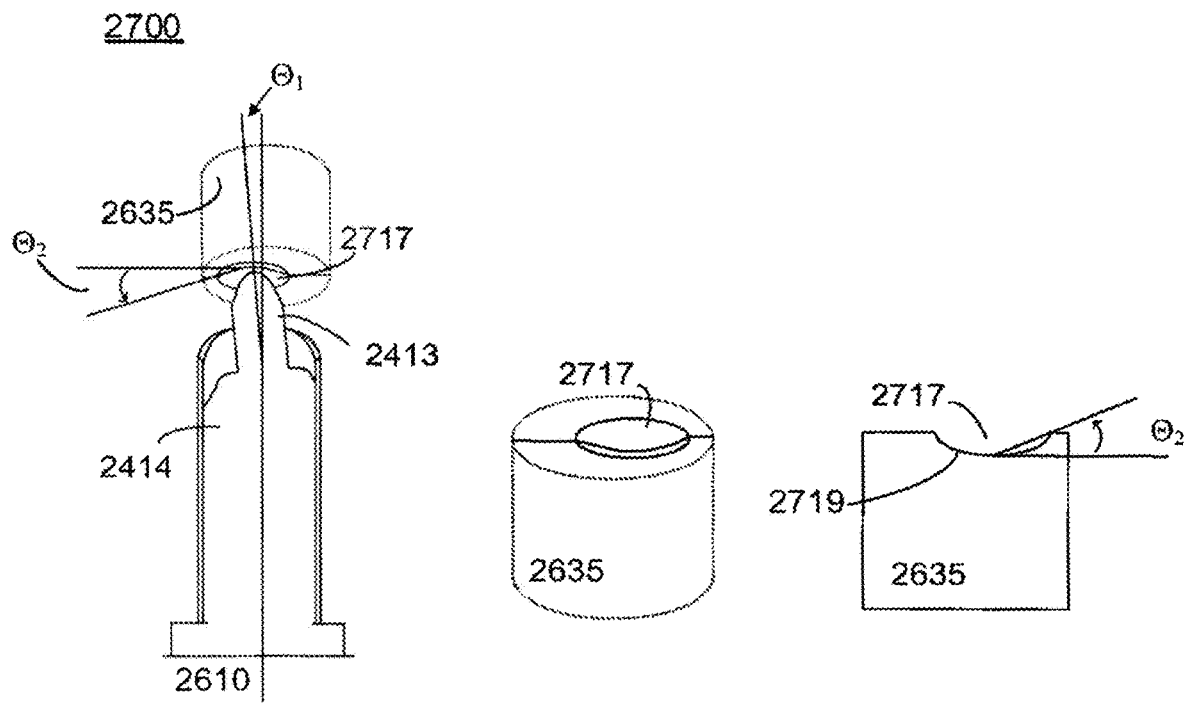

In FIG. 27A, connector pin tip 2413, cooperating with contact pad 2635, is shown as oriented off-axis by an angle ($\theta_1$), approximately in the range of between about 3.0° and about 10.0° with respect to an axis of body portion 2414 of a resilient connector pin. In particular embodiments, an off-axis orientation of connector pin tip 2413 lies outside of a manufacturing tolerance for off-axis orientation of a pin tip of a resilient connector pin. For example, in a particular embodiment, a manufacturing tolerance in the pin axis, such as axis 2610, of connector pin tip 2413 may comprise, for example, a value of between 1.0° and 2.0° with respect to the axis of the resilient connector pin of FIG. 27A, for example. Accordingly, as shown in FIG. 27A, depression 2717 is positioned so as to orient connector pin tip 2413 outside of an off-axis manufacturing tolerance. Accordingly, in embodiments, by positioning depression 2717 so as to bring about an off-axis tilt or slant of greater than, for example, about 2.0°, connector pin tip 2413 may settle and/or be retained by depression 2717. In embodiments, such off-axis retaining of connector pin tip 2413 may bring about a relatively high-integrity connection between connector pin tip 2413 and body portion 2414. Further, for the case of connector pin tip 2413 making initial contact with a portion of the surface of contact pad 2635 that is outside of depression 2717, such as may occur during initial installation of base mount 450 with case mount 350. In embodiments, responsive to mechanical vibration and/or mechanical shock, connector pin tip 2413 may quickly migrate from an initial location and seat within depression 2717. In addition, responsive to mechanical vibration and/or mechanical shock, slidable contact region 2418 may be continually (or at least intermittently) cleaned via a brushing and/or wiping action of connector pin tip 2413 by body portion 2414. Such wiping and/or brushing of the metal-to-metal components that comprise, for example, slidable contact region 2418 may operate to maintain a high-integrity electrical connection between connector pin tip 2413 and body portion 2414.

FIG. 27A additionally shows a perspective view of contact pad 2635 indicating an approximately elliptical shape of depression 2717 of contact pad with respect to an adjacent surface, in accordance with an embodiment. However, contact pads having one or more depressions, such as depression 2717, may be circular in shape, rectangular or polygonal in shape, or any other possible geometrically depressive shape virtually without limitation including a linearly-sloped basin, as described with reference to FIG. 28. In addition, although depression 2717 of FIG. 27A indicates a rounded basin 2719, it should be understood other possible basin shapes are possible. FIG. 27A additionally shows a side view of contact pad 2635 indicating depression angle ($\theta_2$). In particular embodiments, depression angle ($\theta_2$) of between 20.0° and 60.0° may provide a sufficiently large surface area to capture and retain a connector pin tip under conditions of mechanical vibration and/or mechanical shock. In one particular embodiment, depression angle of between about 30.0° and 40.0° (e.g., 35.0°) may bring about rapid capture of a resilient connector pin under conditions of mechanical vibration and/or mechanical shock. However, it should be noted that these examples represent only a small subset of possible examples, and other angle variations are possible.

Figure 27B:
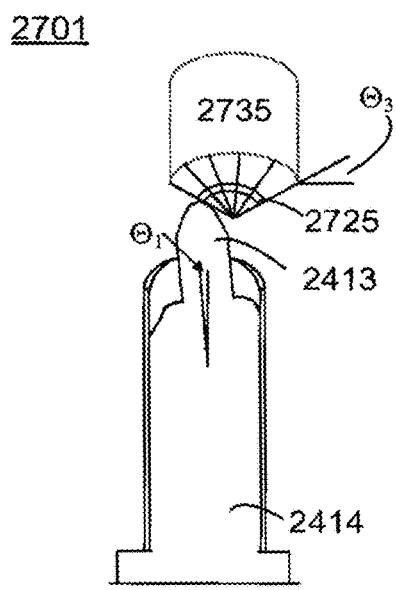

FIG. 27B is a perspective view of a resilient connector pin in contact with a contact pad comprising, for example, a substantially conically-shaped surface, in accordance with an embodiment 2701. In the embodiment of FIG. 27B, responsive to contact pad 2735 contacting connector pin tip 2413 of a resilient connector pin, connector pin tip 2413 may be deflected in an off-axis direction. In particular embodiments, connector pin tip 2413 may be deflected so as to be oriented to an angle ($\theta_1$) of between about 3.0° at about 10.0° with respect to a central axis of the resilient connector pin of FIG. 27B. In particular embodiments, a conically-shaped surface of contact pad 2735 may comprise, for example, a slope ($\theta_3$) of between about 15.0° and about 60.0°. One aspect of the conically-shaped connector pin tip of FIG. 27B may arise from the possibility for connector pin tip 2413 to traverse in a circular direction about a tip of the conically-shaped surface of contact pad 2735 responsive to mechanical shock and/or mechanical vibration applied to the resilient connector pin and/or contact pad 2735. In particular embodiments, such movement in a circular direction about a tip of the conically-shaped surface of contact pad 2735 may give rise to connector pin tip wearing groove or trenchlike structure 2725 into contact pad 2735. In particular embodiments, such wearing of a groove or trenchlike structure may maintain a clean metal-to-metal interface between a connector pin tip and a contact pad. Wearing of a groove or trench like structure may bring about additional effects.

Figure 27C:
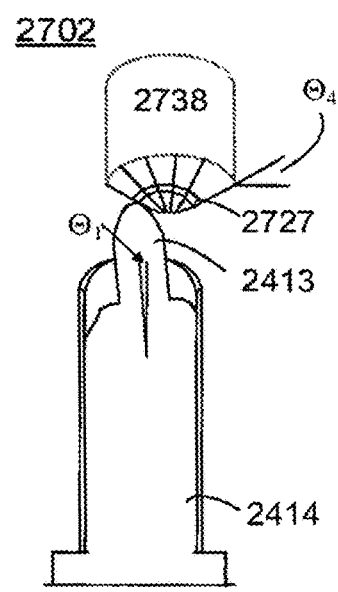
Figure 29A:
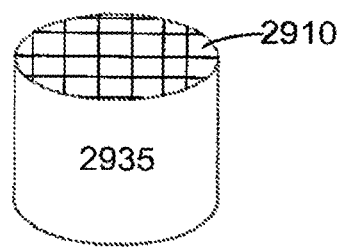
FIGS. 29A-29D are perspective views of a contact pad, according to additional example embodiments.
Figure 29B:
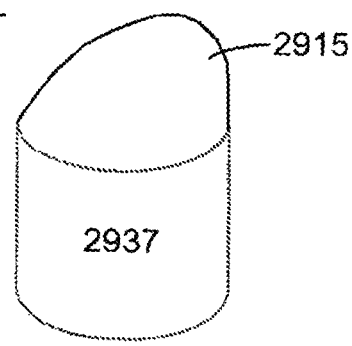
Figure 29C:
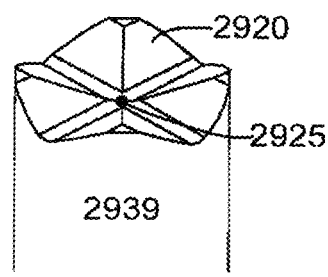
Figure 29D:
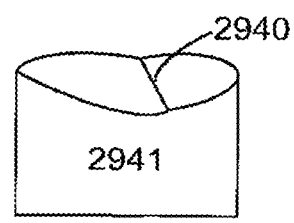

FIG. 27C is a perspective view of a resilient connector pin in contact with a contact pad comprising, for example, an at least partially rounded or bullnosed surface, in accordance with an embodiment 2702. In the embodiment of FIG. 27C, responsive to contact pad 2738 contacting connector pin tip 2413 of a resilient connector pin, connector pin tip 2413 may be deflected in an off-axis direction (indicated by $\theta_1$) of between about 3.0° at about 10.0° with respect to a central axis of a resilient connector pin. In particular embodiments, an at least partially rounded surface of contact pad 2738 may comprise, for example, a slope ($\theta_4$) of between about 15.0° and about 60.0°. Similar to the example of FIG. 27B, the connector pin tip 2413 may traverse in a circular direction about the surface of contact pad 2738 responsive to mechanical shock and/or mechanical vibration applied to the resilient connector pin and/or contact pad. In particular embodiments, such movement in a circular direction may give rise to connector pin tip wearing a groove or trenchlike structure 2727 into contact pad 2738. In particular embodiments, such wearing of a groove or trenchlike structure may maintain a clean metal-to-metal interface between a connector pin tip and contact pad. Wearing of a groove or trench like structure may bring about additional effects.

It should be noted, however, that the at least partially rounded or bullnosed surface for contact pad 2738, in accordance with embodiment 2702, may provide an advantage in maintaining physical contact between pin tip 2413 and contact pad 2738. For example, in a possible embodiment in which pin up 2413 and contact pad 2735 (of embodiment 2701) operate in a relatively harsh mechanical environment (e.g., relatively high levels of mechanical vibration and/or mechanical shock) pin tip 2413 may be permitted to skip or hop over the pointed or sharpened point of contact pad 2735. Accordingly, in such an instance, electrical contact between pin tip 2413 and contact pad 2735 may be momentarily interrupted. However, in accordance with embodiment 2702, use of a rounded or bullnosed surface, such as shown in FIG. 27C may preclude such hopping or skipping over a sharpened portion of a contact pad, such as contact pad 2738.

FIG. 27D is a perspective view of a resilient connector pin in contact with a contact pad comprising, for example, a slanted or beveled surface, in accordance with an embodiment 2703. In the embodiment of FIG. 27D, responsive to contact pad 2745 contacting connector pin tip 2413 of a resilient connector pin, connector pin tip 2413 may be deflected in an off-axis direction (indicated by $\theta_1$) of between about 3.0° at about 10.0° with respect to a central axis of a resilient connector pin. In particular embodiments, a beveled surface of contact pad 2745 may comprise, for example, a slope ($\theta_5$) of between 15.0° and 60.0°. One aspect of the beveled contact pad of FIG. 27D may arise from the possibility for connector pin tip 2413 to laterally traverse across a portion of a surface of the beveled contact pad responsive to mechanical shock and/or mechanical vibration applied to the resilient connector pin and/or contact pad 2745. In particular embodiments, such movement in a lateral direction across a beveled surface of a contact pad may give rise to connector pin tip wearing a groove or trenchlike structure into contact pad 2745. In particular embodiments, such wearing of a groove or trenchlike structure may maintain a clean metal-to-metal interface between a connector pin tip and contact pad. Wearing of a groove or trench like structure may bring about additional effects.

FIG. 28 is a perspective of a contact pad comprising, for example, a linearly-sloped basin, according to an embodiment 2800. As shown in FIG. 28, a linearly-sloped basin of a contact pad may slope from a surrounding relatively flat surface to local minima 2820. Local minima 2820 may be offset from a geometrical center of contact pad 2835 by any convenient amount. In addition, sloped surfaces between local minima 2820 and a surrounding relatively flat surface may comprise, for example, differing slope angles, as shown in FIG. 28. For example, a first surface of a linearly-sloped basin may comprise, for example, a first angle ($\theta_6$) with respect to a surface of a contact pad, while a second surface of a linearly-sloped basin may comprise, for example, a second angle ($\theta^7$) for example. In embodiments, first angle ($\theta_6$) and second angles ($\theta_7$), of FIG. 28 may comprise values anywhere between, for example, about 10.0° and about 70.0°, but other angle values are possible.

FIGS. 29A-29D are perspective views of a contact pad comprising additional embodiments of contact pads. For example, in an embodiment 2900 of FIG. 29A, surface 2910 of contact pad 2935 may be abraded, scored, and/or scoured to provide a mesh surface, which may retain a connector pin tip utilizing, for example, friction between surface 2910 and a connector pin tip. In embodiment 2901, (FIG. 29B), a rounded portion of a surface of contact pad 2937 may comprise, for example, a local maximum that is oriented toward a perimeter of the contact pad. In embodiment 2902, (FIG. 29C), contact pad 2939 may comprise, for example, cross-cut surface 2920, which may operate to retain a connector pin tip at or proximate with a crosscut intersection 2925. It should be noted, that in particular embodiments, crosscut intersection 2925 may be moved toward a perimeter of a contact pad, thereby operating to retain a connector pin tip in an off-axis orientation. In another embodiment, such as embodiment 2903 of FIG. 29D, a contact pad may comprise grooved surface, for example, comprising a local minima 2940. Local minima 2940 may be positioned near a perimeter of a contact pad, so as to retain a connector pin tip in an off-axis orientation.

Dock Detection Signal to Control Various Circuit Operations

As noted above, the inventors also disclose how a dock detection signal can be used to controllably enable a data connection between the case enclosure and the base mount. In this fashion, the docking system can better ensure that a reliable docking of the case enclosure and base mount has been established before enabling the data connection between the case enclosure and the base mount. The inventors also disclose how the dock detect signal can be used to more reliably maintain data communications with other peripherals such as credit card readers that may be connected to a docking system. Further still, the inventors disclose that other circuit operations can be controllably triggered in response to the dock detection signal to improve the docking system.

Figures 30A, 30B:
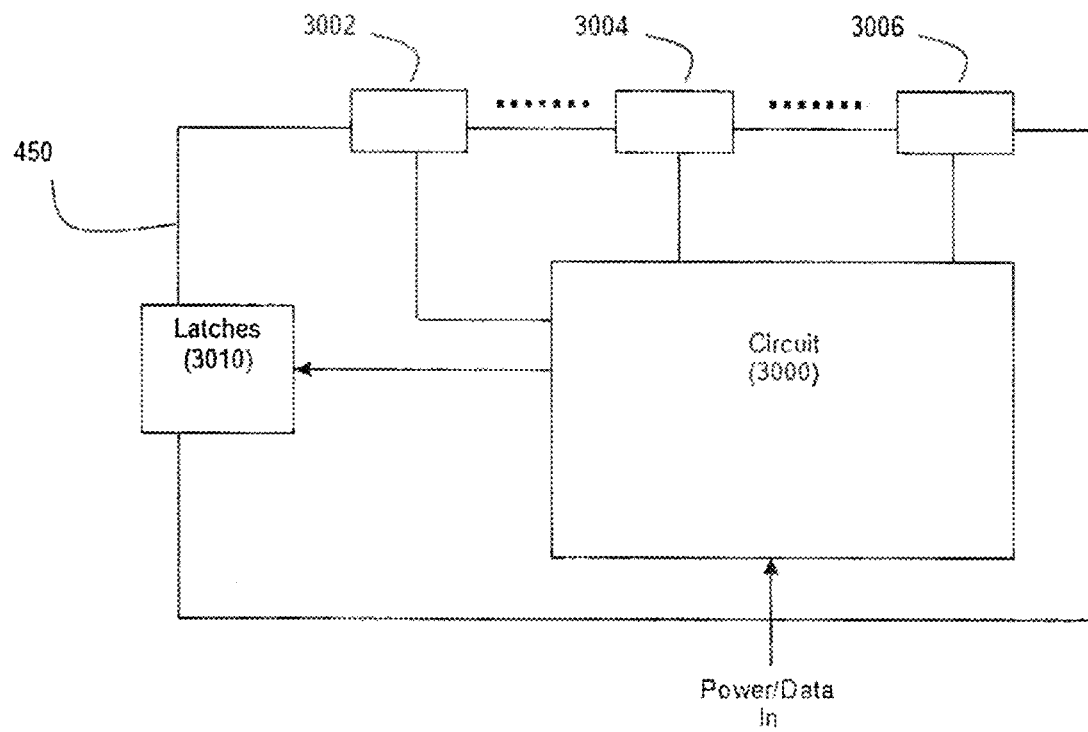
FIG. 30A shows an example circuit in cooperation with a plurality of contacts, including a dock detection contact.
FIG. 30B shows an example tri-state arrangement for a dock detection contact.

FIG. 30A discloses an example base mount 450 where a circuit 3000 is connected to a plurality of base mount contacts 3002, 3004, and 3006. These contacts 3002, 3004, and 3006 are positioned for engagement with complementary contacts on the case enclosure 120 when the case enclosure 120 is docked with the base mount 450. Contacts 3002, 3004, and 3006 may take the form of pogo pin contacts 430 as discussed above. Furthermore, while FIG. 30A illustrates three contacts 3002, 3004, and 3006 for ease of illustration, it should be understood that more contacts may be used by a practitioner (e.g., see FIG. 3). The base mount 450 may also include a plurality of latches 3010 that are controlled by the circuit 3000 (an example of which is discussed above with the solenoid control of latches 410) Examples of circuitry that can be employed in circuit 3000 are shown by FIG. 6. Circuit 3000 may also receive power and data from external sources as indicated by FIG. 30A (see also FIG. 6).

Each contact 3002, 3004, and 3006 may carry a different signal that serves a different purpose. For example, contact 3002 may be used for data transfer between the base mount 450 and case enclosure 120, contact 3004 may be used as a dock detection pin; and contact 3006 may be used to deliver power to the case enclosure 120. While FIG. 30A shows a single data transfer contact 3002 for ease of illustration, it should be understood that multiple contacts may serve as data transfer contacts. Similarly, while FIG. 30A shows a single power transfer contact 3006 for ease of illustration, it should be understood that multiple contacts may serve as power transfer contacts. Similarly, multiple contacts may provide dock detection functionality if desired by a practitioner.

In an example embodiment, the interface between the base mount 450 and case mount 350 can be a USB interface through which data is transferred via contact 3002. Furthermore, the messaging protocol of a data signal passed via contact 3002 may be of a type which does not guarantee data delivery. However, it should be understood that other message protocols with different standards of data reception can be employed if desired by a practitioner.

Circuit 3000 may include a signal processing circuit that is capable of detecting a signal presence on the dock detect contact 3004 to determine whether a case enclosure 120 has been docked with the base mount 450. This signal will be present on contact 3004 when contact 3004 physically contacts a complementary contact on the case enclosure 120. Accordingly, the presence of this signal can indicate that a docking state exists, and the absence of this signal can indicate that an undocking state exists. The circuit 3000 can trigger any of a variety of circuit operations in response to detecting a dock via dock detect contact 3004.

For example, the circuit 3000 can maintain at least three operational states based on a status of the dock detect contact 3004, and the circuit 3000 can control a voltage at the dock detect contact 3004 based on the operational state of the docking system. As seen in FIG. 30B, the docking system can include operational states of (1) "docked and locked" where a case enclosure 120 is both docked with the base mount 450 and locked in the docked position, (2) "docked and unlocked" where the case enclosure 120 is still docked with the base mount 450, but it has been unlocked from the base mount 450 to permit undocking by a user, and (3) "undocked" where the case enclosure 120 has been undocked from the base mount 450 (where it should be understood that this means that the base mount 450 has also unlocked the case enclosure 120). Each operational state can have a different dock detect voltage that is controlled by circuit 3000. For example, V1 for the "docked and locked" state can be 2.5V; V2 for the "docked and unlocked" state can be 0V; and V3 for the "undocked" state can be 5V. However, it should be understood that other dock detect voltages could be employed.

In the example of FIG. 30B, the dock detect contact 3004 can be characterized as a tri-state dock detect pin. As explained below, various circuit operations can be triggered based on which of the three states is present.

Figures 31A, 31B:
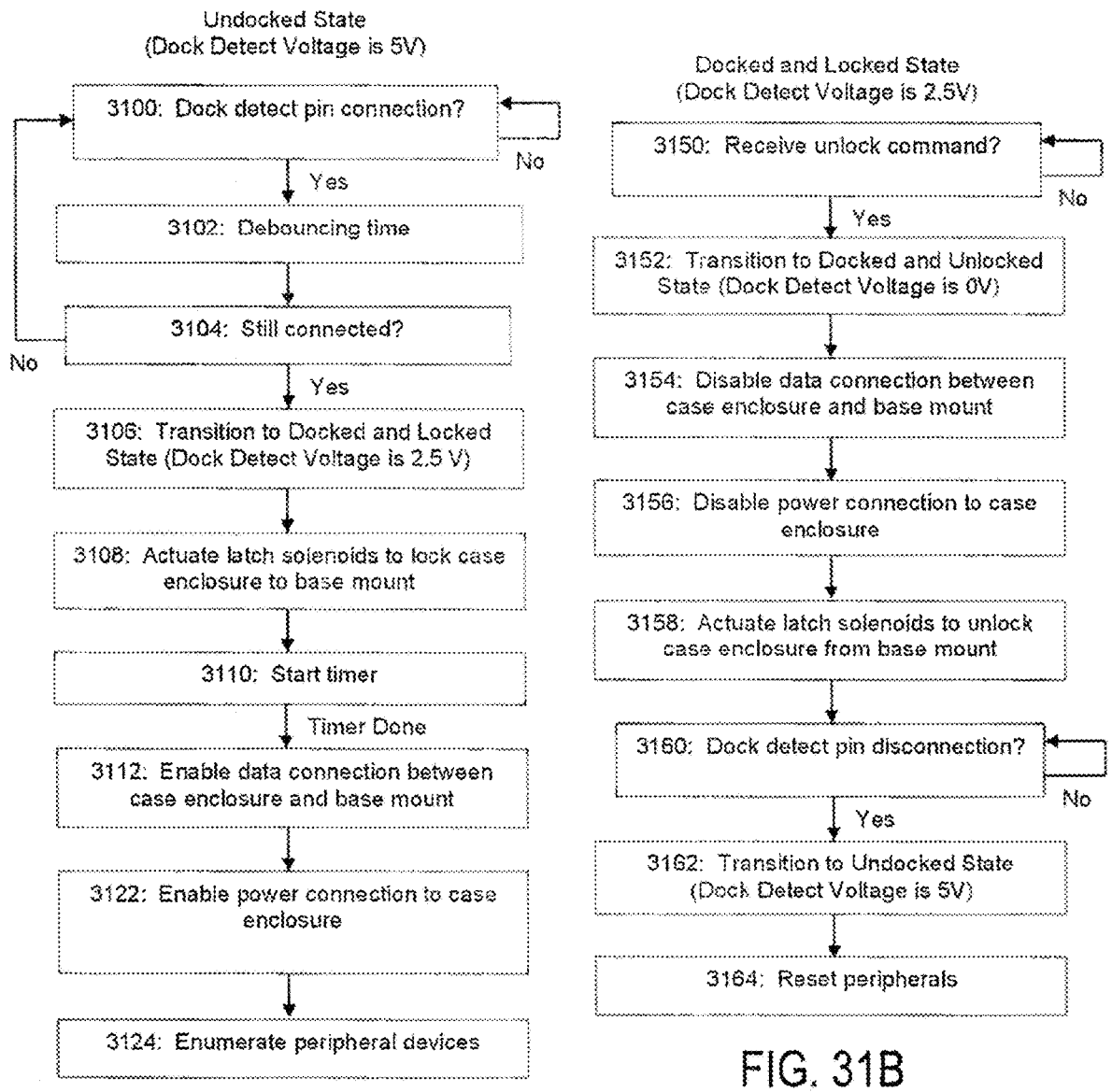
FIGS. 31A-31C show example process flows for circuit operations with respect to a tri-state dock detection contact.

FIG. 31A shows an example process flow for when the circuit 3000 is in an undocked state (in which case the dock detect pin voltage can be held at V3 (which may be 5V, for example)). At step 3100, the circuit checks whether a signal is present on the dock detect pin that would indicate a docking has occurred. If so, the circuit 3000 waits for a debouncing time (3102) to confirm whether the dock detection signal is still present (step 3104). The duration of the debouncing time can be chosen by a practitioner to be a value that is deemed sufficient by the practitioner to help prevent the circuit eliminate false dock detections in the event of transient signals being present on the dock detect pin that are not indicative of a reliable dock. If the signal is not still present after the debouncing time, the process flow can return to step 3100. However, if the signal is still present after the debouncing time, the process flow can proceed to step 3106.

At step 3106, the circuit 3000 transitions to the "docked and locked" state. This transition can include the circuit adjusting the voltage at the dock detect pin to be held at V1 (which may be 2.5V, for example). This adjusted voltage can trigger a variety of circuit operations.

For example, at step 3108, the V1 voltage can trigger the circuit to actuate the latch solenoids in order to physically lock the case enclosure 120 to the base mount. However, it should be understood that if the latches are designed to lock as a mechanical reaction to the physical docking of the ease enclosure 120 against the base mount 450, it should be understood that step 3108 could be omitted from the process flow.

At step 3110, the circuit 3000 can start a timer that imposes a waiting period on when certain operations such as power and data connections will be made. This timer can define a predetermined time period of any value desired by a practitioner. For example, a time period of 20ms will likely be sufficient to wait for a reliable locked dock to be established in order to being power and data transfers. This time delay can protect the internal integrity of the interface between the case enclosure 120 and base mount 450 as well as the internal circuitry therein. This time delay can also help in preventing arcing between the contacts of the base mount 450 and contacts of the case enclosure 120 when these contacts are brought into proximity with each other during docking.

After the time period defined by the timer has expired, the process flow can proceed to steps 3112 and 3114. At step 3112, the circuit 3000 enables a data connection between the case enclosure 120 and the base mount 450 via data transfer contact 3002. This means that the circuit 3000 can begin sending data to and/or receiving data from the case enclosure 120 via data transfer contact 3002. At step 3114, the circuit 3000 enables a power connection between' the case enclosure 120 and the base mount 450 via power transfer contact 3006. This allows power distribution circuitry within circuit 3000 to deliver power to the case enclosure 120 via power transfer contact 3006. This transferred power can be used to operate circuitry in the case enclosure 120 and charge a tablet computer or the like that is enclosed by the case enclosure 120.

At step 3124, the circuit can enumerate any connected peripherals that may be connected to the docking system. Examples of peripherals that may be connected to the docking system may be include an RFID reader, keyboard, payment card reader, printer, mouse, and/or any other type of electronic device which may be advantageous for use by the user in combination with a tablet computer or the like enclosed by the case enclosure 120. This numeration operation can help the docking system track which peripherals are connected to the docking system and effectively communicate with such connected peripherals.

FIG. 31B shows an example process flow for when the circuit 3000 is in a docked and locked state (in which case the dock detect pin voltage can be held at V2 (which may be 2.5V, for example)). At step 3150, the circuit checks whether an unlock command has been received. Such an unlock command can arise from an authorized unlock request from a user. Such as unlock request can be received via any of a number of methods. For example, the techniques disclosed in U.S. Pat. No. 9,892,604 (the entire disclosure of which is incorporated herein by reference) could be employed to authenticate user unlock requests. In an example embodiment, a user can position an RFID card/badge near an RFID reader that is in communication with the docking system. If the RFID card/badge is recognized as corresponding to an authorized user, an unlock command can be generated. In another example embodiment, the unlock request can be received via user input through a tablet computer or the like that is enclosed by the docked case enclosure 120. Examples of this are disclosed by (1) U.S. provisional patent application 62/564,884, filed Sep. 28, 2017, and entitled "Docking System Unlock for Portable Computing Device", and (2) U.S. patent application Ser. No. 16/142,503, filed Sep. 26, 2018, and entitled "Docking System for Portable Computing Device", the entire disclosures of each of which are incorporated herein by reference. In response to receipt of an unlock command, the process flow can proceed to step 3152.

At step 3152, the circuit 3000 transitions to the "docked and unlocked" state. This transition can include the circuit adjusting the voltage at the dock detect pin to be held at V2 (which may be 0V, for example). This adjusted voltage can trigger a variety of circuit operations.

For example, at step 3154, the circuit 3000 can disable the data connection that had been established at step 3112. This step can be helpful in preventing data loss by transferring data during a time period where a user is free to undock the case enclosure mid-transmission. However, if a practitioner is not concerned about this issue, such a practitioner may choose to perform step 3154 after step 3162.

As another example, at step 3156, the circuit 3000 can disable the power connection that had been established at step 3122. As noted above, this can help prevent undesirable arcing when the contacts of the base mount and case mount are in proximity with each other during an undock. However, if a practitioner is not concerned about this issue, such a practitioner may choose to perform step 3156 after step 3162.

In an example embodiment, step 3158 can be performed after steps 3154 and/or 3156 have been performed. At step 3158, the circuit 3000 actuates the latch solenoids to physically unlock the case enclosure 120 from the base mount to permit undocking by the user. Once again, by performing the unlocking after the power connection has been disabled, the risk of arcing can be reduced.

Now that the case enclosure 120 has been unlocked, the process flow waits for the case enclosure 120 to be undocked (step 3160). Undocking can be detected by monitoring for the absence of signal at the dock detect pin. If there has been an undocking, the circuit 3000 transitions to the "undocked" state. This transition can include the circuit adjusting the voltage at the dock detect pin to be held at V3 (which may be 5V, for example). This adjusted voltage can trigger a reset of the numeration for any connected peripherals (step 2564). When peripherals are connected to the docking system, they receive a numeration value when power is applied to entire docking system. In some embodiments, these peripherals may be controlled through electrical signals and data communications from circuitry in the docking system whether in the base mount 450, case enclosure 120, stand 130, and/or computing device 150. If power is lost to the docking system, but some peripherals remain powered, their numeration value may remain the same. Then, on a subsequent docking event or power-up of the docking system, the computing device 150 may not be able to communicate with one or more of the attached peripherals because those peripherals may have retained an outdated numeration value. To address this issue, step 3164 can force a reset of the enumeration of connected peripheral in response to the transition at the dock detect pin to V3. In this fashion, when a case enclosure 120 and computing device 150 are later docked to the base mount 450, the performance of step 3124 can ensure that the peripherals are correctly enumerated within the docking system.

While FIGS. 31A and 31B show this forced reset and re-enumeration of connected peripherals being performed by circuit 3000 in base mount 450, it should be understood that a circuit in the case enclosure 120 can perform these operations as well, particularly if there are any peripherals directly connected to the case enclosure (e.g., via USB ports 388 as shown by FIG. 6). In such a case, the dock detect pin voltage at contact 3004 can also be read by the circuit in the case enclosure 120 to trigger a forced enumeration reset and re-enumeration as appropriate.

Figure 31C:
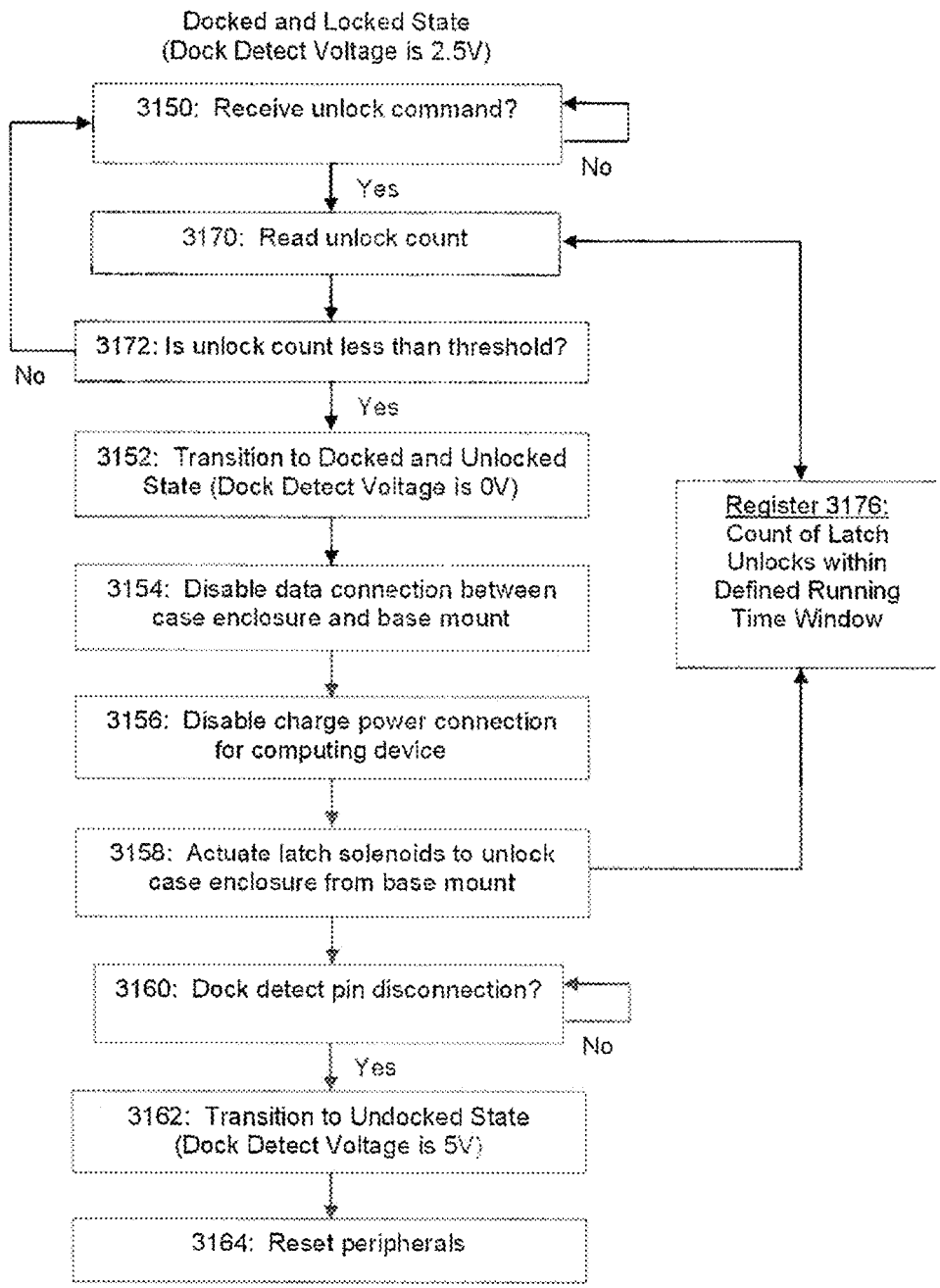

FIG. 31C shows another example process flow for when the circuit 3000 is in a docked and locked state (in which case the dock detect pin voltage can be held at V2 (which may be 2.5V, for example)). This process flow is similar to that of FIG. 31B but adds operations to prevent burnout or overheating of unlocking mechanism such as latch solenoids. In FIG. 31C, step 3170 is reached after step 3150, and at step 3170 the circuit reads an unlock count for the docking system. This count can be stored in a register 3176 that tracks how many unlocks have occurred within a defined running time window (e.g., the last 60 seconds). At step 3172, the circuit compares the read count value with a threshold. A practitioner can choose to set this threshold at any value that is deemed to be a boundary at which the locking mechanism may be adversely affected due to overheating, fatigue, or the like. For example, a suitable threshold may be 10 unlocks over the course of 60 seconds, although other values may be used). If the unlock count from register 3176 is less than the threshold, the process flow can proceed to step 3152 as discussed above in connection with FIG. 31B. However, if the unlock count is greater than the threshold, then the process flow can prevent immediate unlocking. For example, the process flow can start a timer and transition back to step 3150 at the expiration of the timer. As an example, the timer can have a duration such as 60 seconds to block a user from actuating the lock for 60 seconds. While 60 seconds have been used by way of example to describe the duration of the running window for register 3176 and the timer for the restricted unlock time period, it should be understood that other values may be used.

The FIG. 31C process flow can also be configured to increment the register 3176 each time that step 3158 is performed. The value in the register 3176 may also fluctuate as a function of time as older unlocks fall outside the running window.

Connections to External Peripherals

One or more embodiments may provide a docking system that may alleviate many of the drawbacks and vulnerabilities of conventional portable computer docking systems. In one or more embodiments, a docking system for a portable computing device, such as a handheld tablet computing device, for example, may include one or more external device ports and/or interfaces, such as Universal Serial Bus ports that may be automatically enumerated and/or otherwise implemented in response to particular events such as, for example, portable computing device docking and/or external device connection. In an embodiment, an enumeration operation, such as may be performed in substantial compliance and/or compatibility with USB specifications, which may include USB Revision 2.0 and/or greater (e.g., USB specification 3.2, published Sep. 22, 2017) and/or may include USB On-The-Go and Embedded Host Supplements (e.g., USB On-The-Go and Embedded Host Supplement to USB rev. 2.0 and/or greater), may indicate to a microprocessor, for example, which particular external devices may be connected. Thus, in an embodiment, a portable computing device, such as portable computing device 150, may obtain, install, load, and/or execute one or more software and/or firmware drivers and/or applications in response to an enumeration operation. Particular drivers and/or applications to obtain, install, load, and/or execute may depend at least in part on particular external devices indicated via an enumeration operation. Also, in an embodiment, a processor of a docking system, such as microcontroller 490, for example, may load one or more drivers and/or may otherwise implement one or more aspects of a docking system at least in part in accordance with particular external devices indicated via an enumeration operation.

In an embodiment, a docking system, such as may include case mount 350 and/or base mount 450, may include signal conditioning and/or other electronics that may facilitate and/or support communication with one or more external devices, such as one or more devices substantially compatible and/or compliant with one or more USB specifications (e.g., USB specification 2.0 and/or greater). For example, a docking system may include one or more hub devices, such as a USB hub device, that may facilitate communication between a host device, such as a USB host device, and/or one or more external devices, such as one or more substantially USB compliant and/or compatible devices, that may be connected via one or more external ports. Example types of external devices that may be connected via external ports may include, but are not limited to, pointing devices (e.g., mouse, trackball, trackpad, stylus, etc.), radio-frequency identification (RFID) card readers, bar code readers, magnetic stripe readers, portable storage devices, audio devices, cameras, etc.

Although example embodiments may include devices, interfaces, and/or communications substantially compliant and/or compatible with one or more USB specifications (e.g., USB revision 2.0 and/or greater), it should be understood that other embodiments may include devices, interfaces, and/or communications that may be substantially compliant and/or compatible with any of a wide range of external device standards, specifications, conventions, etc., currently existing and/or yet to be developed. In an embodiment, a docking system, such as may include case mount 350 and/or base mount 450, may facilitate communication with one or more external devices via one or more external ports substantially compliant and/or compatible with Apple Incorporated's Lightning interface, for example.

Figure 32:
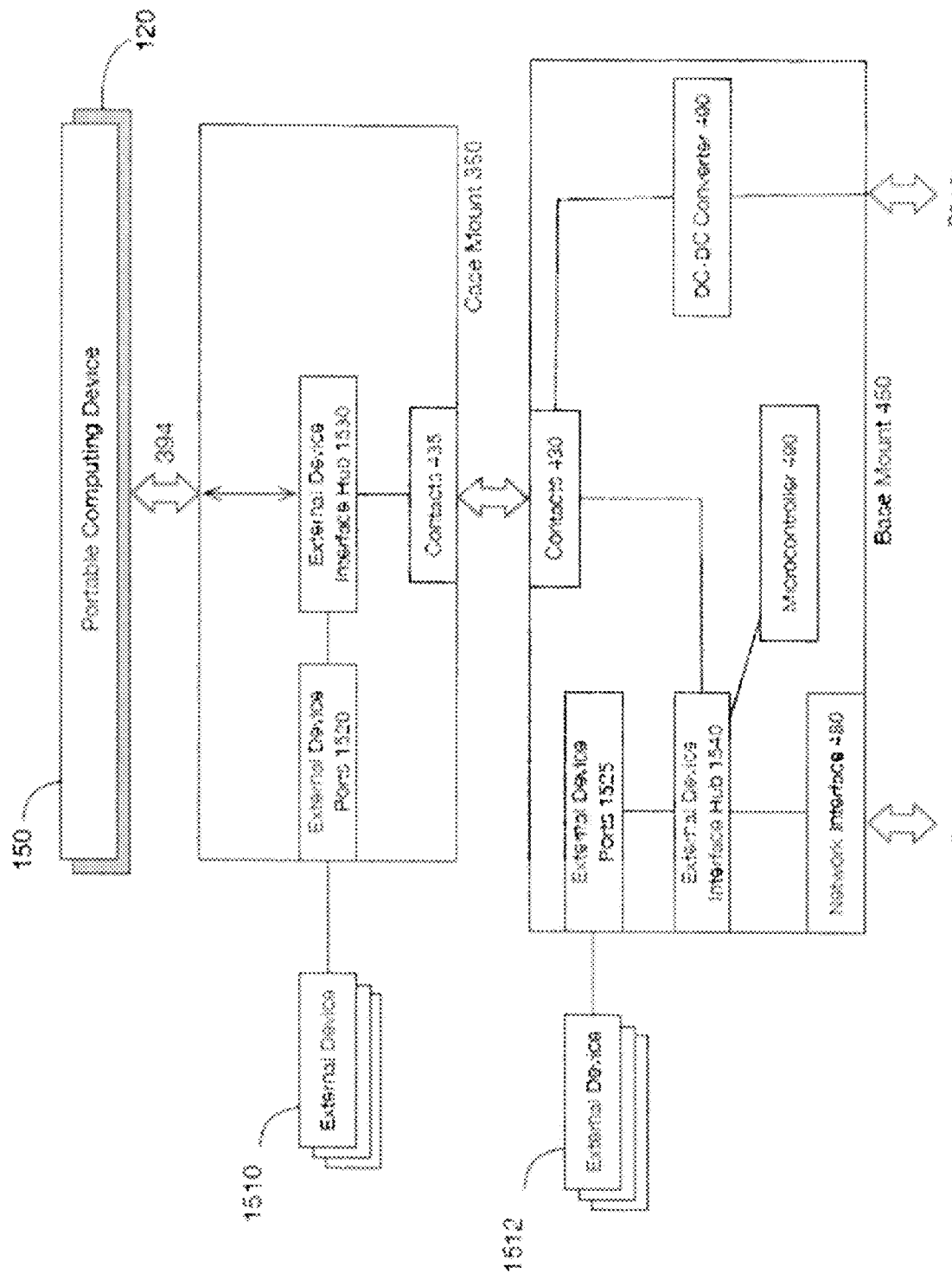
FIG. 32 shows an example block diagram of a docking system for use with various example embodiments.

FIG. 32 is a schematic block diagram depicting an embodiment of various example functionality, devices, and/or components of a docking system, such as comprising a case mount, such as case mount 350, and/or a base mount, such as base mount 450. As mentioned above, a portable computing device, such as portable computing device 150, may be positioned within an enclosure, such as enclosure 120. In an embodiment, enclosure 120 may be secured to a case mount, such as case mount 350. Also, in an embodiment, a case mount, such as case mount 350, may be removably secured or "docked" to a base mount, such as base mount 450. A case mount, such as case mount 350, may also be separated or "undocked" from a base mount, such as base mount 450, according to an embodiment.

In an embodiment, a base mount, such as base mount 450, may include a processing device, such as microcontroller 490, and/or may further include one or more external device interface hub devices, such as external device interface hub 3240. In an embodiment, hub devices, such as external device interface hub 3240, may at least in part implement enumeration operations by detecting attachment of external devices, establishing communication paths with external devices, etc. In an embodiment, external device interface hub 3240 may provide functionality substantially compliant and/or compatible with one or more USB specifications (e.g., USB revision 2.0 and/or greater). Also, in an embodiment, a case mount, such as case mount 350, may also include one or more external device interface hub devices, such as external device interface hub 3230. In an embodiment, external device interface hub 3230 may comprise a hub device substantially compliant and/or compatible with one more USB specifications (e.g., USB revision 2.0 and/or greater). Further, in an embodiment, a case mount, such as case mount 350, may include one or more external device ports, such as external device ports 3220, that may provide connectivity with one or more external devices, such as external devices 3210, for example. In an embodiment, external device ports 3220 may provide and/or facilitate connectivity and/or communication with external devices 3210 in a manner substantially compliant and/or compatible with one or more USB specifications (e.g., USB revision 2.0 and/or greater), for example.

As utilized herein, "host," "host device," and/or the like refer to a hardware, firmware, and/or software component to control, at least in part, transactions and/or other communications on an interface, bus, etc. For example, a portable computing device, such as portable computing device 150, may comprise an external device interface host device. In an embodiment, portable computing device 150, as a host device, may control, at least in part, communications and/or transactions between and/or among portable computing device 150, external device interface hubs 3230 and/or 3240, and/or external devices 3210 and/or 3212. In an embodiment, a portable computing device, such as portable computing device 150, may operate as a host and/or hub (e.g., dual role) device substantially compliant and/or compatible with USB specifications and/or On-The-Go and Embedded Host Supplements to USB specifications. As utilized herein, On-The-Go and Embedded Host Supplements to USB Specifications may be referred to as "OTG," "OTG protocol," and/or the like. Further, references herein to USB specifications (e.g., USB revision 2.0 and/or greater) are meant to include On-The-Go and Embedded Host Supplements associated with respective USB specifications. Also, as utilized herein, "hub," "hub device," and/or the like refer to a hardware, firmware, and/or software component to facilitate communication and/or transactions among varying numbers of devices, ports, etc. for an interface, bus, etc. For example, external device interface hubs 3230 and/or 3240 may facilitate communications and/or transactions between and/or among multiple external devices and portable computing device 150.

Further, in some embodiments, "hub," "hub device," and/or the like refer to a USB multi-port pass-through device substantially compliant and/or compatible with one or more USB specifications (e.g., USB 2.0 and/or greater). In an embodiment, hub devices 3230 and/or 3240 may comprise dual-role devices implemented in accordance with OTG capable of acting as host and/or peripheral. Similarly, as mentioned, portable computing device 150 may operate as a dual-role device under OTG. Additionally, as utilized herein, "external device" and/or the like refers to electronic devices that may be communicatively and/or electrically coupled to a system via an interface. For example, an external device, such as external devices 3210 and/or 3212, may be electrically connected to a docking system, such as including case mount 350 and/or base mount 450, via one or more ports, such as external device ports 3220 and/or 3225.

In an embodiment, a set of base mount contacts 430 and/or a set of case mount contacts 435 may be dedicated to communication, such as via signal packets substantially compliant with one or more USB specifications (e.g., USB revision 2.0 and/or greater), between various components of base mount 450 and/or components of case mount 350, and/or also between various components of base mount 450 and/or portable computing device 150. For example, contacts 430 may include a pair of contacts dedicated to signal communications substantially compliant and/or compatible with one or more USB specifications (e.g., USB revision 2.0 and/or greater). Also, for example, contacts 430 may include one or more contacts dedicated to one or more ground connections (e.g., signal ground and/or power ground) and/or one or more contacts dedicated to one or more voltage signals. Similarly, contacts 435 may include a pair of contacts dedicated to USB signal communications to match those of contacts 430. Further, contacts 435 may include one or more contacts dedicated to one or more ground connections and/or one or more contacts dedicated to one or more voltage signals to match those of contacts 430.

In an embodiment, a processor, such as microcontroller 490, may communicate with a portable computing device, such as portable computing device 150, via one or more an external device interface hub devices, such as hub devices 3240 and/or 3230. For example, if portable computing device 150 is docked, microcontroller 490 may communicate with portable computing device 150 via external device interface hub device 3240, via contacts 430 and/or 435, and/or via external device interface hub device 3230. Similarly, portable computing device 150, as a USB host device. For example, may communicate with hub device 3240 via hub device 3230 and/or via particular base mount contacts 430 and/or particular case mount contacts 435.

A network interface device, such as network interface device 480, may operate to facilitate communication between a network, such as an Ethernet-base local area network, for example, and/or an external device interface hub device, such as hub device 3240. For example, network interface device 480 may convert Ethernet-based communication packets to substantially USB (e.g., USB revision 2.0 and/or greater) compliant and/or compatible signal packets, in an embodiment. Further, in an embodiment, portable computing device 150 may communicate with a network, such as an Ethernet-based local area network, via USB signal packets communicated by way of hub devices 3230 and/or 3240 and/or also via network interface device 480.

FIG. 33 is an illustration of a block diagram depicting an embodiment 3300 of an example process for implementing and/or enumerating one or more external devices, such as one or more external devices 3210 and/or 3212. Embodiments may include all of steps 3310-3340, fewer than steps 3310-3340, and/or more than steps 3310-3340. Further, the order of steps 3310-3340 is merely an example order. As mentioned, a portable computing device, such as portable computing device 150, enclosed by a portable computing device enclosure, such as enclosure 120, and/or coupled to a case mount, such as case mount 350, may be docked to a base mount, such as base mount 450. Further, portable computing device 150 and/or enclosure 120 coupled to case mount 350 may also be un-docked from base mount 450. In an embodiment, external device implementation and/or enumeration operations may be performed at least in part in response to docking and/or un-docking events.

For example, at least in part in response to a determination that a portable computing device has been docked, an operation to detect external devices may be performed, such as depicted at steps 3310 and/or 3320. For example, portable computing device 150 and/or enclosure 120 coupled to case mount 350 may become docked to base mount 450. In an embodiment, a particular contact of contacts 430 and/or 435 may be dedicated to detecting a docking event. For example, as described elsewhere herein, contacts 435 may comprise a plurality of electrically conductive pins (e.g., pogo-pins, etc.). Further, contacts 430 may comprise a plurality of electrically conductive pads that make contact with the electrically conductive pins of contacts 435 if case mount 350 is secured onto, or "docked" onto base mount 450. In one or more embodiments, contacts 430 and/or 435 may be realized as substantially electrically conductive pins, pads, etc. In an embodiment, a particular pin, such as represented via contact 435, may comprise a "dock detect" pin. Similarly, a particular pad, such as represented herein via contact 430, physically corresponding to the dock-detect pin, may comprise a "dock-detect" pad. As explained more fully herein, a connection of the dock-detect pin with the dock-detect pad may signal to particular circuitry that case mount 350 has been docked onto base mount 450. Of course, a dock-detect pin and/or pad pair is merely an example of how a docking event may be detected.

In an embodiment, connection of a dock-detect pin (e.g., one or more of contacts 435) with a dock-detect pad (e.g., one or more of contacts 430) may cause circuitry, such as microcontroller 490, to toggle and/or pulse a voltage supply signal, such as a USB VBUS signal, and/or one or more other signal lines, such as a differential pair of USB signal lines, at an external device interface hub device, such as hub device 3240. In an embodiment, toggling and/or pulsing of a voltage supply signal, such as VBUS, at an external device interface hub, such as hub device 3240, may be implemented in a manner substantially compatible and/or compliant with one or more USB specifications (e.g., USB 2.0 and/or greater) as part of a Host Negotiation Protocol (HNP) and/or Session Request Protocol (SRP), for example. At least in part in response to a pulsing and/or toggling of a voltage supply signal, a hub device, such as external device interface hub 3240, may transmit one or more signals and/or signal packets to a host device, such as portable computing device 150, to initiate an enumeration and/or re-enumeration operation, as explained more fully below. In this manner, a host device, such as portable computing device 150, may recognize any external devices, such as external devices 3210 and/or 3212, coupled to external device ports, such as ports 3220 and/or 3225. For example, a portable computing device, such as portable computing device 150, may be removed from one particular docking system and placed onto another (e.g., undocked from one base and re-docked onto another base). Because different docking systems may incorporate different external (e.g., peripheral) devices, for example, having a host device, such as portable computing device 150, perform an enumeration operation upon docking and/or re-docking may help ensure that the various external devices are recognized by a host device and/or that the external devices become functional.

As mentioned, at least in part in response to a detection of a docking event, one or more external devices may be detected, such as depicted at step 3320. In an embodiment, external devices may comprise devices substantially compliant and/or compatible with one or more USB specifications (e.g., USB revision 2.0 and/or greater), for example. Also, in an embodiment, external device detection may be performed, at least in part, substantially in accordance with a USB enumeration process (e.g., USB revision 2.0 and/or greater). In this context, "enumeration" refers to recognizing attachment and/or removal of one or more particular external devices and/or refers to indicating connection status of particular external devices. Enumeration may also refer to implementation of detected external devices. For example, an enumeration process may involve one or more hub and/or host devices, such as external device interconnect hub devices 3230 and/or 3240, detecting attachment of one or more external devices, such as one or more external devices 3210 and/or 3212, at one or more external ports, such as one or more external ports 3220 and/or 3225. In an embodiment, an enumeration process may be performed under the control of a host device, such as portable computing device 150. Also, for example, an enumeration process may include indication of particular connected external devices to a host device, such as portable computing device 150, and/or may also include implementation of one or more detected internal and/or external devices, as explained in more detail below. Enumeration may further include detection of particular characteristics of connected internal and/or external devices, as discussed more fully below.

Additionally, in an embodiment, one or more drivers (e.g., software and/or firmware developed specifically for particular external devices) may be obtained, installed, loaded, and/or executed in preparation for facilitating communication with and/or operation of one or more particular internal and/or external devices, as depicted at step 3330. For example, a processor, such as microcontroller 490, and/or a host device, such as portable computing device 150, may obtain a particular driver for a particular external device 3210 and/or 3212 and/or for a particular internal device from a memory. In an embodiment, portable computing device 150 may implement hub devices 3230 and/or 3240, external devices 3210 and/or 3212, and/or other aspects of case mount 350 and/or base mount 450 in accordance with one or more aspects of the obtained driver.

Further, in an embodiment, a portable computing device, such as portable computing device 150, may obtain, install, load, and/or execute one or more software and/or firmware applications or "apps." For example, in response to a detection of a connection of a particular device to external device port, such as ports 3220 and/or 3225, a portable computing device, such as portable computing device 150, may obtain one or more particular applications that may be developed specifically for the particular devices. In an embodiment, applications may be obtained from a memory, such as a memory device of portable computing device 150 and/or a memory device of a case mount, such as case mount 350, and/or of a base mount, such as base mount 450. Further, in an embodiment, a portable computing device, such as portable computing device 150, may obtain an appropriate application via communication of signal packets over a network, such as over a wireless local area network and/or over a wired network, such as an Ethernet-based local area network. For example, a USB host device, such as portable computing device 150, may communicate with a networked computing device (e.g., an Internet-based server computing device) at least in part via USB signal packets communicated between a USB host device, such as portable computing device 150, and/or a network interface device, such as network interface device 480, for example. In an embodiment, a network interface device, such as network interface device 480, may provide access to a network, such as an Ethernet-base LAN, for various devices of a docking system, such including case mount 350 and/or base mount 450.

Also, in an embodiment, an un-docking of a portable computing device assembly (e.g., portable computing device 150 at least partially encased by enclosure 120 coupled to case mount 350) may occur, as indicated at step 3340. Further, as indicated again at step 1610, a portable computing device, such as portable computing device 150, may be docked and/or re-docked. For example, in some situations a user may physically transport a portable computing device assembly (e.g., portable computing device 150 at least partially encased by enclosure 120 coupled to case mount 350) from one docking system base mount to another, such as docking system base mount 450. Alternatively, in some situations a user may physically remove a portable computing device assembly from a base mount, such as base mount 450, for some purpose and/or may subsequently, after a period of time, re-dock a portable computing device assembly to the same base mount. In an embodiment, in response to a user "docking" a portable computing device assembly on a particular base mount, such as base mount 450, electrical conductivity may be re-established between contacts, such as contacts 435, of a case mount, such as case mount, 350, and/or contacts, such as contacts 430, of a base mount, such as base mount 450. For example, a dock-detect pin of contacts 435 may be placed into contact with a corresponding dock-detect pad of contacts 430, thereby allowing electrical conductivity to occur between the dock-detect pin and/or dock-detect pad. As discussed more fully herein, electrical conductivity between a dock-detect pin and/or a dock-detect pad, for example, may signal a docking event to one or more electrical components of a base mount, such as base mount 450.

Further, in an embodiment, a processor, such as microcontroller 490, may indicate to a portable computing device, such as portable computing device 150, that a docking and/or re-docking event has occurred. In an embodiment, to indicate to a portable computing device, such as portable computing device 150, that a docking and/or re-docking event has occurred, circuitry, such as microcontroller 490, may pulse and/or toggle a voltage supply signal (e.g., VBUS signal substantially compliant and/or compatible with USB specification 2.0 and/or greater) that may be sensed at another device, such as at external device interface hub 3240. External device interface hub 3240 may in turn communicate with a host device, such as portable computing device 150, to initiate an enumeration operation, for example. Pulsing and/or toggling of voltage supply signals as part of USB specifications and/or OTG protocols may allow a device, such as microcontroller 490, to signal to a portable computing device, such as portable computing device 150, to perform an enumeration operation. As mentioned, signaling via supply voltage signals (e.g., USB VBUS) among devices and/or components within base mount 450, case mount 350, and/or portable computing device 150 may be implemented as part of HNP and/or SRP under USB specifications and/or OTG protocols. Further, as explained above, a portable computing device, such as portable computing device 150, may, as a USB host device, initiate and/or otherwise perform an enumeration and/or re-enumeration operation, as indicated again at step 3320, for example.

FIG. 34 is an illustration of a block diagram depicting an embodiment 3400 of an example process for implementing and/or enumerating one or more external devices, such as one or more external devices 3210 and/or 3212. Example embodiments may include all of steps 3410-3460, fewer than steps 3410-3460, and/or more than steps 3410-3460. Further, the order of steps 3410-3460 is merely an example order. In some situations, while a portable computing device assembly, such as portable computing device 150, enclosure 120, and/or case mount 350, is docked to a docking system, such as base mount 450, one or more external devices, such as one or more external devices 3210 and/or 3212, may become electrically connected to one or more external device ports, such as one or more of external device ports 3220 and/or 3225. For example, a user may physically introduce a device and/or appropriate cable into an external device port, such as an external device port 3220 and/or 3210. In an embodiment, an external device interface hub device, such as external device interface hub 3230 and/or 3240, may detect attachment of an external device, such as an external device 3210 and/or 3212, at an external device port, such as an external device port 3220 and/or 3225. As mentioned, a hub device, such as hub 3230 and/or 3240, may be implemented to operate in substantial compliance and/or compatibility with one or more USB specifications. Similarly, external device ports 3220 and/or 3225 may be implemented in substantial compliance and/or compatibility with one or more USB specifications, as may an external device interconnect host device, such as portable computing device computing 150. In the discussion that follows, example embodiments may involve substantially USB-compliant and/or compatible systems, devices and/or processes. One or more embodiments may be described in a context of one or more USB specifications for ease of discussion. However, USB is merely an example external device interface protocol.

In an embodiment, a USB hub device, for example, such as hub device 3230 positioned within case mount 350, may detect attachment of an external device at a USB port, such as at an external device port 3220, as indicated at step 3410. Also, in an embodiment, a USB hub device, such as hub device 3240 positioned within base mount 450, may detect attachment of an external device at a USB port, such as at an external device port 3225. Further, as depicted at step 3420, at least in part in response to a detection of a connection of an external device, such as an external USB device, a USB hub device, such as hub device 3230 positioned within case mount 350 and/or a hub device 3240 positioned within base mount 450, may communicate an indication of the detection to a USB host device, such as portable computing device 150 at least partially encased within enclosure 120. In an embodiment, communication between hub devices 3230 and/or 3240 may be facilitated, at least in part, by signaling protocols substantially compliant and/or compatible with one or more USB specifications (e.g. USB revision 2.0 and/or greater).

Further, as indicated at step 3430, a USB hub device, such as hub device 3230 and/or 3240, may reset a detected external device and/or may establish communication with the detected external device, such as external device 3210 and/or 3212, for example. In an embodiment, at least in part to establish communication with a detected external device, such as external device 3210 and/or 3212, a hub device, such as hub device 3230 and/or 3240, may attempt to send signal packets to a detected external device at a relatively higher speed. At least in part in response to a detected external device, such as external device 3210 and/or 3212, succeeding to reply a successful completion of the relatively higher-speed signal packet communication, a hub device, such as hub device 3230 and/or 3240, may identify the detected external device as a higher-speed device. In an embodiment, at least in part in response to identifying an external device, such as external device 3210 and/or 3212, as a higher-speed device, a hub device, such as hub device 3230 and/or 3240, may continue to communicate with the detected external device utilizing higher-speed signal packet communication. However, in an embodiment, at least in part in response to a detected external device, such as external device 3210 and/or 3212, failing to reply a successful completion of a relatively higher-speed signal packet communication, a hub device, such as hub device 3230 and/or 3240, may identify the detected external device as a lower-speed device. In an embodiment, at least in part in response to identifying an external device, such as external device 3210 and/or 3212, as a lower-speed device, a hub device, such as hub device 3230 and/or 3240, may continue to communicate with the detected external device utilizing lower-speed signal packet communication.

Additionally, in an embodiment, at least in part in response to communication of an indication of a detection of an external device attachment, for example, a USB host device, such as portable computing device 150 at least partially encased within enclosure 120, may assign an address to a detected device, as depicted at step 3440. Further, as depicted at step 3450, a USB host device, such as portable computing device 150, may obtain one or more implementation parameters and/or descriptors from a detected external device, such as external device 3210 and/or 3212, via a USB hub device, such as external device interface hub 3230 positioned within case mount 350 and/or 3240 positioned within base mount 450. In an embodiment, a USB hub device, such as hub device 3240 and/or 3230, may implement one or more aspects of base mount 450, case mount 350, and/or external devices 3210 and/or 3212 at least in part in accordance with one or more obtained configuration parameters and/or descriptors. Additionally, a USB host device, such as portable computing device 150, and/or a processor, such as microcontroller 490, may obtain, install, load, and/or execute a particular driver and/or application at least in part in response to obtaining one or more configuration parameters and/or descriptors (see step 3460).

As mentioned, although example embodiments may describe aspects related to USB, it should be understood that other example embodiments may include any of a wide range of interconnect protocols, specifications, standards, etc., currently existing and/or yet to be developed. Also, although one or more embodiments may describe communication between a case mount, such as case mount 350, and/or portable computing device, such as portable computing device 150, via a signaling protocol substantially compliant and/or compatible with one or more USB specifications (e.g., USB revision 2.0 and/or greater), some portable computing devices may not be equipped with a USB and/or other similar type port. In some embodiments, communication between a case mount, such as case mount 350, and/or a portable computing device, such as portable computing device 150, may utilize an audio port of the portable computing device. For example, a portable computing device, such as portable computing device 150, may include a headphone and/or microphone port. In some embodiments, a microphone and/or headphone port may comprise a 118th inch jack having internal connections available for an input signal (e.g., microphone), one or more output signals (e.g., left and/or right headphone signals), and/or a ground connection. In an embodiment, a portable computing device enclosure, such as enclosure 120, may incorporate an analog-to-digital and/or digital-to-analog converter and/or other circuitry to modulate and/or demodulate signal packets to be communicated via an audio port of the portable computing device. In this manner, digital communication protocols, such as a protocol substantially compliant and/or compatible with one or more USB specifications (e.g., USB revision 2.0 and/or greater), may be employed for portable computing devices, such as portable computing device 150, that may not incorporate a wired digital communication port (e.g., USB port, Lightning connector, etc.).

Figure 35:
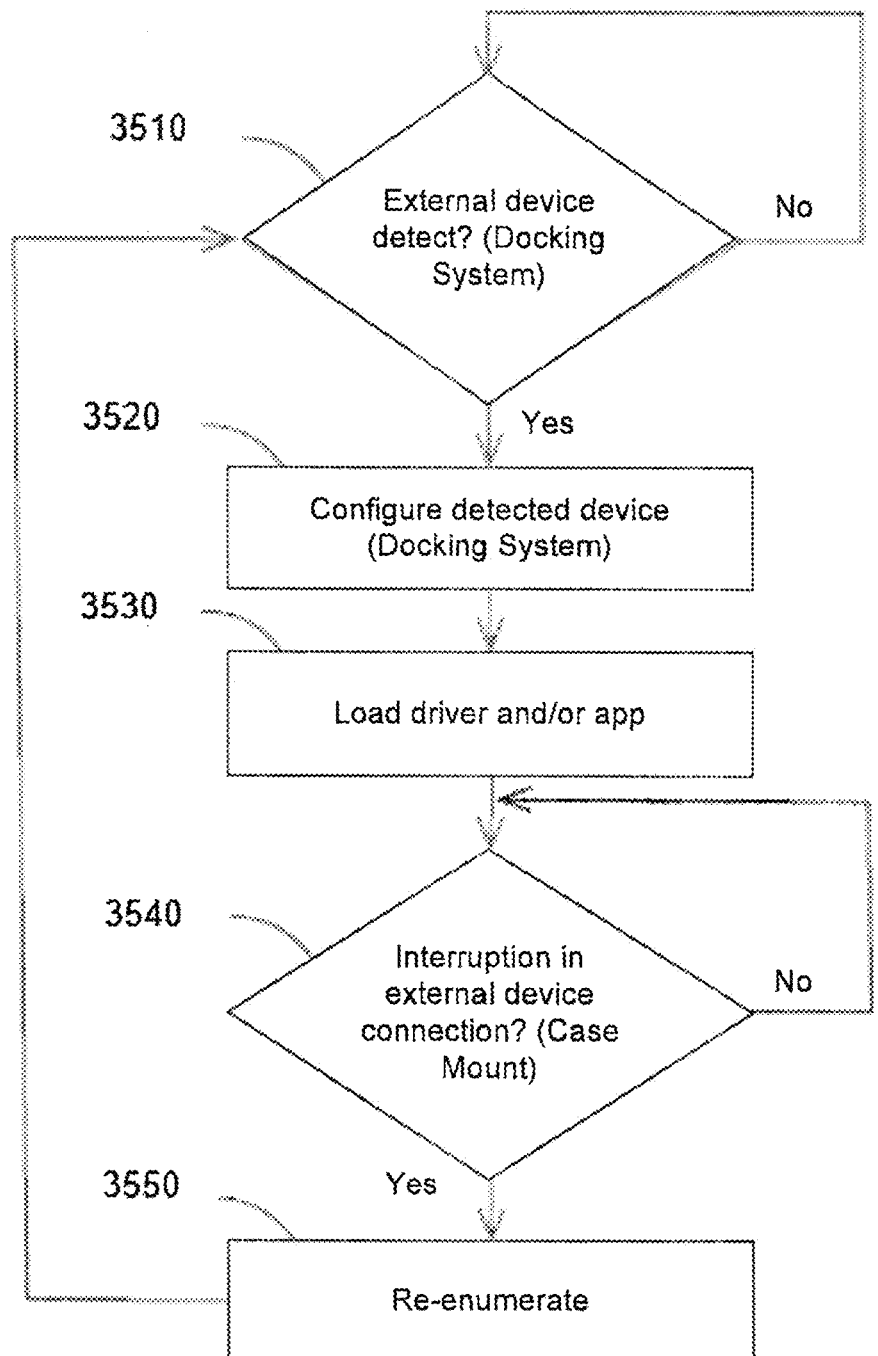
FIG. 35 shows an example process flow for detecting connection and/or implementing a particular external device.

FIG. 35 is an illustration of a block diagram depicting an embodiment 3500 of an example process for detecting connection and/or implementing a particular external device, such as a particular external device 3210 and/or 3212. An example embodiment, such as embodiment 3500, may also include detection of a re-connection of a particular external device, such as a particular external device 3210 and/or 3212. Example embodiments may include all of steps 3510-3550, fewer than steps 3510-3550, and/or more than steps 3510-3550. Further, the order of steps 3510-3550 is merely an example order.

As mentioned, a portable computing device, such as portable computing device 150, at least partially enclosed by a portable computing device enclosure, such as enclosure 120, may be coupled to a case mount, such as case mount 350. In turn, a case mount, such as case mount 350, may be docked to a base mount, such as base mount 450. Collectively, for example, portable computing device 150, case mount 350 and/or base mount 450 may include a host device, portable computing device 150, and/or one or more hub devices, such as external device interface hub devices 3230 and/or 3240, sufficient to facilitate communication between one or more external devices, such as external devices 3210 and/or 3212, and/or a microcontroller, such as microcontroller 490, and/or between external devices 3210 and/or 3212 and/or a network, such via network interface 480. Alternatively, communication may be established between an external device 3210 and/or 3212 and/or one or more other aspects of portable computing device 150, case mount 350, and/or base mount 450, for example.

In an embodiment, a determination may be made as to whether an external device, such as one or more of external devices 3210 and/or 3212, has been detected, as indicated at step 3510. For example, a particular external device 3210 and/or 3212 may be connected to a particular external port 3220 and/or 3225. In an embodiment, external device detection may be performed at least in part by an external device interface hub device, such as external device interface hub 3230 positioned within case mount 350 and/or external device interface hub 3240 positioned within base mount 450. In some embodiments, detection of external devices may be initiated by a user un-docking and/or subsequently re-docking a portable computing device assembly (e.g., portable computing device 150, enclosure 120, and/or case mount 350) from a base mount, such as base mount 450.

At least in part in response to a detection of the particular external device, such as a particular external device 3210 and/or 3212, the detected external device may be implemented, as indicated at step 3520. Further, one or more other aspects of case mount 350 and/or base mount 450 may be implemented at least in part in response to a detection of external device 3210 and/or 3212. For example, a particular driver and/or application may be obtained, installed, loaded, and/or executed in response to a detection of a particular external device, as indicated at step 3530. For example, an external device interface host, such as portable computing device 150, may obtain a particular driver and/or application for a particular external device 3210 and/or 3212 from a memory and/or from a networked computing device, for example, and/or may implement portable computing device 150, hub devices 3230 and/or 3240, and/or particular external device 3210 and/or 3212 in accordance with one or more aspects of an obtained driver and/or application.

In an embodiment, an interruption in an external device connection may be detected, as indicated at step 3540. At least in part in response to a determination that an interruption in external device connection has occurred, an enumeration process 3550, such as a USB enumeration process, may again be performed. In an embodiment, such an enumeration process 3550 performed in response to an interruption in connection of an external device may re-implement one or more external device interface hub devices, such as hub devices 3230 and/or 3240, and/or an external device interface host, such as portable computing device 150, in light of a recently-removed external device. As further depicted at step 3510, a re-connection of a particular external device, such as a particular external device 3210 and/or 3212, may be detected. For example, a particular external device 3210 and/or 3212 may be connected and/or re-connected to a particular external port 3220 and/or 3212. In an embodiment, responsive to a re-connection of external device 3210 and/or 3212, an enumeration and/or re-numeration process may be performed, such as at least partially depicted, for example, at steps 3520-3530.

Voltage and Current Regulation

Figure 36:
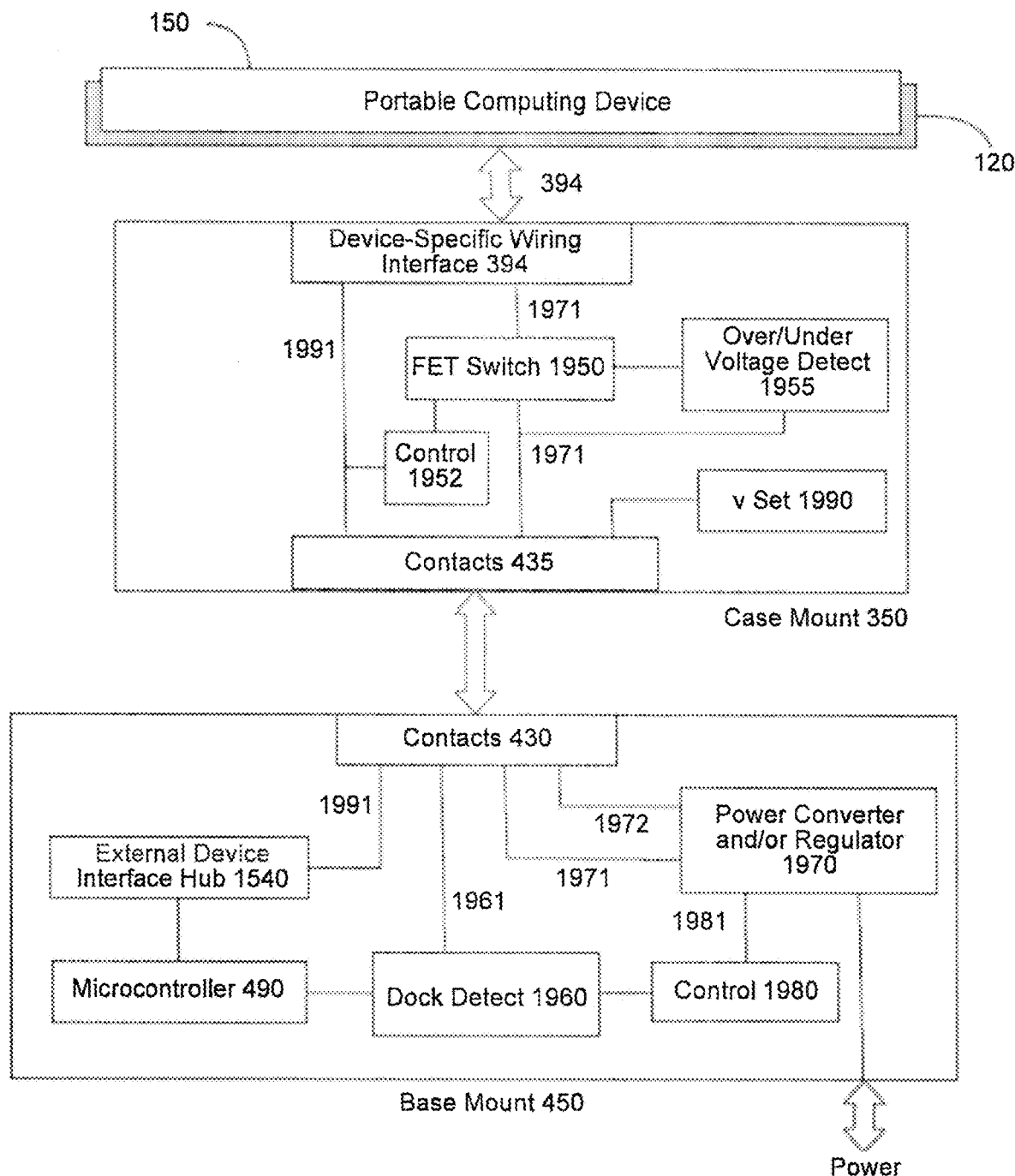
FIG. 36 shows another example block diagram of a docking system for use with various example embodiments.

FIG. 36 is an illustration depicting an example schematic block diagram of a portable computing device assembly, such as portable computing device 150, enclosure 120, and/or case mount 350, selectively docked to a base mount, such as base mount 450. "Selectively" in this context refers to a user having an ability to dock and/or undock a portable computing device assembly (e.g., portable computing device 150, enclosure 120, and/or case mount 350) with respect to a docking system, such as base mount 450. In an embodiment, base mount 450 may obtain electrical power, such as in the form of an approximately 24-volt signal utilizing a number of conductors. In a particular embodiment, wherein a network interface, such as network interface 480, may comprise an Ethernet interface, base mount 450 may receive an approximately 24.0 V signal utilizing Power Over Ethernet, in accordance with one or more revisions of IEEE 802.3af-2003, IEEE 802.3at-2009, or the like, available from the IEEE standards group. In one or more embodiments, a network interface, such as network interface 480, may utilize a single conductor and/or ground pair, and/or may utilize a number of conductors in accordance with voltage and/or current requirements of base mount 450, case mount 350, and/or portable computing device 150, for example. In other embodiments, base mount 450 may obtain alternating current and/or direct current utilizing other types of power sourcing equipment.

In one or more embodiments, a power converter/regulator, such as power convertor/regulator 1970, may include circuitry to convert and/or to regulate received electrical power to comprise voltage and/or current parameters suitable for use by, for example, a processor, such as microcontroller 490, a lock controller, as well as voltage and/or current parameters suitable for use by other components of base mount, case mount 350, external devices 3210 and/or 3212, and/or portable computing device 150. In an embodiment, a particular power converter and/or regulator may provide a supply voltage to various components in a docking system, such as microcontroller 490, external device interface hub 3240, and/or control circuit 1980, for example. Further, in an embodiment, a supply voltage to be applied to a portable computing device, such as portable computing device 150, may be generated by another particular power converter and/or regulator, such as power converter and/or regulator 1970. Also, in an embodiment, power for devices positioned within a case mount, such as case mount 350 (e.g., control circuit 1952), may be delivered via a subset of contacts 430 and/or 435 dedicated to USB signaling, for example.

In one or more embodiments, a power converter/regulator, such as power converter/regulator 1970, may provide output signals comprising voltages of approximately 5.0 VDC and/or 12.0 VDC. However, other example embodiments may embrace voltage and/or current conversion/regulation so as to provide any number of DC and/or AC voltages, such as voltage signals of less than 5.0 volts, voltage signals greater than 12.0 volts, and/or any of a range of voltages between 5.0 volts and/or 12.0 volts. In one or more embodiments, a power converter/regulator, such as power converter/regulator 1970 may perform voltage up-conversion to provide voltage signals greater than 24.0 VDC, such as 28.0 VDC, 36.0 VDC, 48.0 VDC, and so forth, virtually without limitation. As explained more fully below, a particular voltage to be developed via a power converter/regulator, such as power converter/regulator 1970, may be specified and/or determined, for example, at least in part by a particular value of a particular "voltage select" resistor, such as resistor 1990, positioned within a case mount, such as case mount 350.

As also depicted in FIG. 36, a control circuit, such as control circuit 1980, may toggle a signal, such as signal 1981, electrically coupled to an enable signal input of a power converter and/or regulator, such as power converter/regulator 1970. For example, if control circuit 1980 asserts signal 1981, power converter/regulator 1970 may generate an output voltage signal. On the other hand, if control circuit 1980 does not assert signal 1981, power converter/regulator 1970 may be effectively disabled and/or may not generate an output voltage signal. In an embodiment, control circuitry, such as control circuitry 1960, may include timer circuitry that may determine a particular timing relationship between a detection of a docking event, such as indicated, for example, by dock detect circuitry 1960, and/or assertion of a power supply enable signal, such as 1981. For example, at least in part in response to a detection that a personal computing device assembly, such as personal computing device 150, enclosure 120, and/or case mount 350, has been physically and/or electrically connected (e.g., docked) to a base mount, such as base mount 450, a timer circuit, such as a timer circuit of control unit 1980, may delay assertion of a power supply enable signal, such as enable signal 1981, by a specified amount of time. In an embodiment, a delay between detection of a docking event and/or assertion of a power supply enable signal, such as enable signal 1981, may comprise a time period of approximately 0.5 seconds, although it should be understood that other time periods may be used.

Figure 37:
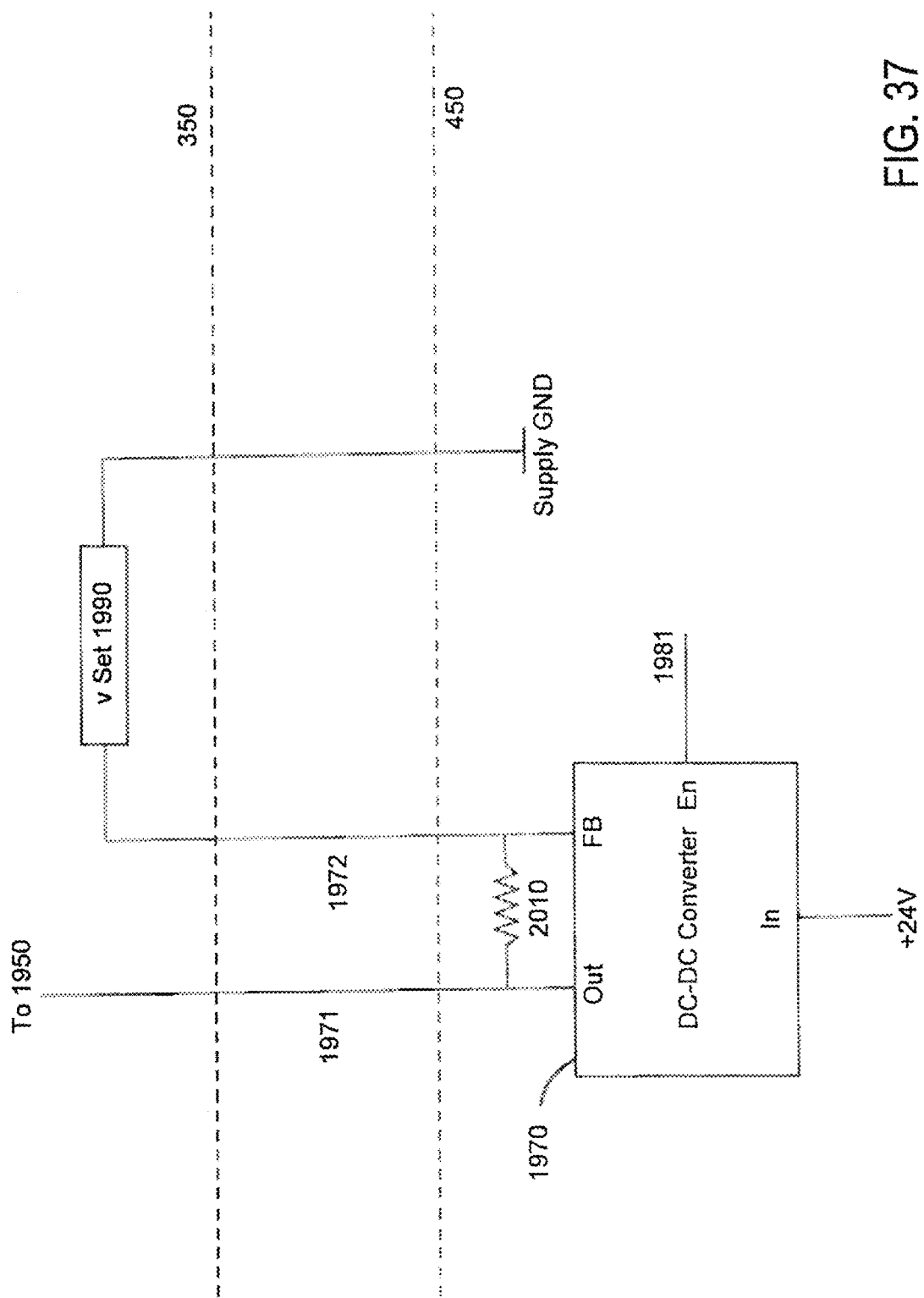
FIG. 37 shows an example block diagram of an example embodiment of a circuit to specify and/or determine a voltage to be generated by a power converter and/or regulator.

FIG. 37 depicts an illustration of a schematic block diagram of an example embodiment of a circuit to specify and/or determine a voltage to be generated by a power converter and/or regulator, such as power converter/regulator 1970. In an embodiment, if enable signal 1981 is asserted, power converter/regulator 1970 may generate an output voltage signal 1971. As mentioned, a particular supply voltage level to be generated by a power converter and/or regulator, such as power converter/regulator 1970, may be determined, at least in part, by a value of a particular resistor, such as V Set resistor 1990, located in a case mount, such as case mount 350. As depicted in FIG. 37, a power converter/regulator, such as power converter/regulator 1970, may include a feedback input "FB." A voltage level applied to input FB may control an output voltage level, such as a voltage level of output voltage signal 1971. In an embodiment, if input FB of power converter/regulator 1970 is pulled to a relatively high voltage level (e.g., a voltage level approximately similar to that appearing at the power converter and/or regulator output), then power converter/regulator 1970 may generate a relatively lower voltage signal (e.g., approximately 0.6V). In an embodiment, a feedback resistor, such as 2010, may tend to pull input FB of power converter/regulator 1970 to a level approximately similar to that of output voltage signal 1971. Further, if input FB of power converter/regulator 1970 is pulled to a relatively low voltage level (e.g., a voltage level approximately similar to that of a power supply ground reference), such as if electrically tied to a power supply ground reference, then power converter/regulator 1970 may generate a relatively higher voltage signal (e.g., a voltage level approximately similar to that of a power converter and/or regulator input). To produce an appropriate intermediate voltage level for a given type of portable computing device, for example, a particular value for V set resistor 1990 may be selected. For example, resistors 2010 and/or 1990 may form a voltage divider that may present particular voltage levels to input FB, depending of course on particular resistance characteristics selected for resistors 2010 and/or 1990. In an embodiment, V set resistor 1990 may be selected based on a particular type, brand, and/or model of portable computing device. For example, particular portable computing device types may have varying voltage specifications. Appropriate selection of a V set resister, such as resistor 1990 may result in an appropriate voltage being generated by power converter/regulator 1970.

Particular advantages that may be experienced through implementation of one or more embodiments such as that depicted in FIG. 20 may include automatic current limiting and/or automatic voltage selection. As mentioned, particular values of a resistor, such as V set resistor 1990, may determine output voltage levels generated by a power converter and/or regulator, such as power converter and/or regulator 1970. Further, because V set resistor 1990, for example, is located within a case mount, such as case mount 350, if different case mounts of varying values for V set resistor 1990 are mated with a base mount, such as base mount 450, different supply voltage levels may be generated. Thus, particular case mounts, such as case mount 350, may be customized for particular portable computing devices, for example, via selection of appropriate resistors, such as V set 1990, for the particular portable computing devices. Further, in this manner, a particular base mount, such as base mount 450, may generate different voltages for different portable computing devices, such as portable computing device 150, without any re-configuration. Rather, a mere docking of a case mount to a base mount may automatically select an appropriate supply voltage. Additionally, one or more embodiments may enable a manufacturer, for example, to create particular versions of case mounts (e.g., by varying a value of V set resistor 1990) for particular types, brands, and/or models of portable computing devices, wherein the particular versions of case mounts specify particular appropriate supply voltages. Further, these different versions of case mounts, such as case mount 350, may be utilized with similar base mounts, such as base mount 450, without any need to re-implement and/or modify the base mount to accommodate the different versions of case mounts.

Additionally, as mentioned, one or more embodiments may also provide an advantage in automatic current limiting, such as in a situation wherein a resistor, such as V set resistor 1990, should fail for whatever reason. In an embodiment, rather than triggering a run-away voltage situation and/or other potentially harmful excessive voltage condition at an output of a power converter and/or regulator, such as power converter and/or regulator 1970, a relatively lower voltage may result from failure of a resistor, such as V set 1990. For example, if an open circuit and/or other higher impedance state were to develop at resistor V set 1990, input FB of power converter and/or regulator 1970 may be pulled to a voltage level approximately similar to a voltage found on power converter and/or regulator output signal 1971. As mentioned, for situations wherein a voltage level of a feedback input (e.g., input "FB") of power converter and/or regulator 1970 approaches a voltage level of an output voltage signal 1971 of power converter and/or regulator 1970, power converter and/or regulator 1970 may generate a relatively lower voltage level, such as 0.6V, for example. Thus, in an embodiment, a failure of resistor V set 1990 may result in a relatively lower voltage signal being generated by power converter and/or regulator 1970, thereby avoiding potential adverse and/or catastrophic consequences of an excessive voltage level being generated.

Returning again to FIG. 36, it may be noted that a case mount, such as case mount 350, may receive power converter/regulator output signal 1971 via one or more of contacts 430 and/or 435. Further, one or more of contacts 430 and/or 435 may be dedicated to ground reference signal. In an embodiment, power converter/regulator output signal 1971 may pass through a switching device such as FET switch 1950. In an embodiment, FET switch 1950 may comprise a power transistor capable of reliably withstanding voltages provided by power converter/regulator 1970 over a relatively extended period of time. In an embodiment, a switching device, such as FET switch 1950, may selectively electrically couple power converter/regulator output signal 1971 to a portable computing device, such as portable computing device 150, by way of an interface, such as device-specific interface 394. In an embodiment, operation of a switching device, such as FET switch 1950, may be determined at least in part a control circuit, such as control circuit 1952. In an embodiment, a control circuit, such as control circuit 1952, may comprise a microprocessor. Also, in an embodiment, a control circuit, such as control circuit 1952, may obtain inputs via USB signals, such as 1991, for example. In an embodiment, a control circuit, such as control circuit 1952 may enable and/or disable a switching device, such as FET switch 1950, depending, at least in part, on particular signal packets obtained via USB signals 1991.

A processor, such as microprocessor 490, may control application of a supply voltage, such as power converter/regulator output signal 1971, to a portable computing device, such as portable computing device 150, at least in part via transmitting particular signal packets over USB signals 1991, for example.

Additionally, in an embodiment, a switching device, such as FET switch 1950, may be disabled in some circumstances by a protection circuit, such as over/under voltage detect circuit 1955. For example, a protection circuit, such as over/under voltage detect circuit 1955, may monitor voltage converter and/or regulator output voltage signal 1971 for over-voltage situations and/or for under-voltage situations. In an embodiment, over/under voltage detect circuit 1955 may detect whether voltage converter and/or regulator output voltage signal 1971 exceeds a particular and/or specified threshold value. In an embodiment, a threshold value may be specified in terms of a particular voltage level. For example, a threshold of 5.5V may be specified for embodiments wherein voltage converter and/or regulator output voltage signal 1971 is specified to comprise approximately 5.0V. Also, for example, for embodiments in which voltage converter and/or regulator output voltage signal 1971 is specified to comprise approximately 12.0V, a threshold level of 12.5 V may be specified. In an embodiment, a threshold parameter may be programmed via a microprocessor, such as, for example, control circuit 1952 and/or microcontroller 490, and/or via portable computing device 150. In an embodiment, at least in part in response to a detection by over/under voltage detect circuit 1955 that voltage converter and/or regulator output voltage signal 1971 exceeds a specified threshold value, over/under voltage detect circuit 1955 may disable a switching device, such as FET switch 1950, thereby decoupling a portable computing device, such as portable computing device 150, from voltage converter and/or regulator output voltage signal 1971, and/or also thereby helping to prevent damage and/or other failure conditions in a portable computing device, such as portable computing device 150. Similarly, in an embodiment, over/under voltage detect circuit 1955 may disable FET switch 1950 at least in part in response to voltage converter and/or regulator output voltage signal 1971 falling below a particular threshold value. For example, a threshold of 4.0V may be specified for embodiments wherein voltage converter and/or regulator output voltage signal 1971 is specified to comprise approximately 5.0V. Also, for example, for embodiments in which voltage converter and/or regulator output voltage signal 1971 is specified to comprise approximately 12.0V, a threshold level of 10.0 V may be specified.

While the invention has been described above in relation to its example embodiments, various modifications may be made thereto that still fall within the invention's scope. Such modifications to the invention will be recognizable upon review of the teachings herein.

What is claimed is:

1. A docking system comprising:
   a case enclosure for receiving a portable computer, the case enclosure comprising (1) a first circuit, (2) a plurality of case enclosure contacts, and (3) a metallic element, the case enclosure contacts connected to the first circuit;
   a base mount, the base mount comprising (1) a second circuit, (2) a plurality of angled resilient contact pins, and (3) a magnet, the angled resilient contact pins connected to the second circuit;
   wherein the base mount is rotatable relative to an axis;
   wherein the case enclosure is adapted to releasably dock with the base mount in a docked position, wherein the docked position includes a physical connection between the angled resilient contact pins and the case enclosure contacts to form an electrical connection between the first circuit and the second circuit;
   wherein the first and second circuits are configured for data communication with each other through an interface that includes a data communication connection through the physical connection; and
   wherein the docked position further includes a magnetic attraction between the magnet and the metallic element that holds the case enclosure in place with the base mount.

2. The system of claim 1 wherein the first and second circuits are configured for data communication with each other through the interface according to a protocol that does not guarantee data delivery.

3. The system of claim 1 wherein the magnetic attraction between the magnet and the metallic element restricts relative motion between the case enclosure and the base mount sufficient to prevent a loss of the data communication connection during operation.

4. The system of any of claim 1 wherein the case enclosure is adapted to releasably undock with the base mount in an undocked position, wherein the undocked position does not include a physical connection between the angled resilient contact pins and the case enclosure contacts; and
   wherein the magnetic attraction is sufficient to require a force in a range from 5-20 kg force in an opposing direction that is normal to a user interface plane of the case enclosure to move the case enclosure to the undocked position.

5. The system of any of claim 1 wherein the magnetic attraction between the magnet and the metal member when the case enclosure is in the docked position restricts relative motion between the case enclosure and the base mount sufficient to prevent a loss of the data communication connection during operation and in the event of a force in a range of 1-5 kg being applied to the docked case enclosure in a rotational or tangential direction with respect to the axis.

6. The system of any of claim 1 wherein the magnetic attraction between the magnet and the metal member when the case enclosure is in the docked position restricts relative motion between the case enclosure and the base mount sufficient to prevent a loss of the data communication connection over the course of 50,000 rotations of the base mount.

7. The system of claim 1 wherein the angled resilient contact pins comprise a plurality of pogo pin contacts that extend from a surface of the base mount.

8. A docking system comprising:
   a case enclosure for receiving a portable computer, the case enclosure comprising (1) a first circuit, and (2) a plurality of case enclosure contacts, the case enclosure contacts connected to the first circuit, and wherein the case enclosure contacts are located on a surface of the case enclosure;
   a base mount, the base mount comprising (1) a circuit board, (2) a second circuit disposed on the circuit board, and (3) a plurality of resilient contact pins connected to the second circuit, wherein each of a plurality of the resilient contact pins extend from the circuit board at a cant angle that is off perpendicular from the circuit board; and wherein the case enclosure is adapted to releasably dock with the base mount in a docked position, wherein the docked position includes a physical connection between the angled resilient contact pins and a plurality of the case enclosure contacts to form an electrical connection between the first circuit and the second circuit.

9. The system of claim 8 wherein the cant angles are in a range between 0.5 degrees and 10 degrees off perpendicular from the circuit board.

10. The system of claim 9 wherein the cant angles are in a range between 1 degree and 6 degrees off perpendicular from the circuit board.

11. The system of claim 9 wherein the cant angles are in a range between 2 degrees and 4 degrees off perpendicular from the circuit board.

12. The system of any of claim 8 wherein the base mount is rotatable relative to an axis.

13. The system of claim 12 wherein the first circuit is configured for data communication with the second circuit through an interface that includes a data communication connection through the physical connection.

14. The system of claim 13 wherein the first circuit is configured for data communication with the second circuit through the interface according to a protocol that does not guarantee data delivery.

15. A docking system comprising:
- a base mount adapted to dock in a docked position with a case enclosure for a computing device, the base mount comprising a first circuit;
- a stand adapted to support the base mount, the stand comprising a second circuit;
- an arm that extends from the stand; and
- a cable that runs through an interior portion of the arm and is adapted to electrically connect the first circuit with the second circuit;
- a shuttle located inside the arm interior portion, the shuttle having an open interior, and wherein the cable runs axially through the open interior of the shuttle;
- wherein the mount is physically connected to the arm;
- wherein the mount is articulatable relative to the stand;
- wherein the shuttle is adapted to slide within the arm interior portion in response to an articulation of the mount that imparts a force onto the cable; and
- wherein the docked position includes a physical connection between the angled resilient contact pins and a plurality of case enclosure contacts of the case enclosure to form an electrical connection between the first circuit and the second circuit.

16. The system of claim 15 wherein the articulatable mount is rotatable about an axis.

17. The system of claim 16 further comprising another arm that extends from the stand, wherein the mount is also physically connected to the another arm, and wherein the axis extends from the arm to the another arm.

18. The system of any of claim 15 wherein the arm interior portion extends from a first arm opening to a second arm opening, wherein the cable includes a first cable end and a second cable end opposite the first cable end, wherein the first cable end extends from the first arm opening to connect with the first circuit, wherein the second cable end extends from the second arm opening to connect with the second circuit, and wherein the first arm opening is at an angle in a range between 60 degrees and 120 degrees relative to the second arm opening.

19. The system of any of claim 15 wherein the cable comprises a plurality of conductors, and wherein a plurality of the conductors are unbundled within the arm.

20. The system of claim 19 wherein the conductors include a sheathed cable that comprises a first data wire, a second data wire, and a shield wire, wherein the first data wire and the second data wire are arranged as a twisted pair, and wherein the sheathed cable is unbundled relative to the unbundled conductors.

* * * * *